US007913561B2

(12) United States Patent
Yamada et al.

(10) Patent No.: US 7,913,561 B2
(45) Date of Patent: Mar. 29, 2011

(54) ULTRASONIC WAVE VIBRATING APPARATUS

(75) Inventors: Norihiro Yamada, Hino (JP); Masashi Yamada, Sagamihara (JP); Yukichi Hanayama, Hachioji (JP); Nobuyuki Suda, Sagamihara (JP)

(73) Assignee: Olympus Medical Systems Corp. (JP)

( * ) Notice: Subject to any disclaimer, the term of this patent is extended or adjusted under 35 U.S.C. 154(b) by 479 days.

(21) Appl. No.: 12/025,962

(22) Filed: Feb. 5, 2008

(65) Prior Publication Data

US 2009/0193898 A1 Aug. 6, 2009

(51) Int. Cl.
*G01N 29/34* (2006.01)
*H04R 1/02* (2006.01)
*B08B 3/00* (2006.01)

(52) U.S. Cl. .......................... 73/596; 381/340; 134/105

(58) Field of Classification Search .................... 73/596; 381/340; 134/105
See application file for complete search history.

(56) References Cited

U.S. PATENT DOCUMENTS 4,173,725 A * 11/1979 Asai et al. ..................... 310/325
5,384,203 A * 1/1995 Apfel ............................ 428/613
5,516,043 A * 5/1996 Manna et al. .............. 239/102.2
6,178,974 B1 * 1/2001 Kobayashi et al. ............ 134/1.3
6,493,289 B2 * 12/2002 Kitaori et al. ................. 367/189
2004/0250844 A1 * 12/2004 Kumazaki ..................... 134/201
2009/0192388 A1 * 7/2009 Yamada et al. ............... 600/459

FOREIGN PATENT DOCUMENTS

JP 5-95957 4/1993
JP 10-429 1/1998
JP 2003-112118 4/2003
JP 2003-112120 4/2003
JP 2004195429 * 7/2010

* cited by examiner

*Primary Examiner* — Jacques M Saint Surin
(74) *Attorney, Agent, or Firm* — Ostrolenk Faber LLP

(57) ABSTRACT

An ultrasonic wave vibrating apparatus includes a passive element converting electric energy to ultrasonic vibration, electrodes, a horn body arranged in a forward side of the element and amplifying the vibration, a backing arranged in the base side of the element and backing the element, and a horn connecting portion having one end connected to the body and the other end connected to the backing to connect the body and the backing to each other with the element sandwiched between the body and the backing. At least one of the body, the connecting portion and the backing is formed of metallic glass. The body and the connecting portion can be formed of the metallic glass integrally with each other. A cover covering the element may be included, and the cover, the body and the connecting portion can be formed of the metallic glass integrally with each other.

18 Claims, 22 Drawing Sheets

ULTRASONIC WAVE VIBRATING APPARATUS

BACKGROUND OF THE INVENTION

1. Field of the Invention

This invention relates to an ultrasonic wave vibrating apparatus, an ultrasonic treatment device, an ultrasonic cleaning device and an underwater acoustic sensor.

2. Description of the Related Art

The ultrasonic wave vibrating apparatus is known from Japanese Patent Application KOKAI Publication Nos. 5-95957, 2003-112118, 2003-112120 and 10-429.

Jpn. Pat. Appln. KOKAI Publication No. 5-95957 discloses an ultrasonic therapeutic device as an ultrasonic wave vibrating apparatus. As shown in FIG. 1 of this publication, an ultrasonic vibrating element 2 is arranged on the backside of a horn 6 in a casing 10 of a hand piece 1 of the ultrasonic therapeutic device. Further, a back plate 8 for resonance balance is arranged on the backside of the ultrasonic vibrating element 2. A bolt 11 is extended through the ultrasonic vibrating element 2 and the back plate 8 from the horn 6, and a nut 12 is screwed on the extending end portion of the bolt 11. By fastening the nut 12, the horn 6, the ultrasonic vibrating element 2 and the back plate 8 are unified with each other.

Jpn. Pat. Appln. KOKAI Publication No. 2003-112118 discloses a Langevin type ultrasonic wave vibrating apparatus. As shown in FIG. 4 of this publication, in this ultrasonic wave vibrating apparatus, piezoelectric elements 21, 22 are arranged between a horn 3 and a back mass 1, and a bolt 4 is passed through the piezoelectric elements 21, 22 from the back mass 1, and its forward end is screwed in the horn 3. By tightening the bolt 4, the horn 3, the piezoelectric elements 21, 22 and the back mass 1 are unified with each other.

Jpn. Pat. Appln. KOKAI Publication No. 2003-112120 discloses a Langevin type ultrasonic wave vibrating apparatus. As shown in FIG. 3 of this publication, in an electric signal-mechanical vibration conversion unit 2 of the ultrasonic wave vibrating apparatus, piezoelectric elements 21, 22 are arranged between a horn 3 and a back mass 1. And, the horn 3 and the back mass 1 are screwed on the both end portions of a bolt 4 passed through the piezoelectric elements 21, 22. By rotating the back mass 1 and the horn 3 relatively to each other on the both end portions of the bolt 4 to approach the back mass 1 and the horn 3 each other, the horn 3, the piezoelectric elements 21, 22 and the back mass 1 are unified with each other.

Jpn. Pat. Appln. KOKAI Publication No. 10-429 discloses a Langevin type ultrasonic wave vibrating apparatus. As shown in FIG. 2 of this publication, in the ultrasonic wave vibrating apparatus, a front mass 3a, piezoelectric ceramics 1a, 1b and a back mass 3b are arranged in this order on the backside of a horn 6. A bolt 4 is passed through the front mass 3a, the piezoelectric ceramics 1a, 1b and the back mass 3b. One end portion of this bolt 4 is screwed in the horn 6, and a nut 8 is screwed on the other end portion of the bolt 4. By tightening the nut 8, the horn 6, the front mass 3a, the piezoelectric ceramics 1a, 1b and the back mass 3b are unified with each other.

Each of these conventional ultrasonic wave vibrating apparatuses must have a high dimensional accuracy to transmit ultrasonic wave efficiently, and often requires a high anticorrosiveness. Therefore, these ultrasonic wave vibrating apparatuses are manufactured by machining metal materials such as titanium, titanium alloy, aluminum alloy and nickel-aluminum alloy.

The machine work to these metal materials with a high dimensional accuracy increases a time and cost for manufacturing the conventional ultrasonic wave vibrating apparatuses. Also, a plurality of parts formed of metal materials and assembled with each other tends to loose its combination or separate from each other under the ultrasonic vibrations imposed thereon for a long period of time. This trend increases with a higher ambient temperature.

Recently, a metallic glass has been focused on as a material superior in anticorrosiveness, strength, modulus of elasticity, formability and shape transferability as compared with the metal materials. For example, Jpn. Pat. Appln. KOKAI Publication No. 10-202372, discloses to connect two or more members integrally with each other by using the metallic glass. Also, Jpn. Pat. Appln. KOKAI Publication No. 2000-343205 discloses to transform the metallic glass into a cylindrical shape in its supercooled liquid zone. Further, Jpn. Pat. Appln. KOKAI Publication No. 9-323174 discloses to connect two or more members integrally with each other by using the metallic glass.

BRIEF SUMMARY OF THE INVENTION

An ultrasonic wave vibrating apparatus according to one aspect of this invention and having a forward end and a base end, comprises: a passive element which converts electric energy to ultrasonic vibration; electrodes which supplies electric power to the passive element; a horn body which is arranged in a forward end side of the passive element and which amplifies the ultrasonic vibration; a backing portion which is arranged in a base end side of the passive element and which backs the passive element; and a horn connecting portion which has one end part connected to the horn body and the other end part connected to the backing portion and which connects the horn body and the backing portion to each other with the passive element being sandwiched between the horn body and the backing portion, wherein at least one of the horn body, the horn connecting portion and the backing portion is formed of metallic glass.

An ultrasonic wave vibrating apparatus according to another aspect of this invention and having a forward end and a base end, comprises: a passive element which converts electric energy to ultrasonic vibration; electrodes which supplies electric power to the passive element; a horn body which is arranged in a forward end side of the passive element and which amplifies the ultrasonic vibration; a backing portion which is arranged in a base end side of the passive element and which backs the passive element; a horn connecting portion which has one end part connected to the horn body and the other end part connected to the backing portion and which connects the horn body and the backing portion to each other with the passive element being sandwiched between the horn body and the backing portion; and a cover which includes one end part connected to the horn body and the other end part having an opening and which surrounds the passive element, wherein the horn body, the horn connecting portion and the cover are formed integrally with each other by metallic glass.

An ultrasonic treatment device according to one aspect of this invention, comprises: the ultrasonic wave vibrating apparatus according to the above described other aspect of this invention; a lid adapted to fit the opening at the other end part of the cover of the ultrasonic wave vibrating apparatus; an electric wire which passes through the lid and which supplies electricity to the electrodes of the ultrasonic wave vibrating apparatus; and a protective tube which accommodates the electric wire and which has a flexibility.

An ultrasonic wave vibrating apparatus according to further aspect of this invention and having a forward end and a base end, comprises: a passive element which converts electric energy to ultrasonic vibration; electrodes which supplies electric power to the passive element; a horn body which is arranged in a forward end side of the passive element and which amplifies the ultrasonic vibration; a backing portion which is arranged in a base end side of the passive element and which backs the passive element; and a horn connecting portion which has one end part connected to the horn body and the other end part connected to the backing portion and which surrounds the passive element and which connects the horn body and the backing portion to each other with the passive element being sandwiched between the horn body and the backing portion, wherein the horn body and the horn connecting portion are formed integrally with each other by metallic glass.

An ultrasonic cleaning device according to one aspect of this invention, comprises: an ultrasonic wave vibrating apparatus which has a horn body generating and amplifying ultrasonic vibration, the horn body including metallic glass; and a cleaning bath which includes a bottom wall having an ultrasonic wave vibrating apparatus fixing hole to which the horn body of the ultrasonic wave vibrating apparatus is fixed, wherein the metallic glass of the horn body is softened by being heated to a supercooled liquid temperature zone and then is deformed by being applied with a stress so as to be connected to the ultrasonic wave vibrating apparatus fixing hole of the cleaning bath corresponding thereto.

An underwater acoustic sensor according to one aspect of this invention, comprises: an ultrasonic wave vibrating apparatus which has a horn body generating and amplifying ultrasonic vibration, the horn body including metallic glass; and a hermetic container which includes a bottom wall having an ultrasonic wave vibrating apparatus fixing hole to which the horn body of the ultrasonic wave vibrating apparatus is fixed, wherein the metallic glass of the horn body is softened by being heated to a supercooled liquid temperature zone and then is deformed by being applied with a stress so as to be connected to the ultrasonic wave vibrating apparatus fixing hole of the hermetic container corresponding thereto.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

At first, an ultrasonic wave vibrating apparatus according to a first embodiment of this invention will be explained with reference to FIGS. 1A to 2B.

Figure 1A:
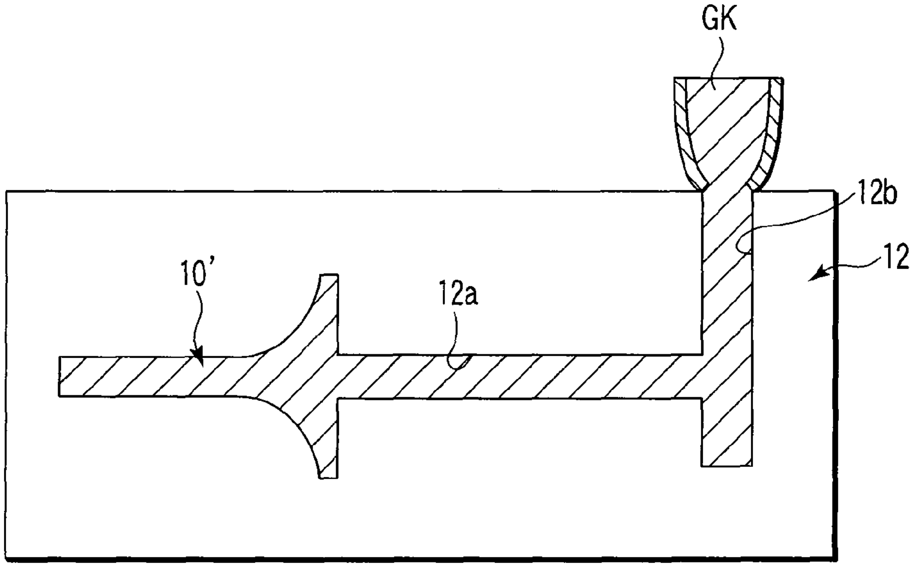
FIG. 1A is a side view schematically showing a state in which a blank of a horn unit of an ultrasonic wave vibrating apparatus according to a first embodiment of this invention is formed by metallic glass while only one lateral half piece of a laterally-two-divided die member is shown.

As shown in FIG. 1A, a blank 10' of a horn unit of the ultrasonic wave vibrating apparatus according to the first embodiment of this invention is formed by entering an alloy (hereinafter referred as a mother alloy) GK in a melted state, which is a base of metallic glass, into a die cavity 12*a* of a laterally-two-divided die member 12 through a melted material inflow path (runner) 12*b*. The mother alloy GK has the same composition as that of the metallic glass but is different from that of the metallic glass in that components of the former composition are crystallized. The mother alloy GK is melted by, for example, an arc. In FIG. 1A, only one lateral half piece of the laterally-two-divided die member 12 is shown along a dividing surface thereof to show the die cavity 12*a* and the melted material inflow path (runner) 12*b*. The die cavity 12*a* is divided into two vertically divided parts along the two dividing surfaces of the two lateral half pieces of the laterally-two-divided die member 12.

The mother alloy GK melted at its melting point is poured into an outer end (gate) of the melted material inflow path (runner) 12*b*. The mother alloy GK which is the base of the metallic glass contains three or more elements including at least one of Ti, Zr and Al. Al is low in acoustic impedance (14 GPa·s/$m^3$). Ti is also low but not so low as Al in acoustic impedance (21 GPa·s/$m^3$) and high in mechanical quality factor Q and strength. Zr has an effect of improving an amorphous formability and enlarging a supercooled liquid zone.

More specifically, the metallic glass used in this embodiment is $Zr_{55}Cu_{30}Al_{10}Ni_5$. However, as long as a desired formation of the blank 10' of the horn unit and a desired performance of a final product from the blank 10' of the horn unit can be obtained, various well known metallic glasses can be used. Examples of these various well known metallic glasses are $Zr_{60}Cu_{30}Al_{10}$, $Ti_{53}Cu_{30}Ni_{15}CO_2$, $Al_{10}Ni_{15}La_{65}Y_{10}$, $Ti_{53}Cu_{15}Ni_{18.5}Hf_3Al_7Si_3B_{0.5}$, $Ti_{40}Zr_{10}Cu_{36}Pd_{14}$, $Ti_{53}Cu_{15}Ni_{18.5}Zr_3Al_7Si_3B_{0.5}$, etc.

In order to solidify the melted mother alloy GK poured into the die cavity 12*a* through the melted material inflow path (runner) 12*b* in a liquid phase, various well known heat radiating and/or cooling structures (not shown) are applied to the laterally-two-divided die member 12. As a result, the melted mother alloy GK poured into the die cavity 12*a* is cooled at a cooling rate of not less than 10 K/sec. Since the melted mother alloy GK poured into the die cavity 12*a* is rapidly cooled and changed to the metallic glass in this way, a superior shape transferability of the metallic glass to the die cavity 12*a* is achieved.

Figure 1B:
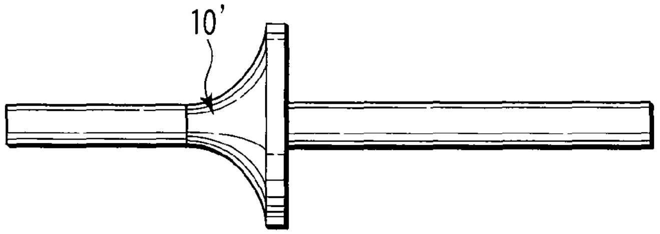
FIG. 1B is a side view schematically showing the blank of the horn unit formed of the metallic glass by using the die member shown in FIG. 1A.

The blank 10' of the horn unit formed of the metallic glass which becomes in a glass solid phase in the die cavity 12*a* and to which the shape of the die cavity 12*a* is transferred, is taken out from the die member 12 after a heat radiation for a predetermined time is finished. In this time, the blank 10' of the horn unit to which the shape of the die cavity 12*a* is transferred has a melted material inflow path corresponding portion having a shape corresponding to the melted material inflow path 12*b*. Subsequently, the melted material inflow path corresponding portion is removed by a machine work, and the blank 10' of the horn unit as shown in FIG. 1B is completed.

Figure 1C:
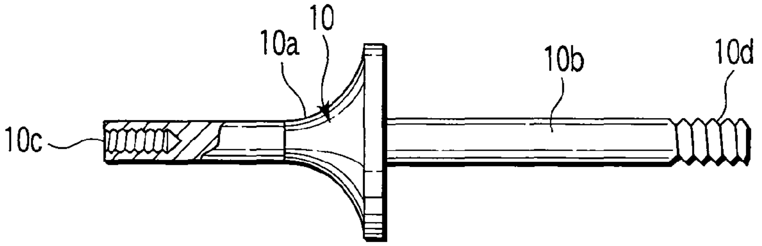
FIG. 1C is a side view schematically showing a final product of the horn unit formed by machining both end parts of the blank of the horn unit shown in FIG. 1B.

Next, both end parts of the blank 10' of the horn unit are applied with a machine work so that a final product of the horn unit 10 shown in FIG. 1C is completed. In this embodiment, the horn unit 10 includes a substantially cone-shaped horn body 10*a* and a shaft-shaped horn connecting portion 10*b* extending in an axial direction from a large-diametrical base end part of the horn body 10*a*. An end surface of a small-diametrical protruded end part of the horn body 10*a*, the protruded end part constituting one end part of the horn unit 10, is formed with a hole 10*c* with an internal thread by a machine work, and an outer peripheral surface of an extended end part of the horn connecting portion 10*b*, the extended end part constituting the other end part of the horn unit 10, is formed with an external thread 10*d* by a machine work.

During these machine works, various well-known cooling measures, such as an application of a cooling medium including a cooling liquid, are required to prevent the temperature of the metallic glass of a machined part of the blank 10' from increasing beyond the glass crystallization temperature (i.e. to prevent the metallic glass from crystallizing).

Figure 2A:
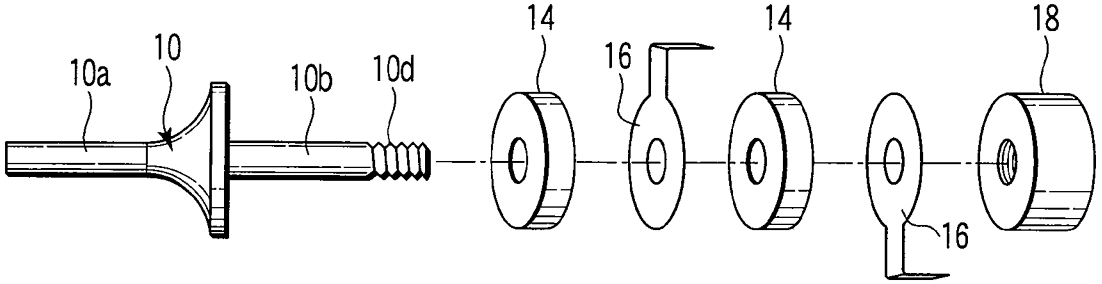
FIG. 2A is a side view schematically showing a state immediately before a plurality of passive elements for generating ultrasonic vibration, electrodes thereof and a backing portion are assembled on the final product of the horn unit shown in FIG. 1C.
Figure 2B:
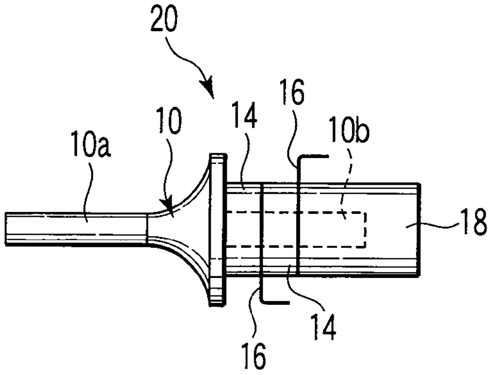
FIG. 2B is a side view schematically showing a final product of the ultrasonic wave vibrating apparatus according to the first embodiment of this invention and manufactured by assembling the horn unit, the plurality of the passive elements, the electrodes thereof and the backing portion shown in FIG. 2A.

A plurality of passive elements 14 and electrodes 16 for the passive elements 14 as shown in FIG. 2A are mounted on the horn connecting portion 10*b* of the horn unit 10 formed of the metallic glass as described above with reference to FIGS. 1A to 1C, and further, a backing portion 18 formed of a conventional metal is mounted thereon. The backing portion 18 is screwed on the external thread 10*b* on the outer peripheral surface of the extended end part of the horn connecting portion 10*b*. By fastening the backing portion 18 toward the horn body 10*a*, the plurality of passive elements 14 with the electrodes 16 are sandwiched between the horn body 10*a* and the backing portion 18 so that the ultrasonic wave vibrating apparatus 20 according to the first embodiment of this invention as shown in FIG. 2B is completed.

Generally, the passive element 14 is formed of piezoelectric ceramics, and the piezoelectric ceramics is comparatively weak against tensile stress. Therefore, in this case, it is preferable that a compressive stress equal to [(the compressive strength of the passive element 14)−(the tensile strength of the passive element 14)]/2 is applied on the passive element 14 when the horn connecting portion 10*b* and the backing portion 18 are connected to each other. For example, the compressive strength of the piezoelectric ceramics is 800 MPa and the tensile strength thereof is 80 MPa. Therefore, in a case that the passive element 14 is formed of piezoelectric ceramics, it is preferable that a compressive stress of 360 MPa is applied to the passive element 14.

The passive elements 14 are well-known piezoelectric elements which generate ultrasonic vibration when they are supplied with high-frequency current through the electrodes 16. The horn body 10*a* amplifies the ultrasonic vibration generated from the passive elements 14 and transmits it to the small-diametrical protruded end part thereof. A chip or probe for applying the ultrasonic vibration not shown is screwed in and fixed to the internal thread of the hole 10*c* at the small-diametrical protruded end part, and the chip or probe is pressed on an object to apply the ultrasonic vibration transmitted thereto in an amplified state to the object. Since the chip or probe for applying ultrasonic vibration not shown is pressed on the object, it is liable to be worn or broken. To facilitate the replacement with a new one, the chip or probe for applying ultrasonic vibration is fixed to be easily removable in the internal thread of the hole 10*c* at the small-diametrical protruded end part of the horn body 10*a*.

Figure 3:
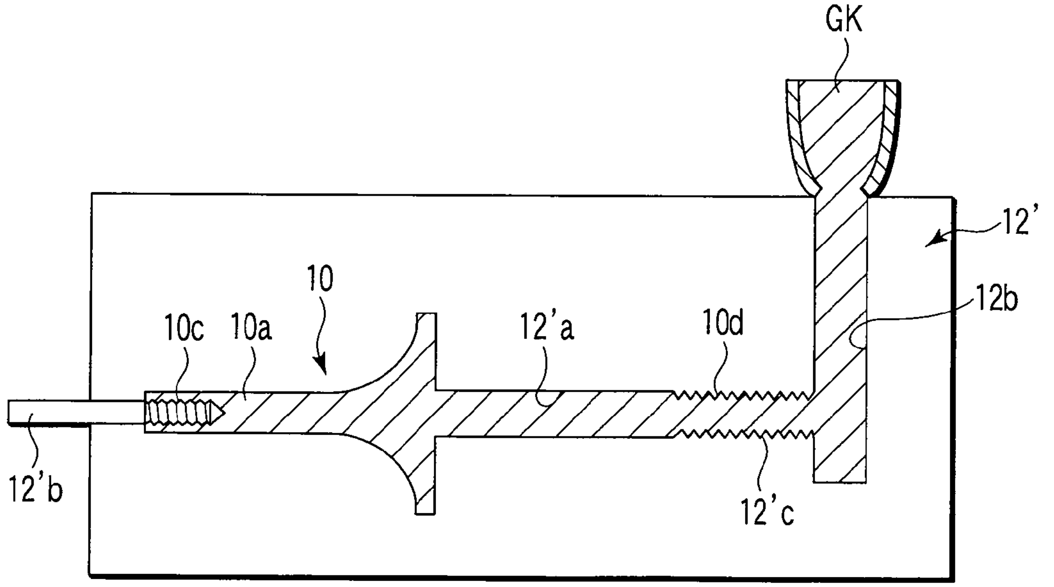
FIG. 3 is a side view schematically showing a state in which the final product of the horn unit of the ultrasonic wave vibrating apparatus according to the first embodiment of this invention is formed by metallic glass without the use of any machine work, while only one lateral half piece of a laterally-two-divided die member is shown.

Next, a process for forming the final product of the horn unit 10 of the ultrasonic wave vibrating apparatus 20 according to the first embodiment of this invention, of the metallic glass without any machine work, will be explained with reference to FIG. 3.

In this process, a core 12'*b* is arranged at a position in the die cavity 12'*a*, which corresponds to the one end part of the final product of the horn unit 10, that is, the small-diametrical protruded end part of the horn body 10*a*, and the core 12'*b* has outer dimensions corresponding to inner dimensions of the hole 10*c* with the internal thread in the end surface of the protruded end part of the horn body 10*a*. Further, an external thread forming shape 12'*c* is formed at a position in the die cavity 12'*a*, which corresponds to the other end part of the final product of the horn unit 10, that is, the small-diametrical protruded end part of the horn connecting portion 10*b*, and the external thread forming shape 12'*c* has inner dimensions corresponding to outer dimensions of the external thread 10*d* formed on the small-diametrical protruded end part of the horn connecting portion 10*b*.

By pouring the melted mother alloy GK into the die cavity 12'*a* of this laterally-two-divided die member 12' through the melted material inflow path (runner) 12*b* and solidifying it in a liquid phase as described above to be changed to the metallic glass. In this way, the metallic glass can exhibit a high shape transferability, so that the final product of the horn unit 10 as shown in FIG. 1C can be formed in the die cavity 12'*a* of the laterally-two-divided die member 12'.

The final product of the horn unit 10 formed of the metallic glass which became the glass solid phase in the die cavity 12'*a* and to which the shape of the die cavity 12'*a* is transferred, is taken out from the die member 12' after a heat radiation for a predetermined time is finished. In this time, the final product of the horn unit 10 to which the shape of the die cavity 12'*a* is transferred, has a melted material inflow path corresponding portion having a shape corresponding to the melted material inflow path (runner) 12*b*. After that, only this melted material inflow path corresponding portion is removed by a machine work.

Further, the core 12'*b* is removed from the one end part of the horn body 10*a* of the final product of the horn unit 10, and a hole 10*c* with an internal thread, to which the shape of the outer peripheral surface of the core 12'*b* is precisely transferred, is left at the position from which the core 12'*b* has been removed.

Figure 4A:
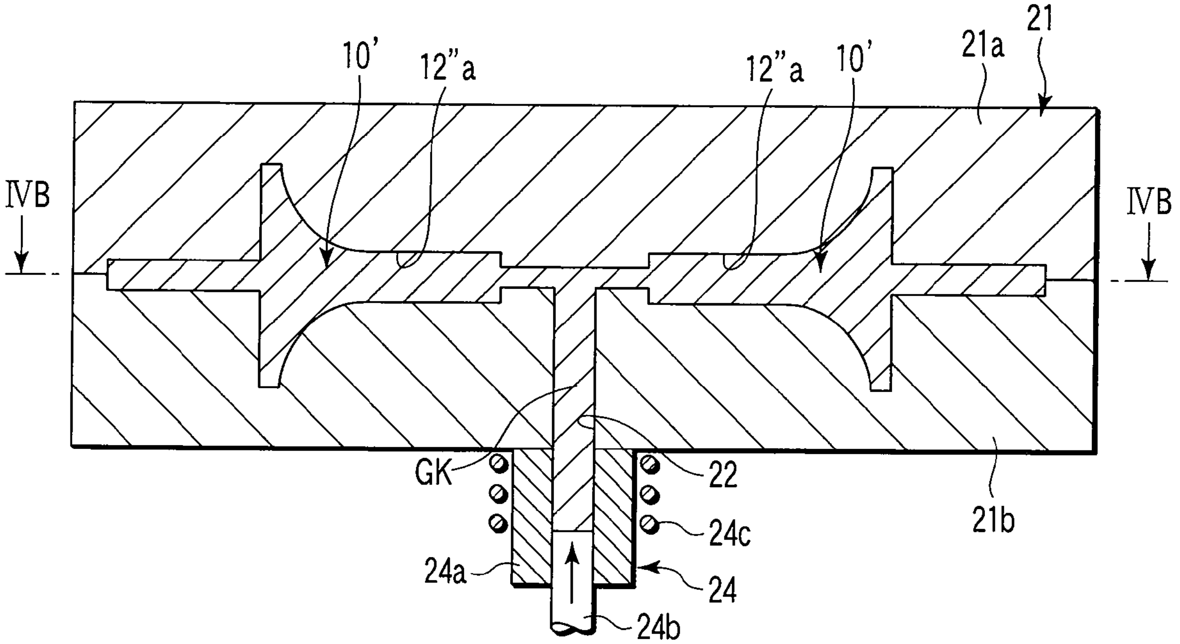
FIG. 4A is a schematic vertical sectional view of a vertically-two-divided die member, showing a state in which a plurality of blanks of the horn units of the ultrasonic wave vibrating apparatuses each according to the first embodiment of the invention are formed by the metallic glass at one time.
Figure 4B:
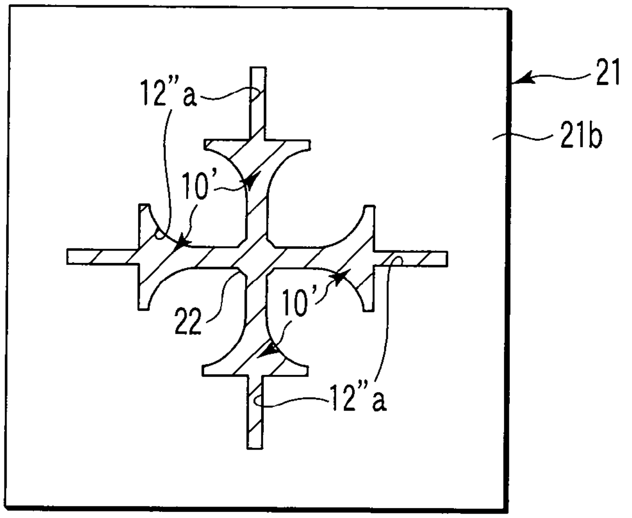
FIG. 4B is a plan view schematically showing only the lower half piece of the vertically-two-divided die member, divided along the dividing line taken in a line IV-IV in FIG. 4A.

Next, a process for forming a plurality of blanks 10' of the horn units 10 of the ultrasonic wave vibrating apparatuses 20, each of which is according to the first embodiment of the invention, of the metallic glass at one time, will be explained with reference to FIGS. 4A and 4B.

In this process, a vertically-two-divided die member 21 in which a plurality of die cavities 12"*a* is formed is prepared, each die cavity 12"*a* being the same as the die cavity 12*a* for forming the blank 10 of the horn unit of the ultrasonic wave vibrating apparatus 20 according to the first embodiment of this invention described above with reference to FIGS. 1A to 2B by the metallic glass.

Each of the plurality of the die cavities 12"*a* is divided into two horizontally divided part along the two dividing surfaces of upper and lower half pieces 21*a*, 21*b* of the vertically-two-divided die member 21.

The plurality of die cavities 12"*a* of the die member 21 are radially arranged with each one end part thereof concentrated at one point, and a melted material inflow path (runner) 22 having an inner end located at the above described one point and an outer end (gate) open to a lower surface of the lower half piece 21*b* is formed in the lower half piece 21*b*.

The outer end (gate) of the melted material inflow path (runner) 22 is connected with an injection port of a well-known melted metal pressurizing/injecting mechanism 24 holding the mother alloy GK melted at the melting point. The melted metal pressurizing/injecting mechanism 24 injects the mother alloy GK melted at the melting point from its injection port under a predetermined pressure into the plurality of the die cavities 12"*a* through the melted material inflow path (runner) 22.

The melted metal pressurizing/injecting mechanism 24 includes a cylinder 24*a* having an inner hole for holding the mother alloy GK melted to the melting point, a piston 24*b* accommodated slidably in the inner hole of the cylinder 24*a* to push out the mother alloy GK melted to the melting point in the inner hole toward the injection port with the predetermined pressure, and a heater 24*c* for maintaining the melted mother alloy GK held in the inner hole of the cylinder 24*a* at a temperature not lower than the melting point.

The melted material inflow path (runner) 22 can be formed in the upper half piece 21*a* of the die member 21. In this case, if the melted mother alloy GK can be poured into each die cavity 12"*a* without any pin holes through the melted material inflow path (runner) 22, the melted mother alloy GK can be poured into the outer end (gate) of the melted material inflow path (runner) 22 by using only gravity while the melted metal pressurizing/injecting mechanism 24 is removed.

Further, as long as the melted mother alloy GK can be poured into each of the plurality of die cavities 12"*a* without any pin holes through the melted material inflow path (runner) 22, the plurality of die cavities 12"*a* can be arranged in the die member 21 in various patters other than radially.

Furthermore, each of the die cavities 12"*a* described above with reference to FIGS. 4A and 4B may be the same as the die cavity 12'*a* for the final product of the horn unit 10 of the ultrasonic wave vibrating apparatus 20 according to the first embodiment explained above with reference to FIG. 3.

Further, various well-known heat radiating and/or cooling structures (not shown) are applied to the die member 21 in order to solidify the melted mother alloy GK poured into the die cavity 12"*a* through the melted material inflow path (runner) 22 while maintaining in a liquid phase. As a result, the melted mother alloy GK poured into the plurality of die cavities 12"*a* is cooled at a cooling rate not lower than 10 K/sec. Since the melted mother alloy GK poured into the plurality of die cavities 12"*a* is rapidly cooled into the metallic glass in this way, a high shape transferability of the metallic glass to the plurality of die cavities 12"*a* is achieved.

The ultrasonic wave vibrating apparatus 20 according to the first embodiment described above with reference to FIGS. 1A to 4B is used by being mounted on an ultrasonic coagulating/cutting-out device used in, for example, a laparoscopic operation.

Second Embodiment

Next, a process for forming a blank of a horn connecting portion of a horn unit of an ultrasonic wave vibrating apparatus according to a second embodiment of this invention, of metallic glass will be explained with reference to FIGS. 5A to 5C.

Figure 5A:
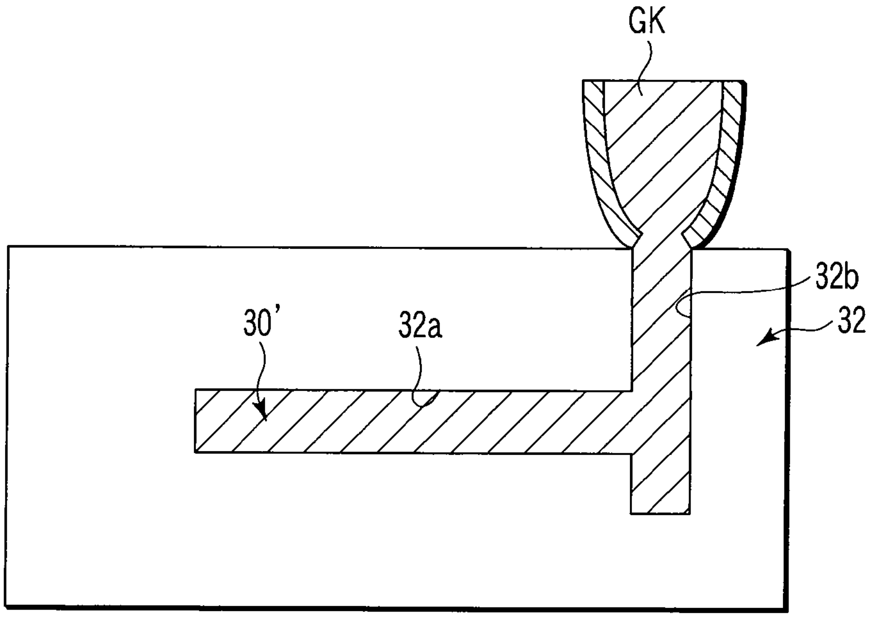
FIG. 5A is a side view schematically showing a state in which a blank of a horn connecting portion of a horn unit of an ultrasonic wave vibrating apparatus according to a second embodiment of this invention is formed by metallic glass while only one lateral half piece of a laterally-two-divided die member is shown.
Figure 5B:
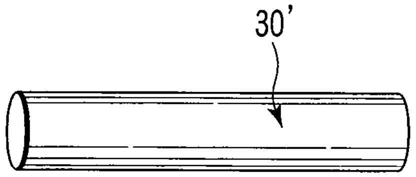
FIG. 5B is a side view schematically showing the blank of the horn connecting portion formed of the metallic glass by using the die member shown in FIG. 5A.

As shown in FIG. 5A, the blank 30' of the horn connecting portion of the horn unit of the ultrasonic wave vibrating apparatus according to the second embodiment of this invention is formed by entering an alloy (hereinafter referred as a mother alloy) GK in a melted state, which is a base of metallic glass, into a die cavity 32*a* of a laterally-two-divided die member 32 through a melted material inflow path (runner) 32*b*. The mother alloy GK has the same composition as that of the metallic glass but is different from that of the metallic glass in that components of the former composition are crystallized. The mother alloy GK is melted by, for example, an arc.

In FIG. 5A, only one lateral half piece of the laterally-two-divided die member 32 is shown along a dividing surface thereof to show the die cavity 32*a* and the melted material inflow path (runner) 32*b*. The die cavity 32*a* is divided into two vertically divided parts along the two dividing surfaces of the two lateral half pieces of the laterally-two-divided die member 32.

The mother alloy GK melted at its melting point is poured into an outer end (gate) of the melted material inflow path (runner) 32*b*.

In order to solidify the melted mother alloy GK poured into the die cavity 32*a* through the melted material inflow path (runner) 32*b* in a liquid phase so that the melted mother alloy GK is changed to the metallic glass, various well known heat radiating and/or cooling structures (not shown) are applied to the laterally-two-divided die member 32. As a result, the melted mother alloy GK poured into the die cavity 32*a* is cooled at a cooling rate of not less than 10 K/sec. Since the melted mother alloy GK poured into the die cavity 32*a* is rapidly cooled and changed to the metallic glass in this way, a superior shape transferability of the metallic glass to the die cavity 32*a* is achieved.

The blank 30' of the horn connecting portion formed of the metallic glass which becomes in a glass solid phase in the die cavity 32*a* and to which the shape of the die cavity 32*a* is transferred, is taken out from the die member 32 after a heat radiation for a predetermined time is finished. In this time, the blank 30' of the horn connecting portion to which the shape of the die cavity 32*a* is transferred has a melted material inflow path corresponding portion having a shape corresponding to the melted material inflow path 32*b*. Subsequently, the melted material inflow path corresponding portion is removed by a machine work, and the blank 30' of the horn connecting portion as shown in FIG. 5B is completed.

Figure 5C:
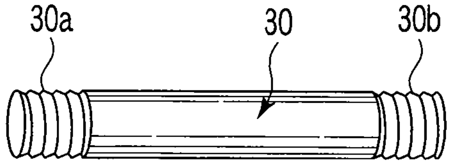
FIG. 5C is a side view schematically showing a final product of the horn connecting portion formed by machining both end portions of the blank of the horn connecting portion shown in FIG. 5B.

Next, both end parts of the blank 30' of the horn connecting portion are applied with a machine work so that a final product of the horn connecting portion 30 shown in FIG. 5C is completed.

In this embodiment, the both end parts of the blank 30' of the horn connecting portion are formed with external threads 30*a*, 30*b* by the machine work. During these machine works, various well-known cooling measures, such as an application of a cooling medium including a cooling liquid, are required to prevent the temperature of the metallic glass of the machined parts of the blank 30' from increasing beyond the glass crystallization temperature (i.e. to prevent the metallic glass from crystallizing).

Figure 6:
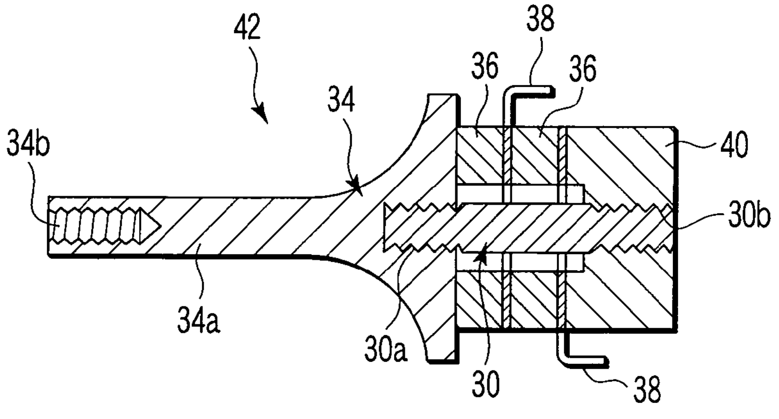
FIG. 6 is a side view schematically showing a final product of the ultrasonic wave vibrating apparatus according to the second embodiment of the invention, manufactured by assembling a horn body, a plurality of passing elements, electrodes thereof and a backing portion by using the horn connecting portion shown in FIG. 5C.

In FIG. 6, a vertical section of the ultrasonic wave vibrating apparatus 32 according to this embodiment is schematically shown. The horn unit 34 of this ultrasonic wave vibrating apparatus 32 includes a substantially cone-shaped horn body 34*a* formed of conventional metal and a shaft-shaped horn connecting portion 30 extending in an axial direction from a large-diametrical base end part of the horn body 34*a* and formed of the metallic glass as described above. An end surface of a small-diametrical protruded end part of the horn body 34*a*, the protruded end part constituting one end part of the horn unit 34, is formed with a hole 34*b* with an internal thread by a machine work, and the external thread 30*a* on the outer peripheral surface of the one end part of the horn connecting portion 30 is screwed in and fixed to a center of an end surface of a large-diametrical base end part of the horn body 34*a*.

A plurality of passive elements 36 and electrodes 38 for the passive elements 36 are mounted on the horn connecting portion 30 formed of the metallic glass, and further a backing portion 40 formed of a conventional metal is mounted thereon, as shown in FIG. 6. The backing portion 40 is screwed on the external thread 30*b* on the outer peripheral surface of the extended end part of the horn connecting portion 30. By fastening the backing portion 40 toward the horn body 34*a*, the plurality of passive elements 36 with the electrodes 38 are sandwiched between the horn body 34*a* and the backing portion 40 so that the ultrasonic wave vibrating apparatus 42 according to the second embodiment of this invention as shown in FIG. 6 is completed.

Generally, the passive element 36 is formed of piezoelectric ceramics, and the piezoelectric ceramics is comparatively weak against tensile stress. Therefore, in this case, it is preferable that a compressive stress equal to [(the compressive strength of the passive element 36)−(the tensile strength of the passive element 36)]/2 is applied on the passive element 36 when the horn body 34*a* and the backing portion 40 are connected to each other by the horn connecting portion 30. For example, the compressive strength of the piezoelectric ceramics is 800 MPa and the tensile strength thereof is 80 MPa. Therefore, in a case that the passive element 36 is formed of piezoelectric ceramics, it is preferable that a compressive stress of 360 MPa is applied to the passive element 36.

The passive elements 36 are well-known piezoelectric elements which generate ultrasonic vibration when they are supplied with high-frequency current through the electrodes 38. The horn body 34*a* amplifies the ultrasonic vibration generated from the passive elements 36 and transmits it to the small-diametrical protruded end part thereof. A chip or probe for applying the ultrasonic vibration not shown is screwed in and fixed to the internal thread of the hole 34*b* at the small-diametrical protruded end part, and the chip or probe is pressed on an object to apply the ultrasonic vibration transmitted thereto in an amplified state to the object. Since the chip or probe for applying ultrasonic vibration not shown is pressed on the object, it is liable to be worn or broken. To facilitate the replacement with a new one, the chip or probe for applying ultrasonic vibration is fixed to be easily removable in the internal thread of the hole 34*b* at the small-diametrical protruded end part of the horn body 34*a*.

Figure 7:
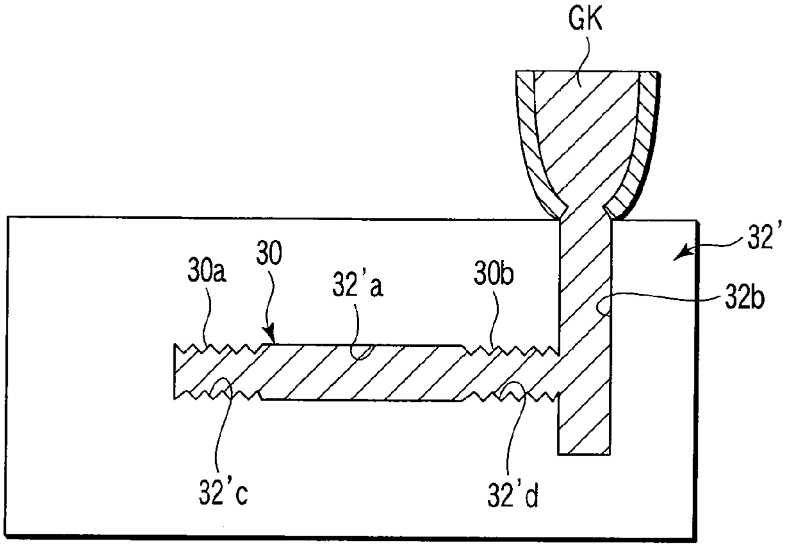
FIG. 7 is a side view schematically showing a state in which the final product of the horn connecting portion shown in FIG. 5C is formed by metallic glass without the use of any machine work, while only one lateral half piece of a laterally-two-divided die member is shown.

Next, a process for forming the final product of the horn connecting portion 30 of the horn unit 34 of the ultrasonic wave vibrating apparatus 42 according to the second embodiment of this invention, of the metallic glass without any machine work, will be explained with reference to FIG. 7.

In this process, external thread forming shapes 32'*c*, 32'*d* are formed at positions in the die cavity 32'*a* of the laterally-two-divided die member 32', which correspond to the both end parts of the final product of the horn connecting portion 30, and each of the external thread forming shapes 32'*c*, 32'*d* has inner dimensions corresponding to outer dimensions of each of the external threads 30*a*, 30*b* formed on the outer peripheral surfaces of the both end parts of the final product of the horn connecting portion 30.

By pouring the melted mother alloy GK into the die cavity 32'*a* of this laterally-two-divided die member 32' through the melted material inflow path (runner) 32*b* and solidifying it in a liquid phase as described above to be changed to the metallic glass. In this way, the metallic glass can exhibit a high shape transferability, so that the final product of the horn connecting portion 30 as shown in FIG. 5C can be formed in the die cavity 32'*a* of the laterally-two-divided die member 32'.

The final product of the connecting portion 30 formed of the metallic glass which became the glass solid phase in the die cavity 32'*a* and to which the shape of the die cavity 32'*a* is transferred, is taken out from the die member 32' after a heat radiation for a predetermined time is finished. In this time, the final product of the horn connecting portion 30 to which the shape of the die cavity 32'*a* is transferred, has a melted material inflow path corresponding portion having a shape corresponding to the melted material inflow path (runner) 32*b*. After that, only this melted material inflow path corresponding portion is removed by a machine work.

Third Embodiment

Next, a process for forming a horn connecting portion of a horn unit and a backing portion in an ultrasonic wave vibrating apparatus according to a third embodiment of this invention, of metallic glass will be explained with reference to FIGS. 8A and 8B.

Figure 8A:
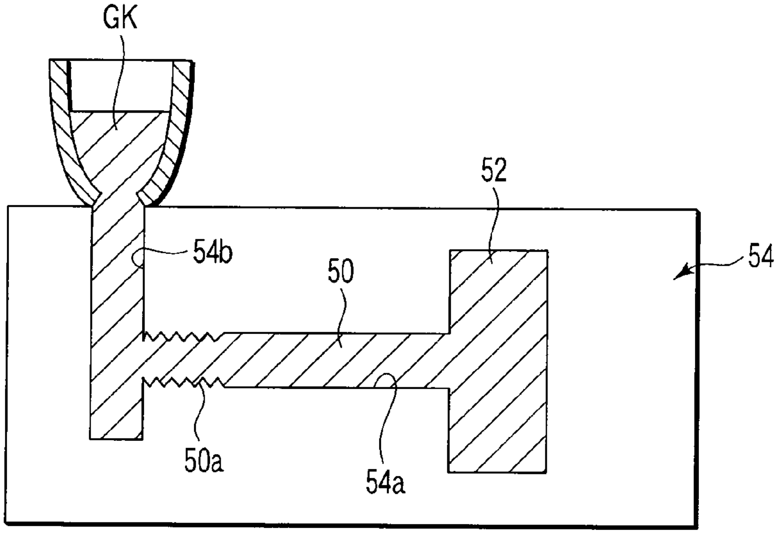
FIG. 8A is a side view schematically showing a state in which a horn connecting portion and a backing portion in a horn unit of an ultrasonic wave vibrating apparatus according to a third embodiment of this invention are formed of the metallic glass, while only one lateral half piece of a laterally-two-divided die member is shown.

As shown in FIG. 8A, a combination the horn connecting portion 50 of the horn unit and the backing portion 52 in the ultrasonic wave vibrating apparatus according to the third embodiment of this invention, is formed by entering an alloy (hereinafter referred as a mother alloy) GK in a melted state, which is a base of metallic glass, into a die cavity 54*a* of a laterally-two-divided die member 54 through a melted material inflow path (runner) 54*b*. The mother alloy GK has the same composition as that of the metallic glass but is different from that of the metallic glass in that components of the former composition are crystallized. The mother alloy GK is melted by, for example, an arc.

In FIG. 8A, only one lateral half piece of the laterally-two-divided die member 54 is shown along a dividing surface thereof to show the die cavity 54*a* and the melted material inflow path (runner) 54*b*. The die cavity 54*a* is divided into two vertically divided parts along the two dividing surfaces of the two lateral half pieces of the laterally-two-divided die member 54.

The mother alloy GK melted at its melting point is poured into an outer end (gate) of the melted material inflow path (runner) 54*b*.

In order to solidify the melted mother alloy GK poured into the die cavity 54*a* through the melted material inflow path (runner) 54*b* in a liquid phase so that the melted mother alloy GK is changed to the metallic glass, various well known heat radiating and/or cooling structures (not shown) are applied to the laterally-two-divided die member 54. As a result, the melted mother alloy GK poured into the die cavity 54*a* is cooled at a cooling rate of not less than 10 K/sec. Since the melted mother alloy GK poured into the die cavity 54*a* is rapidly cooled and changed to the metallic glass in this way, a superior shape transferability of the metallic glass to the die cavity 54*a* is achieved.

The combination of the horn connecting portion 50 and the backing portion 52, formed of the metallic glass which becomes in a glass solid phase in the die cavity 54*a* and to which the shape of the die cavity 54*a* is transferred, is taken out from the die member 54 after a heat radiation for a predetermined time is finished. In this time, the combination of the horn connecting portion 50 and the backing portion 52, to which the shape of the die cavity 54*a* is transferred, has a melted material inflow path corresponding portion having a shape corresponding to the melted material inflow path 12*b*. Subsequently, the melted material inflow path corresponding portion is removed by a machine work, and the combination of the horn connecting portion 50 and the backing portion 52 as shown in FIG. 8B is completed.

In this combination, an external thread 50*a* is formed on an outer peripheral surface of one end part of the horn connecting portion 50 opposite to the backing portion 52, and the other end part of the horn connecting portion 50 is integrally connected to and fixed to the backing portion 52.

In place of forming an external thread forming shape for forming the external thread 50*a* on the outer peripheral surface of the one end part of the horn connecting portion 50, at a position in the die cavity 54*a* of the laterally-two-divided die member 54 corresponding to the outer peripheral surface of the one end part of the horn connecting portion 50 opposite to the backing portion 52, the external thread 50*a* can be formed on the outer peripheral surface of the one end part of the horn connecting portion 50 by a machine work.

However, during this machine work, various well-known cooling measures, such as an application of a cooling medium including a cooling liquid, are required to prevent the temperature of the metallic glass of the machined part from increasing beyond the glass crystallization temperature (i.e. to prevent the metallic glass from crystallizing).

Figure 8B:
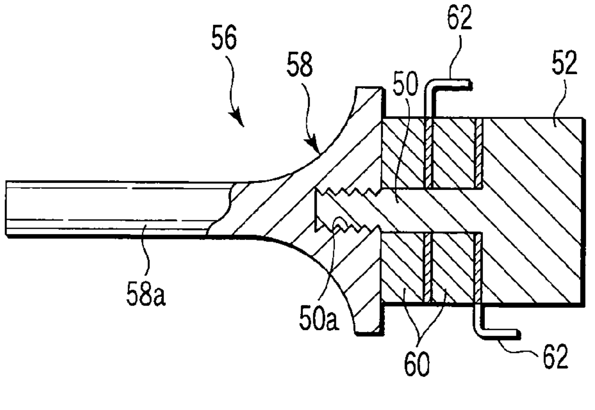
FIG. 8B is a side view schematically showing a final product of the ultrasonic wave vibrating apparatus according to the third embodiment of this invention and manufactured by assembling a horn body, a plurality of passive elements and electrodes thereof on the horn connecting portion with the backing portion shown in FIG. 8A.

FIG. 8B schematically shows a vertical section of the ultrasonic wave vibrating apparatus 56 according to this embodiment, a horn unit 58 of this ultrasonic wave vibrating apparatus 56 includes a substantially cone-shaped horn body 58*a* formed of a conventional metal and a shaft-shaped horn connecting portion 50 extending in an axial direction from a large-diametrical base end part of the horn body 58*a* and formed of the metallic glass as described above. The other end part of the horn connecting portion 50 opposite to the horn body 58*a* is integrally connected to the backing portion 52 as described above.

A plurality of passive elements 60 and electrodes 62 for the passive elements 60 are mounted on the horn connecting portion 50 integrally formed with the backing portion 52 by the metallic glass from the one end part of the horn connecting portion 50 opposite to the backing portion 52, as shown in FIG. 8B. After that, the external thread 50*a* on the outer peripheral surface of the one end part of the horn connecting portion 50 is screwed in and fixed to the a center of an end surface of the large-diametrical base end part of the horn body 58*a*.

By using the external thread 50*a* on the outer peripheral surface of the one end part of the horn connecting portion 50 to fasten the backing portion 52 toward the horn body 58*a*, the plurality of passive elements 60 with the electrodes 62 are sandwiched between the horn body 58*a* and the backing portion 52 so that the ultrasonic wave vibrating apparatus 56 according to the third embodiment of this invention as shown in FIG. 8B is completed.

Generally, the passive element 60 is formed of piezoelectric ceramics, and the piezoelectric ceramics is comparatively weak against tensile stress. Therefore, in this case, it is preferable that a compressive stress equal to [(the compressive strength of the passive element 60)−(the tensile strength of the passive element 60)]/2 is applied on the passive element 60 when the horn connecting portion 50 is connected to the horn body 58*a*. For example, the compressive strength of the piezoelectric ceramics is 800 MPa and the tensile strength thereof is 80 MPa. Therefore, in a case that the passive element 60 is formed of piezoelectric ceramics, it is preferable that a compressive stress of 360 MPa is applied to the passive element 60.

The passive elements 60 are well-known piezoelectric elements which generate ultrasonic vibration when they are supplied with high-frequency current through the electrodes 62. The horn body 58*a* amplifies the ultrasonic vibration generated from the passive elements 60 and transmits it to the small-diametrical protruded end part thereof. A chip or probe (not shown) which is used to be pressed on an object to apply the ultrasonic vibration transmitted thereto in an amplified state to the object can be removably fixed to the small-diametrical protruded end part.

Fourth Embodiment

Next, an ultrasonic wave vibrating apparatus according to a fourth embodiment of this invention will be explained with reference to FIGS. 9A to 9E.

Figure 9A:
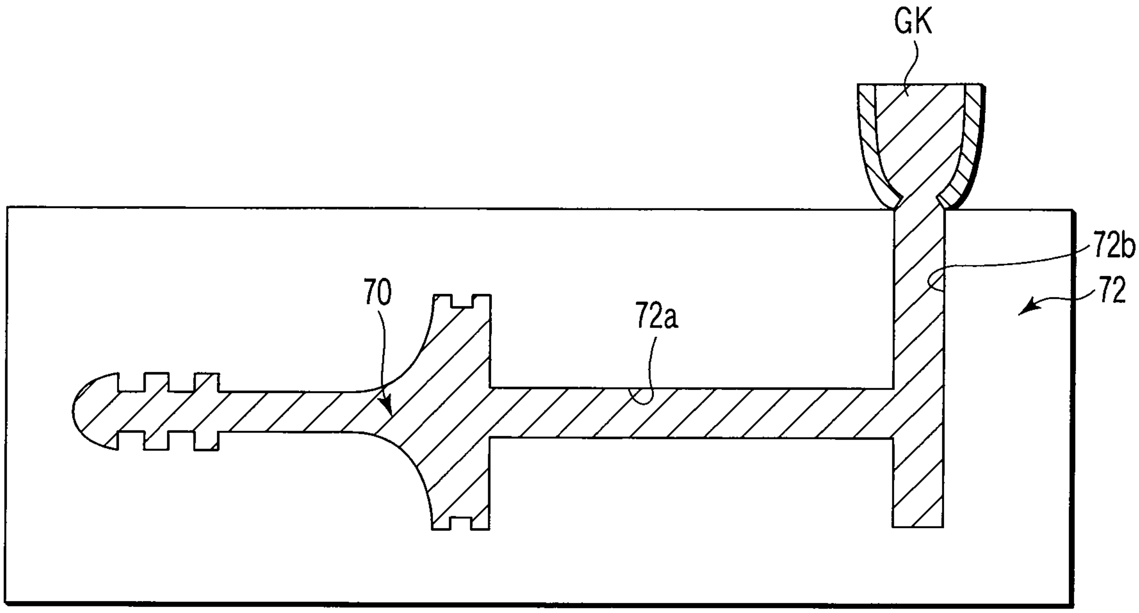
FIG. 9A is a side view schematically showing a state in which the whole horn unit of an ultrasonic wave vibrating apparatus according to a fourth embodiment of this invention is formed of metallic glass, while only one lateral half piece of a laterally-two-divided die member is shown.

As shown in FIG. 9A, a horn unit 70 of the ultrasonic wave vibrating apparatus according to the fourth embodiment of this invention is formed by entering an alloy (hereinafter referred as a mother alloy) GK in a melted state, which is a base of metallic glass, into a die cavity 72*a* of a laterally-two-divided die member 72 through a melted material inflow path (runner) 72*b*. The mother alloy GK has the same composition as that of the metallic glass but is different from that of the metallic glass in that components of the former composition are crystallized. The mother alloy GK is melted by, for example, an arc.

In FIG. 9A, only one lateral half piece of the laterally-two-divided die member 72 is shown along a dividing surface thereof to show the die cavity 72*a* and the melted material inflow path (runner) 72*b*. The die cavity 72*a* is divided into two vertically divided parts along the two dividing surfaces of the two lateral half pieces of the laterally-two-divided die member 72.

The mother alloy GK melted at its melting point is poured into an outer end (gate) of the melted material inflow path (runner) 72*b*.

In order to solidify the melted mother alloy GK poured into the die cavity 72*a* through the melted material inflow path (runner) 72*b* in a liquid phase so that the melted mother alloy GK is changed to the metallic glass, various well known heat radiating and/or cooling structures (not shown) are applied to the laterally-two-divided die member 72. As a result, the melted mother alloy GK poured into the die cavity 72*a* is cooled at a cooling rate of not less than 10 K/sec. Since the melted mother alloy GK poured into the die cavity 72*a* is rapidly cooled and changed to the metallic glass in this way, a superior shape transferability of the metallic glass to the die cavity 72*a* is achieved.

The whole horn unit 72 formed of the metallic glass which becomes in a glass solid phase in the die cavity 72*a* and to which the shape of the die cavity 72*a* is transferred, is taken out from the die member 72 after a heat radiation for a predetermined time is finished. In this time, the horn unit 70 to which the shape of the die cavity 72*a* is transferred has a melted material inflow path corresponding portion having a shape corresponding to the melted material inflow path 72*b*. Subsequently, the melted material inflow path corresponding portion is removed by a machine work, and the horn unit 70 as shown in FIG. 9B is completed.

In this embodiment, the horn unit 70 includes a substantially cone-shaped horn body 70*a*, a shaft-shaped horn connecting portion 70*b* extending in an axial direction from a large-diametrical base end part of the horn body 70*a*, and shaft-shaped extended end treatment portion 70*c* extending in the axial direction from a small-diametrical protruded end part of the horn body 70*a*.

Figure 9B:
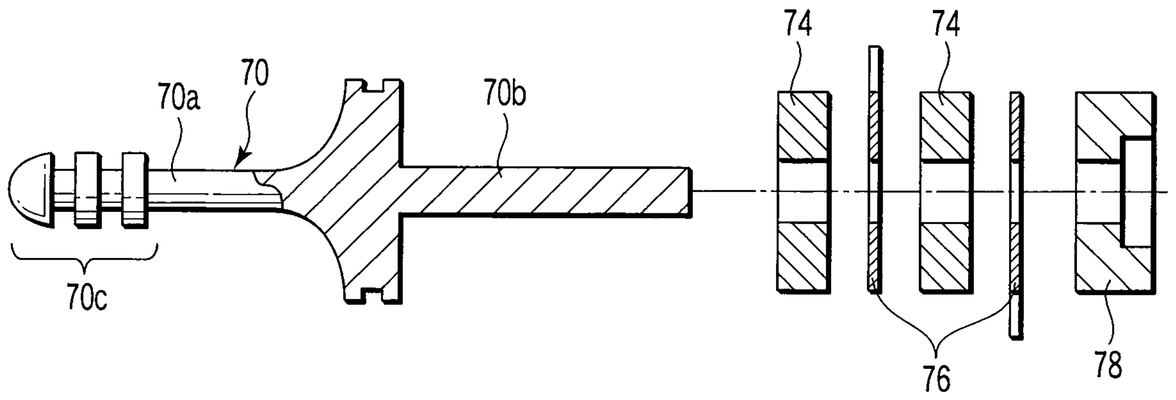
FIG. 9B is a vertical sectional view schematically showing the horn unit formed of the metallic glass by using the die member shown in FIG. 9A, together with a plurality of passive elements, electrodes thereof and a backing portion which will be assembled on a horn connecting portion of the horn unit.

A plurality of passive elements 74 and electrodes 76 for the passive elements 74 are mounted on the horn connecting portion 70*b* of the horn unit 70, the whole of which is formed the metallic glass, and further a backing portion 78 formed of the conventional metal is mounted thereon, as shown in FIG. 9B. Specifically, these mountings are performed while the large-diametrical base end part of the horn unit 70, the whole of which is formed the metallic glass, is supported by a jig 80, as shown in FIG. 9C.

Figure 9C:
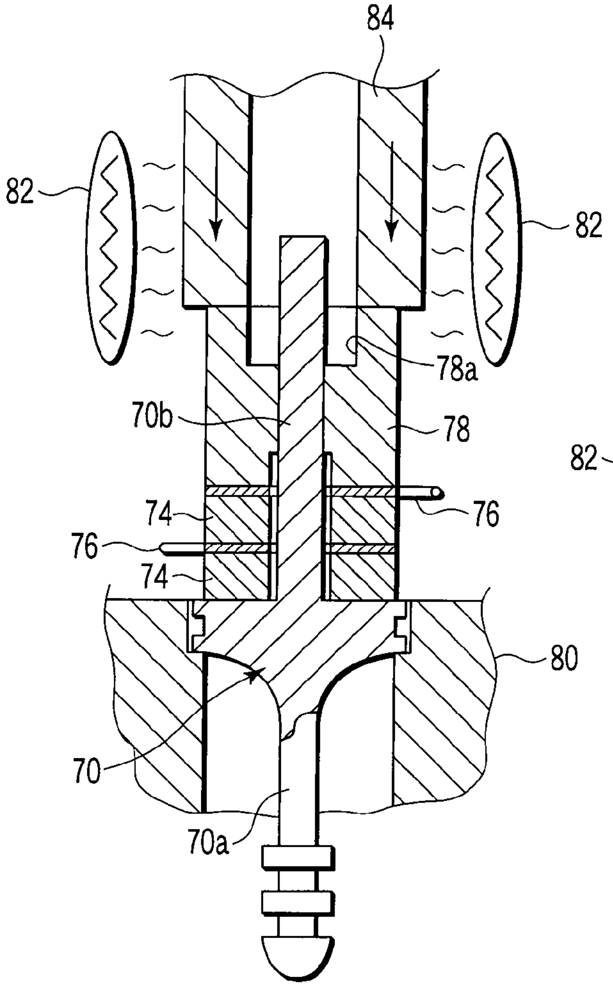
FIG. 9C is a vertical sectional view schematically showing a state in which the plurality of passive elements, the electrodes thereof and the backing portion are assembled on the horn connecting portion of the horn unit shown in FIG. 9B, by using a jig and a deforming member.

Further, as shown in FIG. 9C, the extended end part of the horn connecting portion 70*b* of the horn unit 70 is passed through a hole formed in the backing portion 78. A cylindrical pressing member 84 having a heater 82 on the outer peripheral surface thereof is pressed against an outer end of the backing portion 78. The pressing member 84 is formed of a material having high heat conductivity, and heats the extended end part of the horn connecting portion 70*b* of the horn unit 70 protruded from the backing portion 78 to the supercooled liquid temperature zone (glass transition temperature) of the metallic glass and maintains it in that zone.

During this time, it is important that the temperature of the plurality of the passive elements 74 does not exceed the Curie point at which the characteristics of the passive elements 74 are lost.

Figure 9D:
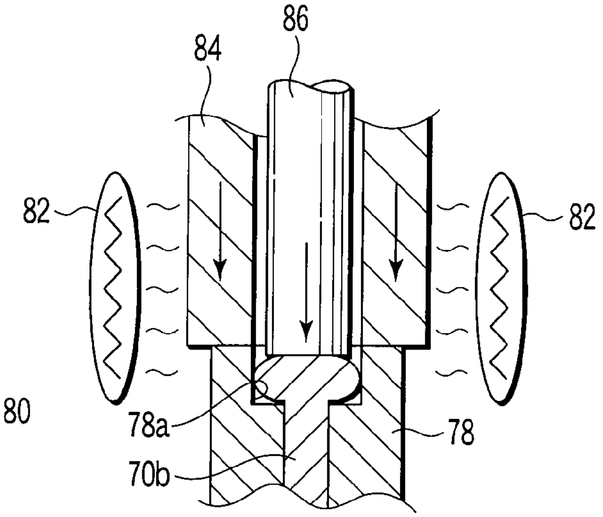
FIG. 9D is a vertical sectional view schematically showing a state in which a protruded end part of the horn connecting portion is heated and is deformed by a deforming member in order to sandwich the plurality of passive elements and the electrodes thereof assembled on the horn connecting portion of the horn unit in FIG. 9C between a horn body of the horn unit and the backing portion.

Further, during this time, as shown in FIG. 9D, a deforming member 86 inserted in a center hole of the pressing member 84 presses the extended end part of the horn connecting portion 70*b* strongly to deform and crush the extended end part, so that the deformed extended end part of the horn connecting portion 70*b* engages with a diametrically enlarged part 78*a* of the through hole at the outer end of the backing portion 78.

Then, after the heater 82 stops heating and the temperature of the extended end part of the horn connecting portion 70*b* drops below the supercooled liquid temperature zone of the metallic glass, i.e. below the glass transition temperature, the pressing member 84, together with the deforming member 86, is moved away from the outer end of the backing portion 78.

Figure 9E:
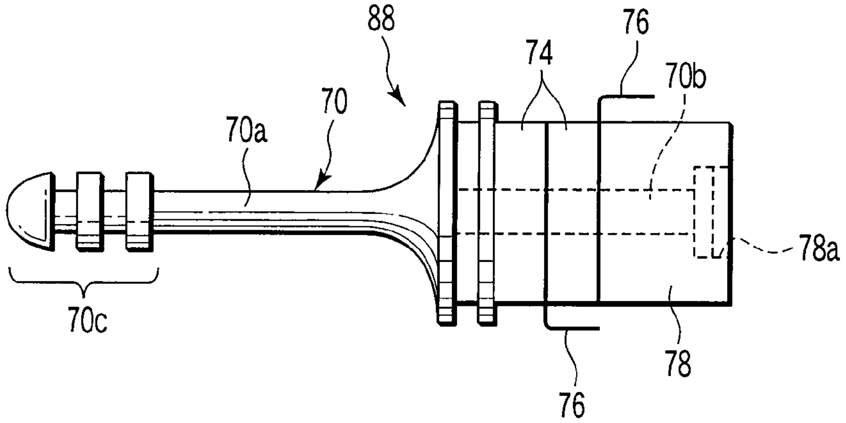
FIG. 9E is a side view schematically showing a final product of the ultrasonic wave vibrating apparatus according to the fourth embodiment of the invention and manufactured by sandwiching the plurality of passive elements and the electrodes thereof between the horn body and the backing portion by the horn connecting portion shown in FIG. 9B.

As a result, the plurality of passive elements 74 with the electrodes 76 are sandwiched between the horn body 70*a* and the backing portion 78. Thus, the ultrasonic wave vibrating apparatus 88 according to the fourth embodiment of this invention shown in FIG. 9E is completed.

Generally, the passive element 74 is formed of piezoelectric ceramics, and the piezoelectric ceramics is comparatively weak against tensile stress. Therefore, in this case, it is preferable that a compressive stress equal to [(the compressive strength of the passive element 74)−(the tensile strength of the passive element 74)]/2 is applied on the passive element 74 when the backing portion 78 is connected to the horn connecting portion 70*b*. For example, the compressive strength of the piezoelectric ceramics is 800 MPa and the tensile strength thereof is 80 MPa. Therefore, in a case that the passive element 74 is formed of piezoelectric ceramics, it is preferable that a compressive stress of 360 MPa is applied to the passive element 74.

The passive elements 74 are well-known piezoelectric elements which generate ultrasonic vibration when they are supplied with high-frequency current through the electrodes 76. The horn body 70*a* amplifies the ultrasonic vibration generated from the passive elements 74 and transmits it to the extended end treatment portion 70*c*.

The ultrasonic wave vibrating apparatus 88 of this embodiment is mounted on, for example, an ultrasonic treatment device for an endoscope and used to remove an early-stage cancer, etc. Nevertheless, the ultrasonic wave vibrating apparatus 88 of this embodiment may be used in other applications, for example it may be mounted on and used in the ultrasonic coagulating/cutting-open device for a laparoscopic operation, like the above described ultrasonic wave vibrating apparatus 20 according to the first embodiment. In such a case, an internal thread is formed in the extended end treatment portion 70*c* at the small-diametrical protruded end part of the horn body 70*a*, and a chip or probe for applying ultrasonic vibration, not shown, is screwed in the internal thread.

Fifth Embodiment

Next, a process for forming a blank of a horn connecting portion of a horn unit of an ultrasonic wave vibrating apparatus according to a fifth embodiment of this invention, of metallic glass will be explained with reference to FIGS. 10A to 11B.

Figure 10A:
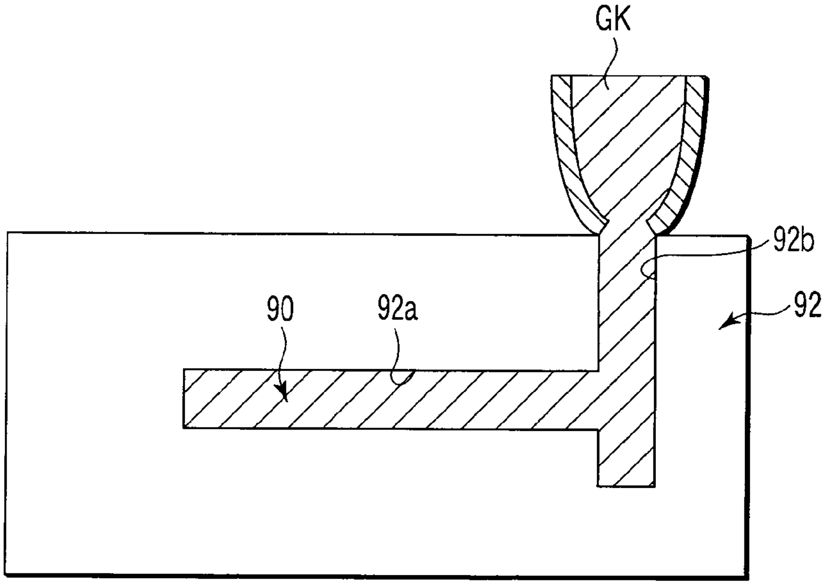
FIG. 10A is a side view schematically showing a state in which a horn connecting portion of a horn unit of an ultrasonic wave vibrating apparatus according to a fifth embodiment of this invention is formed of metallic glass, while only one lateral half piece of a laterally-two-divided die member is shown.

As shown in FIG. 10A, the horn connecting portion 90 of the horn unit of the ultrasonic wave vibrating apparatus according to the fifth embodiment of this invention is formed by entering an alloy (hereinafter referred as a mother alloy) GK in a melted state, which is a base of metallic glass, into a die cavity 92*a* of a laterally-two-divided die member 92 through a melted material inflow path (runner) 92*b*. The mother alloy GK has the same composition as that of the metallic glass but is different from that of the metallic glass in that components of the former composition are crystallized. The mother alloy GK is melted by, for example, an arc.

In FIG. 10A, only one lateral half piece of the laterally-two-divided die member 92 is shown along a dividing surface thereof to show the die cavity 92*a* and the melted material inflow path (runner) 92*b*. The die cavity 92*a* is divided into two vertically divided parts along the two dividing surfaces of the two lateral half pieces of the laterally-two-divided die member 92.

The mother alloy GK melted at its melting point is poured into an outer end (gate) of the melted material inflow path (runner) 92*b*.

In order to solidify the melted mother alloy GK poured into the die cavity 92*a* through the melted material inflow path (runner) 92*b* in a liquid phase, various well known heat radiating and/or cooling structures (not shown) are applied to the laterally-two-divided die member 92. As a result, the melted mother alloy GK poured into the die cavity 92*a* is cooled at a cooling rate of not less than 10 K/sec. Since the melted mother alloy GK poured into the die cavity 92*a* is rapidly cooled and changed to the metallic glass in this way, a superior shape transferability of the metallic glass to the die cavity 92*a* is achieved.

The horn connecting portion 90 formed of the metallic glass which becomes in a glass solid phase in the die cavity 92*a* and to which the shape of the die cavity 92*a* is transferred, is taken out from the die member 92 after a heat radiation for a predetermined time is finished. In this time, the horn connecting portion 90 to which the shape of the die cavity 92*a* is transferred has a melted material inflow path corresponding portion having a shape corresponding to the melted material inflow path 92*b*. Subsequently, the melted material inflow path corresponding portion is removed by a machine work, and the horn connecting portion 90 as shown in FIG. 10B is completed.

Next, one end part of the horn connecting portion 90 will be fixed at a center of a large-diametrical base end part of a substantially cone-shaped horn body 94*a* formed of a conventional metal. This fixing is executed while the large-diametrical base end part of the horn body 94*a* is supported by a jig 96 as shown in FIG. 10B.

Figures 10B, 10C, 10D:
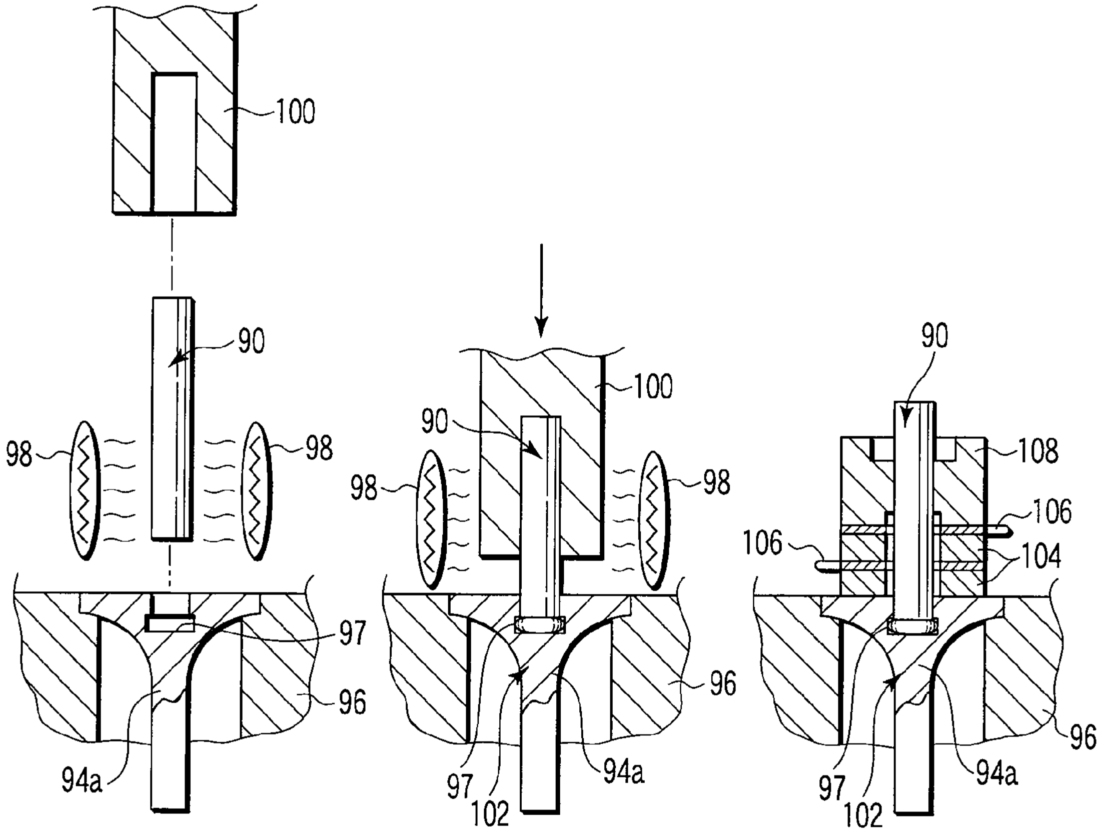
FIG. 10B is a side view schematically showing a preparation process in which one end part of the horn connecting portion formed of the metallic glass by using the die member shown in FIG. 10A is prepared to be connected to a base end part of the horn body formed of conventional metal.
FIG. 10C is a side view schematically showing a main process following the preparation process shown in FIG. 10B, in which the one end part of the horn connecting portion formed of the metallic glass by using the die member shown in FIG. 10A is being connected to the base end part of the horn body formed of the conventional metal.
FIG. 10D is a side view schematically showing a state in which the one end part of the horn connecting portion formed of the metallic glass by using the die member shown in FIG. 10A has been connected to the base end part of the horn body formed of the conventional metal, through the preparation process shown in FIG. 10B and the main process shown in FIG. 10C.

Specifically, as shown in FIG. 10B, a fixing hole 97 which will be engaged with and fixed to the one end part of the horn connecting portion 90 is formed in the center of the end surface of the large-diametrical base end part of the horn body 94*a*. And, the one end part of the horn connecting portion 90 directing toward the fixing hole 97 is heated to and maintained in the supercooled liquid temperature zone (glass transition temperature) of the metallic glass by a heater 98.

During this time, a center hole of a deforming member 100 is fitted on the other end part of the horn connecting portion 90. Then, as shown in FIG. 10C, the deforming member 100 presses the horn connecting portion 90 to deform and crush the one end part of the horn connecting portion 90 in the fixing hole 97 at the end surface of the large-diametrical base end part of the horn body 94*a*. And, the deformed one end part of the horn connecting portion 90 is engaged with and fixed in the fixing hole 97.

This combination of the horn connecting portion 90 and the horn body 94*a* configures a horn unit 102.

Then, after the heater 98 stops heating and the temperature of the deformed one end part of the horn connecting portion 90 is lowered below the supercooled liquid temperature zone, i.e. the glass transition temperature, the deforming member 100, together with the heater 98, comes away from the other end part of the horn connecting portion 90.

Next, as shown in FIG. 10D, a plurality of passive elements 104 and electrodes 106 for the passive elements 104 are mounted on the horn connecting portion 90 fixed to the large-diametrical end part of the horn body 94*a*, and further a backing portion 108 formed of a conventional metal is mounted thereon. In this time, the other end part of the horn connecting portion 90 is passed through a through hole formed in the backing portion 108.

Figure 11A:
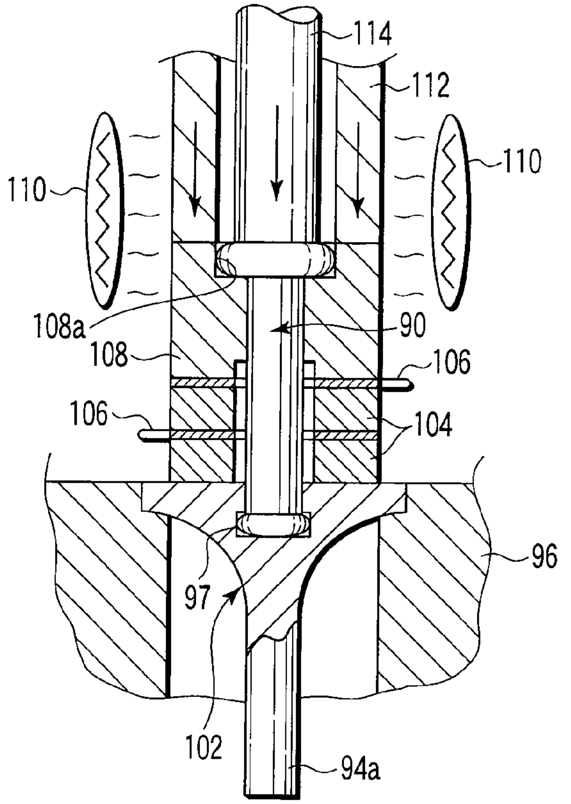
FIG. 11A is a vertical sectional view schematically showing a state in which a plurality of passive elements, electrodes thereof and a backing portion are assembled on the horn connecting portion in FIG. 10D by using a jig and a deforming member, and a protruded end part of the horn connecting portion is heated and is deformed by the deforming member in order to sandwich the plurality of passive elements and the electrodes thereof assembled on the horn connecting portion between the horn body and the backing portion.

Next, as shown in FIG. 11A, a cylindrical pressing member 112 having a heater 110 on an outer peripheral surface thereof presses an outer end of the backing portion 108. The pressing member 112 is formed of a high heat conductive material, and heats and maintains the other end part of the horn connecting portion 90 protruded from the backing portion 108, to and in the supercooled liquid temperature zone of the metallic glass.

During this time, it is important that the temperature of the plurality of passive elements 104 is not higher than the Curie point at which the characteristics of the passive elements 104 are lost.

Further, during this time, as shown in FIG. 11A, a deforming member 114 inserted into the center hole of the pressing member 112 is strongly presses the other end part of the horn connecting portion 90 to crush and deform the other end part, so that the deformed other end part of the horn connecting portion 90 is engaged with a diametrically enlarged part 108*a* of the through hole in the outer end of the backing portion 108.

Then, after the heater 110 stops heating and the temperature of the deformed other end part of the horn connecting portion 90 lowers below the supercooled liquid temperature zone, i.e. the glass transition temperature, the pressing member 112, together with the deforming member 114, is moved away from the outer end of the backing portion 108.

Figure 11B:
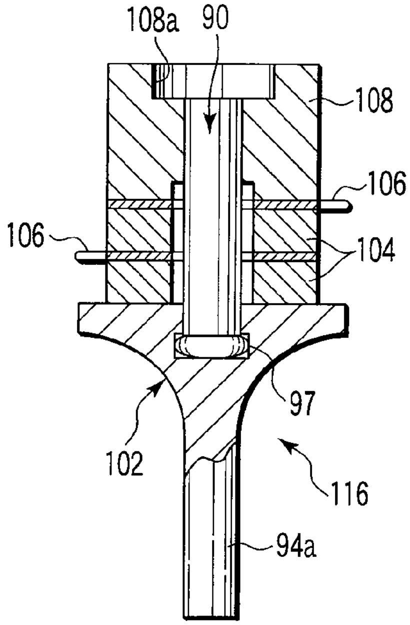
FIG. 11B is a vertical sectional view schematically showing a final product of the ultrasonic wave vibrating apparatus according to the fifth embodiment of this invention and manufactured by assembling the horn body, the plurality of the passive elements, the electrodes thereof and the backing portion on the horn connecting portion shown in FIG. 11A.

As a result, the plurality of passive elements 104 with the electrodes 106 are sandwiched between the horn body 94*a* and the backing portion 108, so that, as shown in FIG. 11B, the ultrasonic wave vibrating apparatus 116 according to the fifth embodiment of this invention is completed.

Generally, the passive element 104 is formed of piezoelectric ceramics, and the piezoelectric ceramics is comparatively weak against tensile stress. Therefore, in this case, it is preferable that a compressive stress equal to [(the compressive strength of the passive element 104)−(the tensile strength of the passive element 104)]/2 is applied on the passive element 104 when the backing portion 108 is connected to the horn connecting portion 90. For example, the compressive strength of the piezoelectric ceramics is 800 MPa and the tensile strength thereof is 80 MPa. Therefore, in a case that the passive element 104 is formed of piezoelectric ceramics, it is preferable that a compressive stress of 360 MPa is applied to the passive element 104.

The passive elements 104 are well-known piezoelectric elements which generate ultrasonic vibration when they are supplied with high-frequency current through the electrodes 106. The horn body 94*a* amplifies the ultrasonic vibration generated from the passive elements 104 and transmits it to a small-diametrical protruded end part thereof.

Connection between the outer end of the backing portion 108 and the other end part of the horn connecting portion 90 can be performed as described below. That is, instead of the diametrically enlarged part 108*a* of the through hole at the outer end of the backing portion 108, an axial engaging shape 108'*a* is formed on an inner peripheral surface of the through hole in the neighborhood of the outer end of the backing portion 108 as shown in FIG. 12A.

Figure 12A:
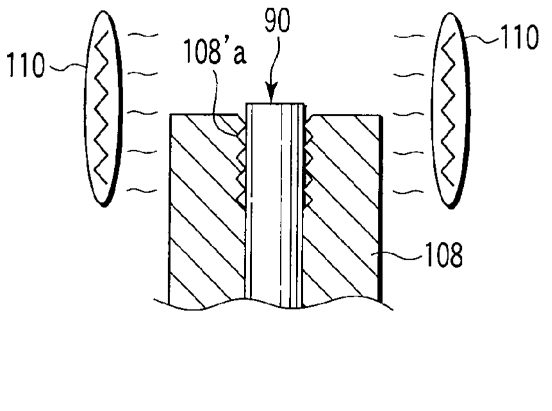
FIGS. 12A and 12B are vertical sectional views schematically showing two processes for sandwiching the plurality of the passive elements and the electrodes thereof assembled on the horn connecting portion, between the horn body and the backing portion after the plurality of the passive elements, the electrodes thereof and the backing portion are assembled on the horn connecting portion by using the jig and the deforming member as shown in FIG. 10D, the two processes being different from that for the sandwiching shown in FIG. 11A in which the protruded end portion of the horn connecting portion is heated and is deformed by the deforming member.
Figure 12B:
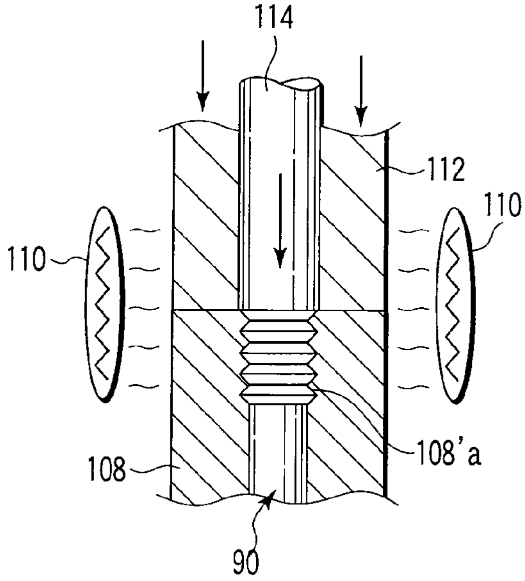

Next, as shown in FIG. 12A, the other end part of the horn connecting portion 90 in the neighborhood of the outer end of the backing portion 108 is heated by the heater 110, and at the same time the cylindrical pressing member 112 presses the outer end of the backing portion 108 as shown in FIG. 12B. The pressing member 112 is formed of a high heat conductive material, and maintains the other end part of the horn connecting portion 90 in the neighborhood of the outer end of the backing portion 108 in the supercooled liquid temperature zone (glass transition temperature) of the metallic glass.

During this time, it is important that the temperature of the plurality of passive elements 104 is not higher than the Curie point at which the characteristics of the passive elements 104 are lost.

Further, during this time, as shown in FIG. 12B, the deforming member 114 inserted into the center hole of the pressing member 112 presses strongly the other end part of the horn connecting portion 90 to deform the other end portion and to increase the diameter of the other end portion, so that the deformed other end part of the horn connecting portion 90 engages with the axial engaging shape 108'*a* in the neighborhood of the outer end of the backing portion 108.

Then, after the heater 110 stops heating and the temperature of the deformed other end part of the horn connecting portion 90 lowers below the supercooled liquid temperature zone, i.e. glass transition temperature of the metallic glass, the pressing member 112, together with the deforming member 114, is moved away from the outer end of the backing portion 108.

The ultrasonic wave vibrating apparatus 116 according to the fifth embodiment and described above with reference to FIGS. 10A to 12B is mounted on and used in, for example, the ultrasonic coagulating/cutting-open device for a laparoscopic operation. In this case, an internal thread is formed in the small-diametrical protruded end part of the horn body 94*a*, and a chip or probe for applying ultrasonic vibration, not shown, is screwed in the internal thread.

Sixth Embodiment

Next, a process for forming a horn connecting portion of a horn unit and a backing portion in an ultrasonic wave vibrating apparatus according to a sixth embodiment of this invention, of metallic glass will be explained with reference to FIGS. 13A to 13C.

Figure 13A:
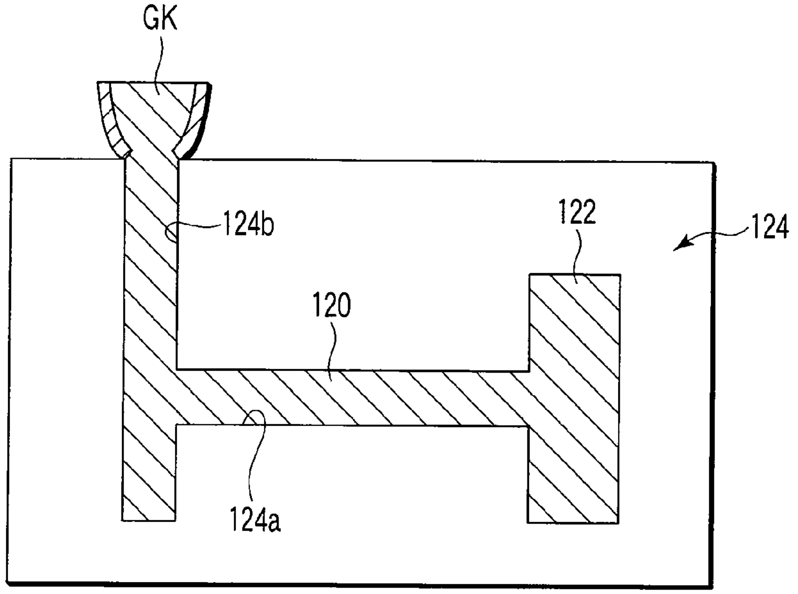
FIG. 13A is a side view schematically showing a state in which a horn connecting portion and a backing portion in a horn unit of an ultrasonic wave vibrating apparatus according to a sixth embodiment of the invention are formed of metallic glass, while only one lateral half piece of a laterally-two-divided die member is shown.

As shown in FIG. 13A, a combination of the horn connecting portion 120 of the horn unit and the backing portion 122 in the ultrasonic wave vibrating apparatus according to the sixth embodiment of this invention is formed by entering an alloy (hereinafter referred as a mother alloy) GK in a melted state, which is a base of metallic glass, into a die cavity 124*a* of a laterally-two-divided die member 124 through a melted material inflow path (runner) 124*b*. The mother alloy GK has the same composition as that of the metallic glass but is different from that of the metallic glass in that components of the former composition are crystallized. The mother alloy GK is melted by, for example, an arc.

In FIG. 13A, only one lateral half piece of the laterally-two-divided die member 124 is shown along a dividing surface thereof to show the die cavity 124*a* and the melted material inflow path (runner) 124*b*. The die cavity 124*a* is divided into two vertically divided parts along the two dividing surfaces of the two lateral half pieces of the laterally-two-divided die member 124.

The mother alloy GK melted at its melting point is poured into an outer end (gate) of the melted material inflow path (runner) 124*b*.

In order to solidify the melted mother alloy GK poured into the die cavity 124*a* through the melted material inflow path (runner) 124*b* in a liquid phase, various well known heat radiating and/or cooling structures (not shown) are applied to the laterally-two-divided die member 124. As a result, the melted mother alloy GK poured into the die cavity 124*a* is cooled at a cooling rate of not less than 10 K/sec. Since the melted mother alloy GK poured into the die cavity 124*a* is rapidly cooled and changed to the metallic glass in this way, a superior shape transferability of the metallic glass to the die cavity 124*a* is achieved.

The combination of the horn connecting portion 120 and the backing portion 122 formed of the metallic glass which becomes in a glass solid phase in the die cavity 124*a* and to which the shape of the die cavity 124*a* is transferred, is taken out from the die member 124 after a heat radiation for a predetermined time is finished. In this time, the horn connecting portion 120 and backing portion 122 to which the shape of the die cavity 124*a* is transferred has a melted material inflow path corresponding portion having a shape corresponding to the melted material inflow path 124*b*. Subsequently, the melted material inflow path corresponding portion is removed by a machine work, and the combination of the horn connecting portion 120 and the backing portion 122 as shown in FIG. 13B is completed.

Figure 13B:
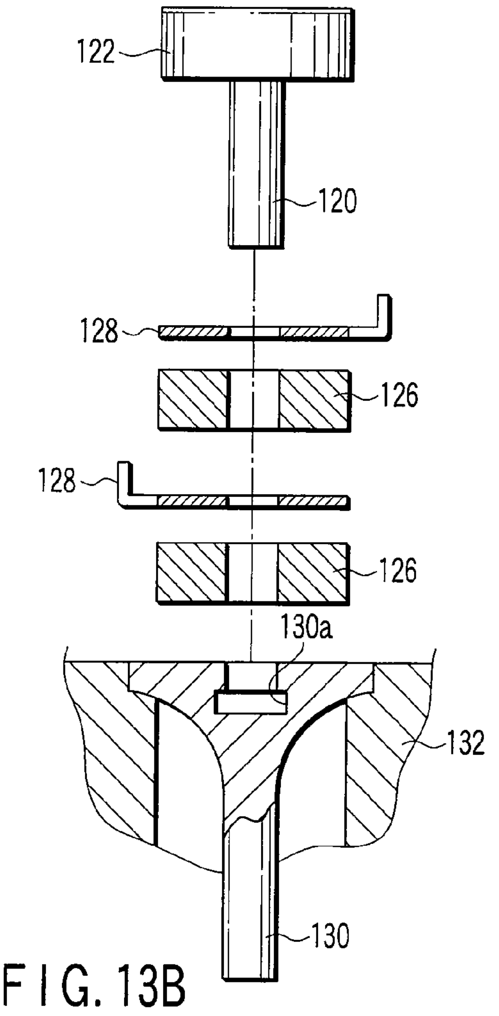
FIG. 13B is a vertical sectional view schematically showing the horn connecting portion and backing portion formed of the metallic glass by using the die member shown in FIG. 13A, together with a plurality of passive elements and electrodes thereof which are to be assembled on the horn connecting portion.

A plurality of passive elements 126 and electrodes 128 for the passive elements 126 are mounted on the horn connecting portion 120 formed integrally with the backing portion 122 by the metallic glass, from one end part thereof opposite to the backing portion 122, as shown in FIG. 13B. After that, the one end part of the horn connecting portion 120 is fixed at a center of a large-diametrical base end part of a substantially cone-shaped horn body 130 formed of a conventional metal. This fixing is performed while the large-diametrical base end part of the horn body 130 is supported on a jig 132 as shown in FIG. 13B.

Specifically, as shown in FIG. 13B, a fixing hole 130*a* which will be engaged with and fixed to the one end part of the horn connecting portion 120 is formed at the center of an end surface of the large-diametrical base end part of the horn body 130. The one end part of the horn connecting portion 120 on which the plurality of passive elements 126 and the electrodes 128 are mounted is inserted into the fixing hole 130*a* at the end surface of the large-diametrical base end part of the horn body 130. Further, a conventional ultrasonic wave vibrating apparatus 134 is applied on an outer end surface of the backing portion 122 as shown in FIG. 13C. The ultrasonic wave vibrating apparatus 134 applies ultrasonic waves to the backing portion 122 while it is pressing the outer end surface of the backing portion 122. This ultrasonic waves are concentrated at one end part of the horn connecting portion 120 which is far smaller in diameter than the backing portion 122, so that the one end part of the horn connecting portion 120 is heated to and maintained in the supercooled liquid temperature zone (glass transition temperature) of the metallic glass.

During this time, it is important that the temperature of the plurality of passive elements 126 is not higher than the Curie point at which the characteristics of the passive elements 126 are lost.

Figure 13C:
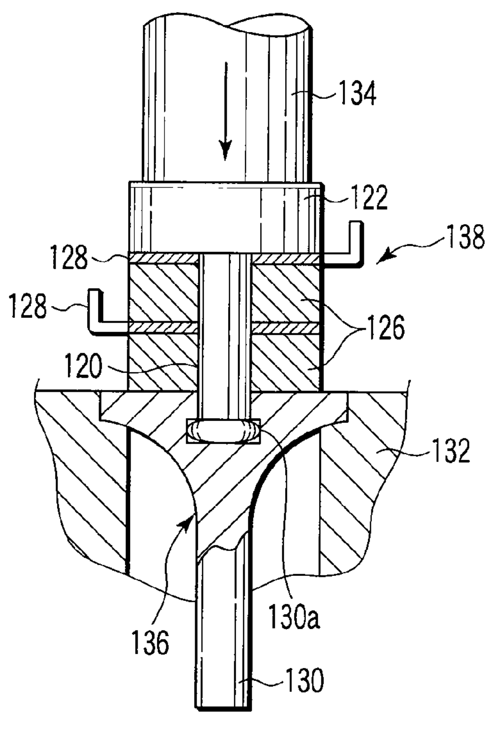
FIG. 13C is a side view schematically showing a final product of the ultrasonic wave vibrating apparatus according to the sixth embodiment of the invention and manufactured by assembling the horn body, the plurality of passive elements and the electrodes thereof on the horn connecting portion with the backing portion shown in FIG. 13B.

Further, during this time, as shown in FIG. 13C, the one end part of the horn connecting portion 120 is deformed and crushed in the fixing hole 130*a* at the end surface of the large-diametrical base end part of the horn body 130, and the deformed one end part of the horn connecting portion 120 is engaged with and fixed to the fixing hole 130*a*.

The combination of the horn connecting portion 120 and the horn body 130 connected to each other in this way configures a horn unit 136.

Then, after the ultrasonic wave vibrating apparatus 134 stops the application of the ultrasonic waves and the temperature of the deformed one end part of the horn connecting portion 120 lowers below the supercooled liquid temperature zone of the metallic glass, i.e. glass transition temperature, the ultrasonic wave vibrating apparatus 134 is moved away from the outer end surface of the backing portion 122.

Finally, the plurality of passive elements 126 and the electrodes 128 are sandwiched between the horn body 130 and the backing portion 122, and, as a result, the ultrasonic wave vibrating apparatus 138 according to the sixth embodiment of the invention is completed as shown in FIG. 13C.

Generally, the passive element 126 is formed of piezoelectric ceramics, and the piezoelectric ceramics is comparatively weak against tensile stress. Therefore, in this case, it is preferable that a compressive stress equal to [(the compressive strength of the passive element 126)−(the tensile strength of the passive element 126)]/2 is applied on the passive element 126 when the horn connecting portion 120 is connected to the horn body 130. For example, the compressive strength of the piezoelectric ceramics is 800 MPa and the tensile strength thereof is 80 MPa. Therefore, in a case that the passive element 126 is formed of piezoelectric ceramics, it is preferable that a compressive stress of 360 MPa is applied to the passive element 126.

The passive elements 126 are well-known piezoelectric elements which generate ultrasonic vibration when they are supplied with high-frequency current through the electrodes 128. The horn body 130 amplifies the ultrasonic vibration generated from the passive elements 126 and transmits it to a small-diametrical protruded end part thereof. A chip or probe (not shown) which is used to be pressed on an object to apply the ultrasonic vibration transmitted thereto in an amplified state to the object can be removably fixed to the small-diametrical protruded end part.

Seventh Embodiment

Next, an ultrasonic wave vibrating apparatus according to a seventh embodiment of this invention will be explained with reference to FIGS. 14A to 15.

Figure 14A:
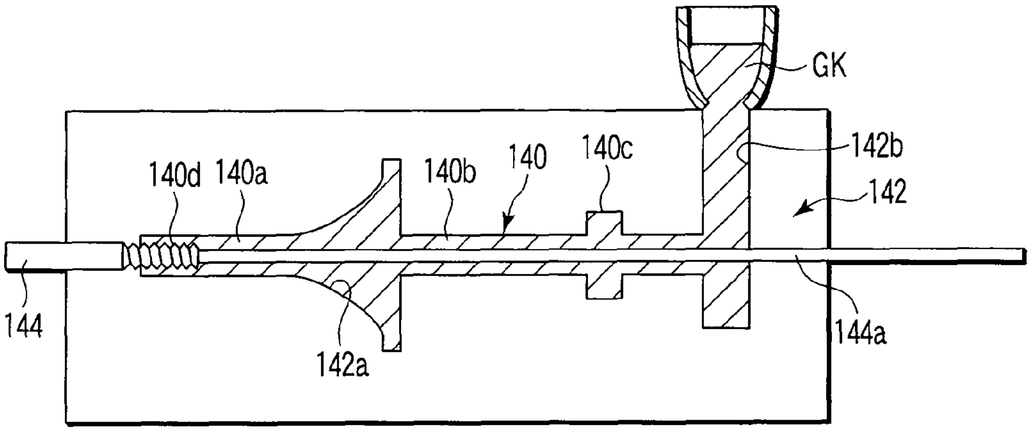
FIG. 14A is a side view schematically showing a state in which the whole horn unit of an ultrasonic wave vibrating apparatus according to a seventh embodiment of this invention is formed of metallic glass, while only one lateral half piece of a laterally-two-divided die member is shown.

As shown in FIG. 14A, a horn unit 140 of the ultrasonic wave vibrating apparatus according to the seventh embodiment of this invention is formed by entering an alloy (hereinafter referred as a mother alloy) GK in a melted state, which is a base of metallic glass, into a die cavity 142*a* of a laterally-two-divided die member 142 through a melted material inflow path (runner) 142*b*. The mother alloy GK has the same composition as that of the metallic glass but is different from that of the metallic glass in that components of the former composition are crystallized. The mother alloy GK is melted by, for example, an arc.

In FIG. 14A, only one lateral half piece of the laterally-two-divided die member 142 is shown along a dividing surface thereof to show the die cavity 142*a* and the melted material inflow path (runner) 142*b*. The die cavity 142*a* is divided into two vertically divided parts along the two dividing surfaces of the two lateral half pieces of the laterally-two-divided die member 142.

The horn unit 140 formed of the metallic glass by using the die cavity 142*a* includes a substantially cone-shaped horn body 140*a* and a shaft-shaped horn connecting portion 140*b* axially extended from a large-diametrical base end part of the horn body 140*a*. Further, the horn connecting portion 140*b* has an annular intermediate expansion 140*c* at a predetermined position in an axial direction thereof.

An internal thread-forming structure core 144 is arranged at a position in the die cavity 142*a* corresponding to one end part of a final product of the horn unit 140, i.e. a small-diametrical protruded end part of the horn body 140*a*, and the internal thread-forming structure core 144 has outer dimensions corresponding to dimensions of a hole 140*d* having an internal thread at an end surface of the protruded end part. The core 144 further includes an elongate rod-like center hole-forming portion 144*a* extended to a position in the die cavity 142*a* which corresponds to the other end part of the final product of the horn unit 140, i.e. a small-diametrical protruded end part of the horn connecting portion 140*b*.

The mother alloy GK melted to the melting point thereof is poured into an outer end (gate) of the melted material inflow path (runner) 142*b*.

In order to solidify the melted mother alloy GK poured into the die cavity 142*a* through the melted material inflow path (runner) 142*b* in a liquid phase so that the melted mother alloy GK is changed to the metallic glass, various well known heat radiating and/or cooling structures (not shown) are applied to the laterally-two-divided die member 142. As a result, the melted mother alloy GK poured into the die cavity 142*a* is cooled at a cooling rate of not less than 10 K/sec. Since the melted mother alloy GK poured into the die cavity 142*a* is rapidly cooled and changed to the metallic glass in this way, a superior shape transferability of the metallic glass to the die cavity 142*a* is achieved.

The whole of the horn unit 140 formed of the metallic glass which becomes in a glass solid phase in the die cavity 142*a* and to which the shape of the die cavity 142*a* is transferred, is taken out from the die member 142 after a heat radiation for a predetermined time is finished. In this time, the horn unit 140 to which the shape of the die cavity 142*a* is transferred has a melted material inflow path corresponding portion having a shape corresponding to the melted material inflow path 142*b*, but the melted material inflow path corresponding portion is removed by a machine work. Further, the internal thread-forming structure core 144, together with the elongate rod-like center hole-forming portion 144*a*, is removed from the horn unit 140, and the horn unit 140 as shown in FIG. 14B is completed.

In the horn unit 140, a hole 140*d* having an internal thread is left at the small-diametrical protruded end part of the horn body 140*a* corresponding to the internal thread-forming structure core 144. And, in the horn unit 140, an elongate center hole 140*e* extending from the hole 140*b* at the one end part to the other end part, i.e. the small-diametrical protruded end part of the horn connecting portion 140*b*, is left.

Figure 14B:
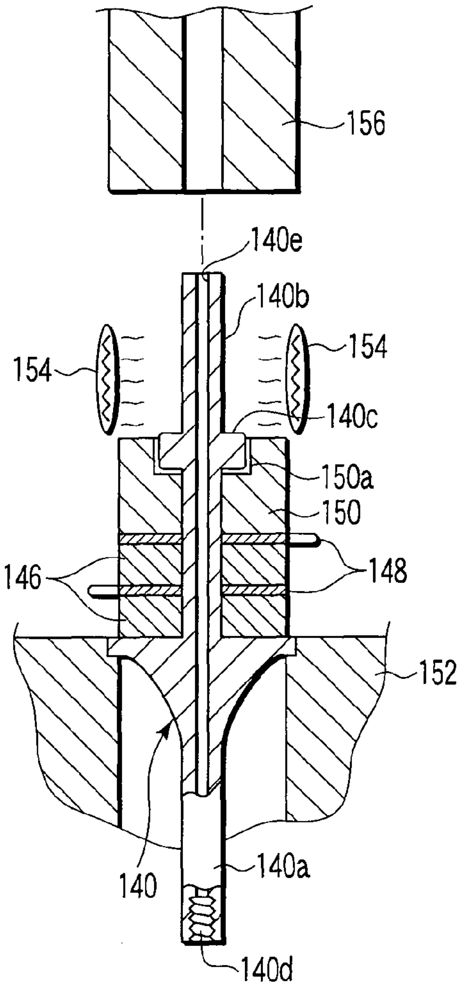
FIG. 14B is a vertical sectional view schematically showing the horn unit formed of the metallic glass by using the die member shown in FIG. 14A, together with a plurality of passive elements, electrodes thereof and a backing portion which are to be assembled on the horn connecting portion of the horn unit, while the horn unit is supported on a jig.

As shown in FIG. 14B, a plurality of passive elements 146 and electrodes 148 for the passive elements 146 are mounted on the horn connecting portion 140*b* of the horn unit 140 the whole of which is formed of the metallic glass. Further, a backing portion 150 formed of a conventional metal is mounted thereon. Specifically, these mounting is performed while the large-diametrical base end part of the horn unit 140 the whole of which is formed of the metallic glass is supported by a jig 152 as shown in FIG. 14B.

Further, as shown in FIG. 14B, an extended end part of the horn connecting portion 140*b* is passed through a through hole formed in the backing portion 150, and the intermediate expansion 140*c* of the horn connecting portion 140*b* is accommodated in an enlarged diameter part 150*a* formed in the center hole at the outer end of the backing portion 150, with a gap therebetween. Specifically, an inner end surface of the intermediate expansion 140*c* in its axial direction is slightly spaced from a bottom surface of the enlarged diameter part 150*a* at the outer end of the backing portion 150, while an outer end surface of the intermediate expansion 140*d* in its axial direction is located outside of the outer end of the backing portion 150.

Figure 14C:
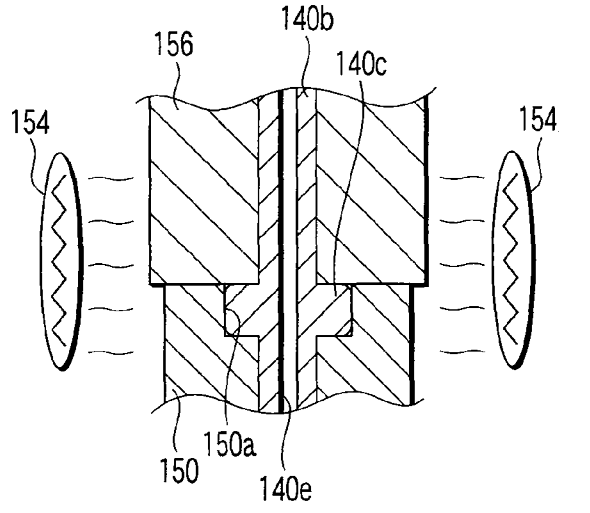
FIG. 14C is a vertical sectional view schematically showing a state in which an intermediate expansion of the horn connecting portion is heated and is deformed by a deforming member in order to sandwich the plurality of passive elements and the electrodes thereof assembled on the horn connecting portion between the horn body and the backing portion in the horn unit, while the horn connecting portion of the horn unit is supported on the jig as shown in FIG. 14B.

The intermediate expansion 140*c* of the horn connecting portion 140*b* in the enlarged diameter portion 150*a* at the outer end of the backing portion 150 is heated to and maintained in the supercooled liquid temperature zone (glass transition temperature) of the metallic glass by a heater 154. During this time, as shown in FIG. 14C, a cylindrical deforming member 156 presses the axial outer end surface of the intermediate expansion 140*c* of the horn connecting portion 140*b* toward the outer end of the backing portion 150. The deforming member 156 is formed of a high heat conductive material, and heats the intermediate expansion 140*c* of the horn connecting portion 140*b* and maintains it in the supercooled liquid temperature zone (glass transition temperature) of the metallic glass.

During this time, it is important that the temperature of the plurality of passive elements 146 is not higher than the Curie point at which the characteristics of the passive elements 146 are lost.

Further, during this time, the deforming member 156 presses the intermediate expansion 140*c* of the horn connecting portion 70*b* to deform and crush it so that the deformed intermediate expansion 140*c* of the horn connecting portion 140*b* is engaged with the enlarged diameter part 150*a* of the through hole at the outer end of the backing portion 150.

Then, after the heater 154 stops heating and the temperature of the intermediate expansion 140*c* of the horn connecting portion 140*b* lowers below the supercooled liquid temperature zone, i.e. the glass transition temperature of the metallic glass, the deforming member 156, together with the heater 154, is separated away from the outer end of the backing portion 150.

Figure 15:
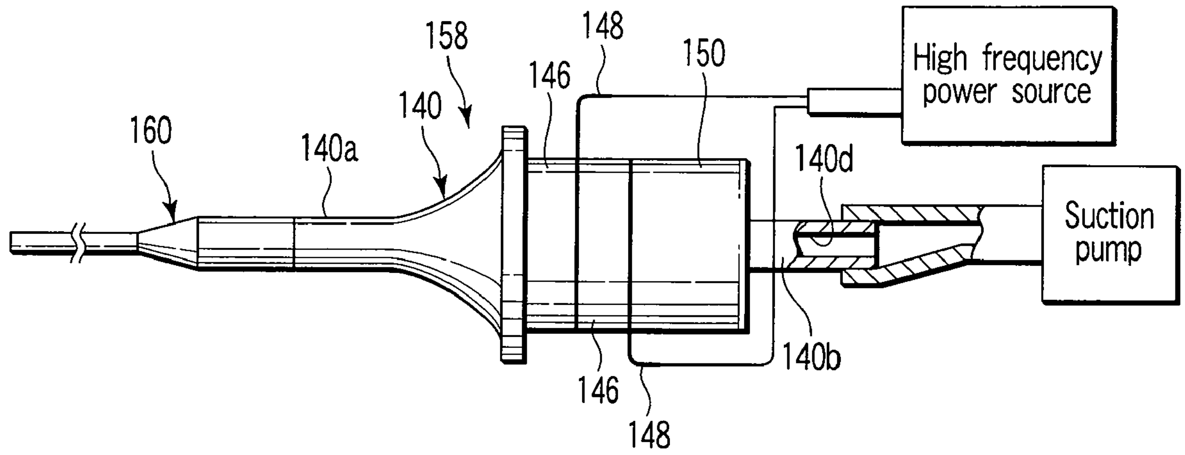
FIG. 15 is a side view schematically showing a final product of the ultrasonic wave vibrating apparatus according to the seventh embodiment of this invention and manufactured by sandwiching the plurality of passive elements and the electrodes thereof between the horn body and the backing portion in the horn unit as shown in FIG. 14C by using the horn connecting portion shown in FIG. 14B.

As a result, the plurality of passive elements 146 and the electrodes 148 are sandwiched between the horn body 140*a* and the backing portion 150 and the ultrasonic wave vibrating apparatus 158 according to the seventh embodiment shown in FIG. 15 is completed.

Generally, the passive element 146 is formed of piezoelectric ceramics, and the piezoelectric ceramics is comparatively weak against tensile stress. Therefore, in this case, it is preferable that a compressive stress equal to [(the compressive strength of the passive element 146)−(the tensile strength of the passive element 146)]/2 is applied on the passive element 146 when the horn connecting portion 140*b* is connected to the backing portion 150. For example, the compressive strength of the piezoelectric ceramics is 800 MPa and the tensile strength thereof is 80 MPa. Therefore, in a case that the passive element 146 is formed of piezoelectric ceramics, it is preferable that a compressive stress of 360 MPa is applied to the passive element 146.

The passive elements 146 are well-known piezoelectric elements which generate ultrasonic vibration when they are supplied with high-frequency current through the electrodes 148. The horn body 140*a* amplifies the ultrasonic vibration generated from the passive elements 146 and transmits it to a small-diametrical protruded end part thereof.

A chip or probe 160 which is used to be pressed on an object to apply the ultrasonic vibration transmitted thereto in an amplified state to the object can be removably fixed to the hole 140*d* (please refer to FIG. 14B) of the small-diametrical protruded end part of the horn body 140*a*. If a longitudinally extending center through hole is formed in the ultrasonic vibration application chip or probe 160 and a suction pump is connected to the extended end part of the horn connecting portion 140*b*, an object can be sucked from an opening of the longitudinally extending center through hole at a tip end of the ultrasonic vibration application chip or probe 160 through the longitudinally extending center through hole and the center hole 140*e* of the horn unit 140.

The ultrasonic wave vibrating apparatus 158 according to this embodiment can be mounted on an ultrasonic suction device used for sucking a tissue such as, for example, fat in a surgical operation.

Figure 16:
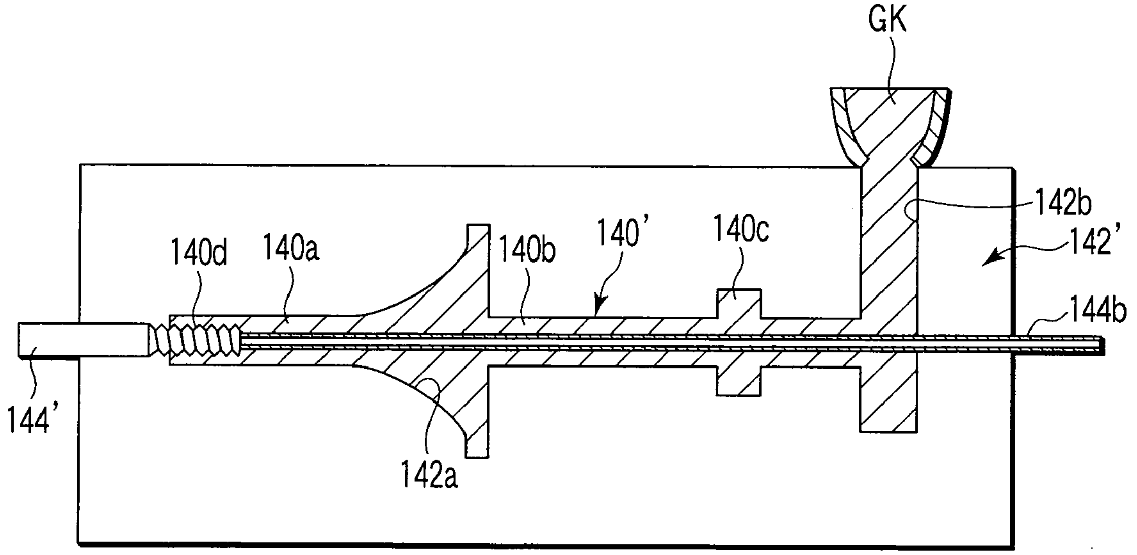
FIG. 16 is a side view schematically showing a state in which the whole horn unit of the ultrasonic wave vibrating apparatus according to the seventh embodiment of the invention is formed by a process different from the process shown in FIG. 14A, while only one lateral half piece of the laterally-two-divided die member is shown.

Next, another process for forming the horn unit 140 of the ultrasonic wave vibrating apparatus 158 according to the seventh embodiment of the invention than that shown in FIG. 14A will be explained with reference to FIG. 16.

In this case, instead of the elongate rod-like center hole-forming portion 144*a*, an elongate tubular member 144*b* is arranged in the die cavity 142*a* of a laterally-two-divided die member 142'. Further, an internal thread-forming structure core 144' is formed independently of the elongate tubular member 144*b*.

The melted mother alloy GK is poured into the die cavity 142*a* of the laterally-two-divided die member 142' through the melted material inflow path (runner) 142*b* and is solidified in the liquid phase to be changed to the metallic glass as in the aforementioned case. As a result, the metallic glass exhibits a high shape transferability, so that a horn unit 140' having the same appearance as the horn unit 140 shown in FIG. 14B can be formed in the die cavity 142*a* of the laterally-two-divided die member 142'. Also, the hole 140*d* to which a precision internal thread is transferred is formed by the internal thread-forming structural core 144' in the small-diametrical one end part of the horn body 140*a* of the horn unit 140'.

The horn unit 140' formed of the metallic glass which becomes in a glass solid phase in the die cavity 142*a* and to which the shape of the die cavity 142*a* is transferred, is taken out from the die member 142' after a heat radiation for a predetermined time is finished. In this time, the horn unit 140 to which the shape of the die cavity 142'*a* is transferred has a melted material inflow path corresponding portion having a shape corresponding to the melted material inflow path 142*b*. Subsequently, the melted material inflow path corresponding portion is removed by a machine work.

Further, the internal thread-forming structure core 144' is removed from the horn unit 140', while the elongate tubular member 144*b* is left in the horn unit 140'. The horn unit 140' is used with the elongate tubular member 144*b*.

Eighth Embodiment

Next, an ultrasonic wave vibrating apparatus according to an eighth embodiment of this invention will be explained with reference to FIGS. 17A to 18D.

Figure 17A:
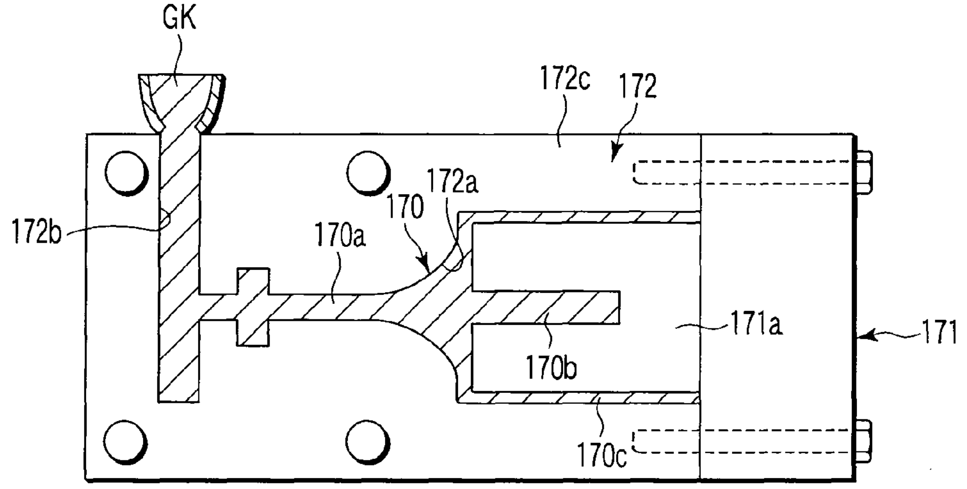
FIG. 17A is a side view schematically showing a state in which the whole horn unit of an ultrasonic wave vibrating apparatus according to an eighth embodiment of this invention is formed of metallic glass, while only one lateral half piece of a laterally-two-divided die member and a core member are shown.

As shown in FIG. 17A, a horn unit 170 of the ultrasonic wave vibrating apparatus according to the eighth embodiment of this invention is formed by entering an alloy (hereinafter referred as a mother alloy) GK in a melted state, which is a base of metallic glass, into a die cavity 172*a* of a laterally-two-divided die member 172 through a melted material inflow path (runner) 172*b*. And, the laterally-two-divided die member 172 is assembled with a core member 171. The mother alloy GK has the same composition as that of the metallic glass but is different from that of the metallic glass in that components of the former composition are crystallized. The mother alloy GK is melted by, for example, an arc.

Figure 17B:
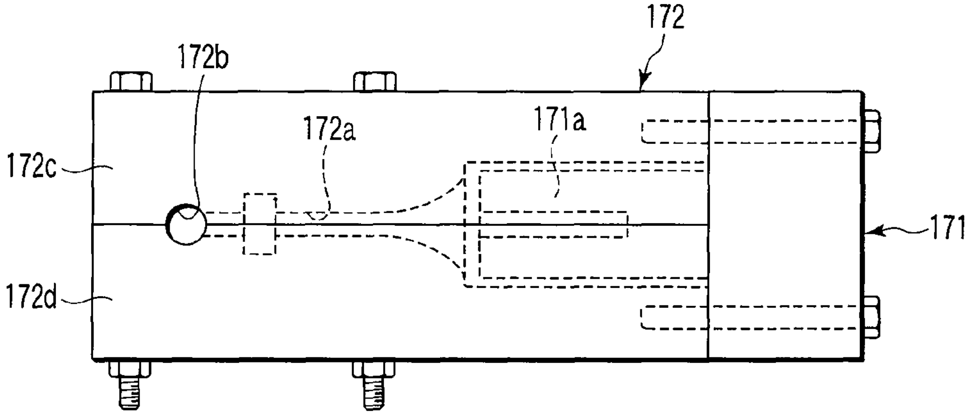
FIG. 17B is a plan view schematically showing a combination of the laterally-two-divided die member and the core member, both of which are shown in FIG. 17A.
Figure 17C:
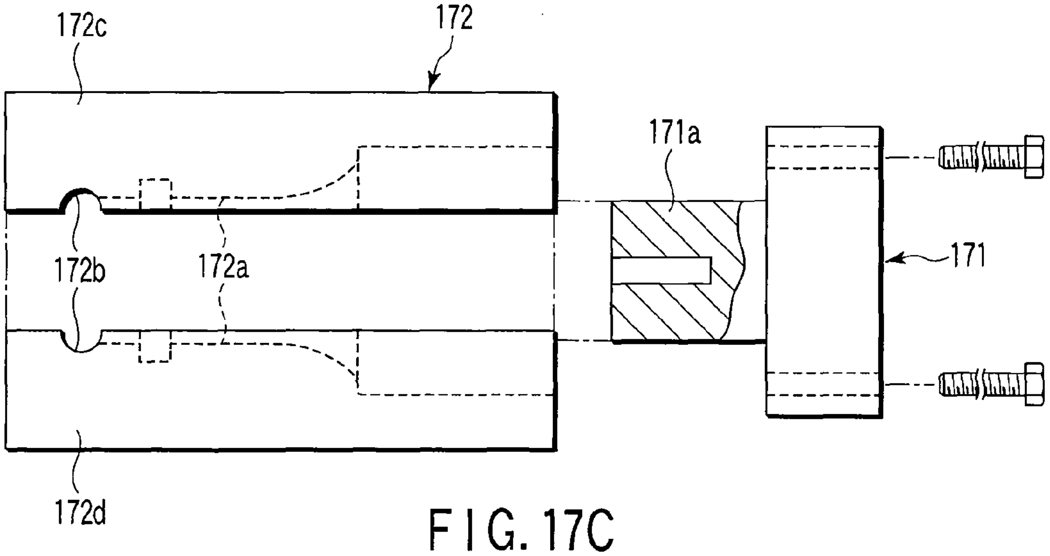
FIG. 17C is an exploded plan view schematically showing the combination of the laterally-two-divided die member and the core member, both of which are shown in FIG. 17B.

The laterally-two-divided die member 172 is formed of a metal such as, for example, copper, having high heat conductivity. As shown in FIGS. 17B and 17C, the two half lateral pieces 172*c*, 172*d* are symmetric in their shapes with each other and fixed separatably to each other by a well-known separable fixing structure such as combinations of bolts and nuts. Each of the die cavity 172*a* and the melted material inflow path (runner) 172*b* is divided into two vertically divided parts along the two dividing surfaces of the two lateral half pieces 172*c*, 172*d* of the laterally-two-divided die member 172.

A predetermined position of the die cavity 172*a* of the laterally-two-divided die member 172 is opened outward. This opening at the predetermined position is closed by the core member 171 separatably fixed to the laterally-two-divided die member 172 by a well-known separable fixing structure such as, for example, combinations of bolts and nuts. From the opening at the predetermined position of the die cavity 172*a* of the laterally-two-divided die member 172, a core 171*a* of the core member 171 is inserted into a predetermined position in the space defined by the die cavity 172*a*.

The horn unit 170 formed of the metallic glass by using the combination of the die cavity 172*a* of the laterally-two-divided die member 172 and the core 171*a* of the core member 171, includes a substantially cone-shaped horn body 170*a*, a shaft-shaped horn connecting portion 170*b* extending from a large-diametrical base end part of the horn body 170*a* in an axial direction thereof and a cylindrical cover 170*c* extending in the axial direction from the large-diametrical base end part of the horn body 170*a* and surrounding an outer peripheral surface of the horn connecting portion 170*b*.

In this embodiment, the small-diametrical shaft-shaped horn connecting portion 170*b* and the cylindrical cover 170*c* are arranged on the large-diametrical base end part of the horn body 170*a* to be concentric with each other.

The mother alloy GK melted to the melting point is poured into the outer end (gate) of the melted material inflow path (runner) 172*b*.

In order to solidify the melted mother alloy GK poured into the die cavity 172*a* through the melted material inflow path (runner) 172*b* in a liquid phase so that the melted mother alloy GK is changed to the metallic glass, various well known heat radiating and/or cooling structures (not shown) are applied to the laterally-two-divided die member 172 and the core member 171. As a result, the melted mother alloy GK poured into the die cavity 172*a* is cooled at a cooling rate of not less than 10 K/sec. Since the melted mother alloy GK poured into the die cavity 172*a* is rapidly cooled and changed to the metallic glass in this way, a superior shape transferability of the metallic glass to the die cavity 172*a* and the core 171*a* is achieved.

The whole of the horn unit 170 formed of the metallic glass which becomes in a glass solid phase in the die cavity 172*a* with the core 171*a* being projected thereto and to which the shape of the die cavity 172*a* and that of the core 171*a* are transferred, is taken out from the die member 172 and the core member 171 after a heat radiation for a predetermined time is finished. In this time, the horn unit 170 to which the shape of the die cavity 172*a* and that of the core 171*a* are transferred has a melted material inflow path corresponding portion having a shape corresponding to the melted material inflow path 172*b*, but the melted material inflow path corresponding portion is removed by a machine work. And, the horn unit 170 as shown in FIG. 18A is completed.

Figure 18A:
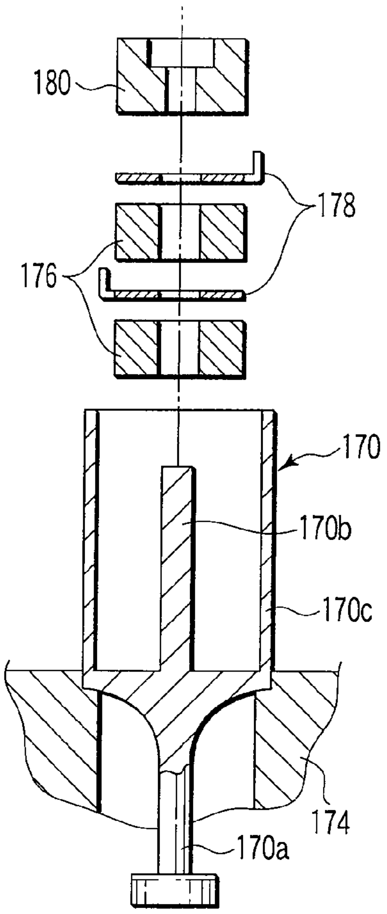
FIG. 18A is a vertical sectional view schematically showing the horn unit of the ultrasonic wave vibrating apparatus according to the eighth embodiment of this invention formed by the combination of the laterally-two-divided die member and the core member shown in FIGS. 17A to 17C, together with a jig supporting the horn unit, and a plurality of passive elements, electrodes thereof and a backing portion which are to be assembled on a horn connecting portion of the horn unit.

As shown in FIG. 18A, while the large-diametrical base end part of the horn body 170*a* of the horn unit 170 is supported by a jig 174, a plurality of passive elements 176 and electrodes 178 for the passive elements 176 are mounted on the horn connecting portion 170*b* and further a backing portion 180 formed of a conventional metal or the metallic glass is mounted thereon.

Figure 18B:
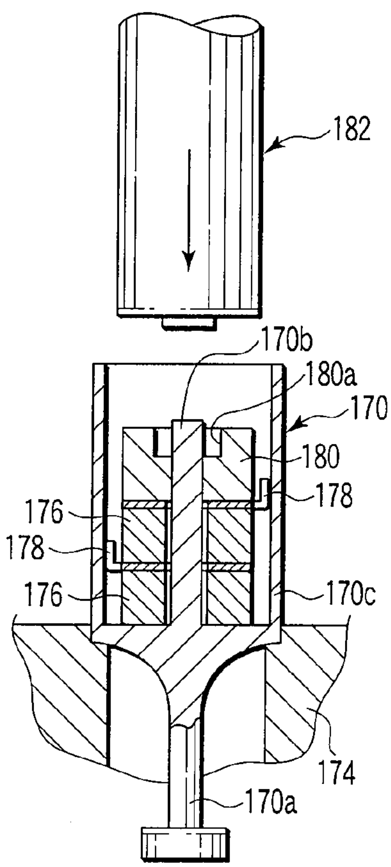
FIG. 18B is a vertical sectional view schematically showing a state in which the plurality of the passive elements, the electrodes thereof and the backing portion are assembled on the horn connecting portion of the horn unit shown in FIG. 18A, by using the jig and a deforming member.

As shown in FIG. 18B, the plurality of passive elements 176, the electrodes 178 and the backing portion 180 mounted on the horn connecting portion 170*b* are covered by the cylindrical cover 170*c* of the horn unit 170. Further, an extended end part of the horn connecting portion 170*b* is passed through the through hole formed in the backing portion 180.

Next, a deforming member 182 in which a heater is mounted or which heats an object by applying ultrasonic waves thereto presses the extended end part of the horn connecting portion 170*b* to heat the extended end part and to maintains it at the supercooled liquid temperature zone (glass transition temperature) of the metallic glass.

During this time, it is important that the temperature of the plurality of passive elements 176 is not higher than the Curie point at which the characteristics of the passive elements 176 are lost.

Figure 18C:
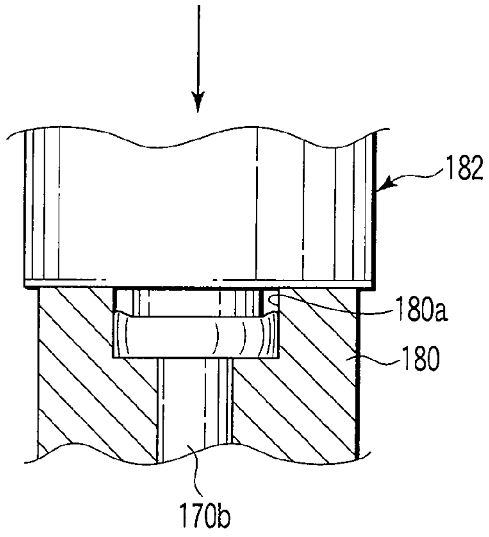
FIG. 18C is a vertical sectional view schematically showing a state in which a protruded end portion of the horn connecting portion is heated and is deformed by the deforming member in order to sandwich the plurality of passive elements and the electrodes thereof assembled on the horn connecting portion of the horn unit in FIG. 18B between the horn body and the backing portion in the horn unit.

Further, during this time, as shown in FIG. 18C, the deforming member 182 strongly presses the extended end part of the horn connecting portion 170*b* to deform and crush the extended end part of the horn connecting portion 170*b*, so that the deformed extended end part of the horn connecting portion 170*b* engages with an enlarged diameter part 180*a* of the through hole at the outer end of the backing portion 180.

Then, after the deforming member 182 stops heating and the temperature of the extended end part of the horn connecting portion 170*b* lowers below the supercooled liquid temperature zone, i.e. the glass transition temperature of the metallic glass, the deforming member 182 is separated away from the extended end part of the horn connecting portion 170*b*.

As a result, the plurality of passive elements 176 and the electrodes 178 are sandwiched between the horn body 170*a* and the backing portion 180.

Finally, a lid 184 is fitted in an opening of the extended end part of the cover 170*c* of the horn unit 170 to cover the opening. The lid 184 either may be attached removably in the opening of the extended end part of the cover 170*c* or may be fixed therein by a well-known fixing element including, for example, an adhesive. If need arises, by using, for example, an O-ring 184*a*, a waterproofing function can be provided to the lid 184.

The lid 184 may be formed of any material which can perform a desired function without affecting itself and the cover 170*c*, and, in this embodiment, the lid 184 is formed of PEEK (Polyether etherketone). The lid 184 is formed with a through hole 184*b* through which electric wires LL for the electrodes 178 of the passive elements 176 pass. If need a watertight function, the through hole 184*b* can be sealed by a well-known sealant 186 after the wires LL passed through the through hole 184*b*.

Figure 18D:
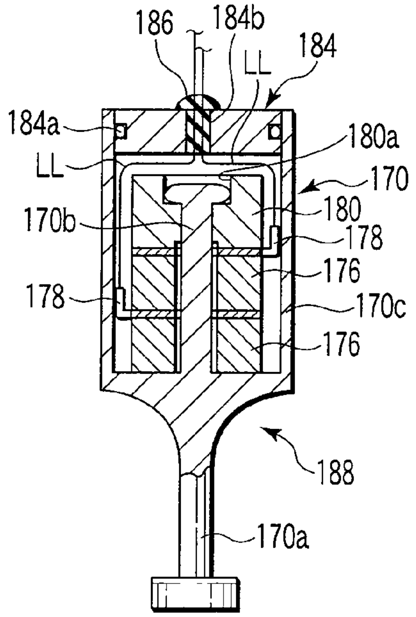
FIG. 18D is a vertical sectional view schematically showing a final product of the ultrasonic wave vibrating apparatus according to the eighth embodiment of this invention manufactured by sandwiching the plurality of passive elements and the electrodes thereof mounted on the horn connecting portion as shown in FIG. 18B, between the horn body of the horn unit and the backing portion, by the deforming process shown in FIG. 18C.
Figure 19:
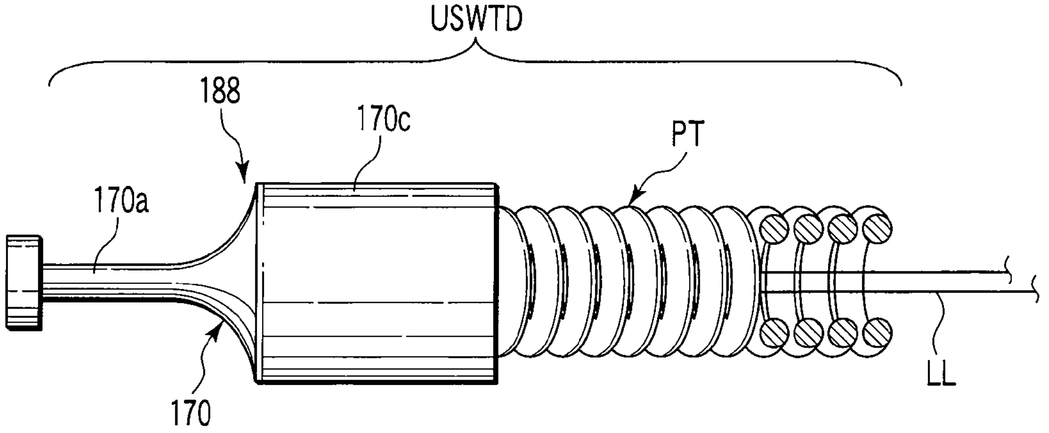
FIG. 19 is a side view schematically showing a state in which the final product of the ultrasonic wave vibrating apparatus according to the eighth embodiment of this invention shown in FIG. 18D is combined with a wire protective member so as to provide an ultrasonic treatment device for a flexible endoscope.

By covering the opening of the extended end part of the cover 170*c* of the horn unit 170 with the lid 184 as described above, the ultrasonic wave vibrating apparatus 188 according to the eighth embodiment of this invention shown in FIG. 18D is completed.

Generally, the passive element 176 is formed of piezoelectric ceramics, and the piezoelectric ceramics is comparatively weak against tensile stress. Therefore, in this case, it is preferable that a compressive stress equal to [(the compressive strength of the passive element 176)−(the tensile strength of the passive element 176)]/2 is applied on the passive element 176 when the horn connecting portion 170*b* is connected to the backing portion 180. For example, the compressive strength of the piezoelectric ceramics is 800 MPa and the tensile strength thereof is 80 MPa. Therefore, in a case that the passive element 176 is formed of piezoelectric ceramics, it is preferable that a compressive stress of 360 MPa is applied to the passive element 176.

The passive elements 176 are well-known piezoelectric elements which generate ultrasonic vibration when they are supplied with high-frequency current through the electric wires LL and the electrodes 178. The horn body 170*a* amplifies the ultrasonic vibration generated from the passive elements 176 and transmits it to a small-diametrical protruded end part thereof.

Further, in order to protect the wires LL running out of the cover 170*c* of the horn unit 170 of the ultrasonic wave vibrating apparatus 188 from external forces, an end of a flexible protective tube PT accommodating the wires LL running out of the cover 170*c* can be attached to the outer end surface of the cover 170*c*. For example, the protective tube PT can be what is called a coil shaft.

The ultrasonic wave vibrating apparatus 188 having the flexible protective tube PT can be used as an ultrasonic treatment device USWTD for a flexible endoscope. Such an ultrasonic treatment device USWTD is mounted detachably in a channel of an insertion part of the flexible endoscope and is used for a treatment such as, for example, a removal of an early-stage cancer.

By forming an internal thread in the small-diametrical protruded end of the horn body 170*a* of the ultrasonic wave vibrating apparatus 188 and by screwing a base end part of a long ultrasonic transmission member in the internal thread, the ultrasonic wave vibrating apparatus can be used as an ultrasonic coagulation/cutting-open device for a laparoscopic operation.

Figure 20:
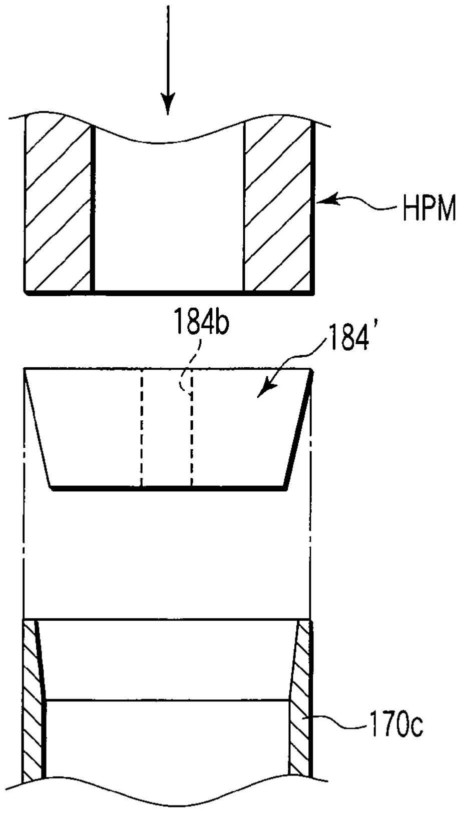
FIG. 20 is a vertical sectional view schematically showing a part of a manufacturing process for a modification of the final product of the ultrasonic wave vibrating apparatus according to the eighth embodiment of this invention shown in FIG. 18D.

Further, as shown in FIG. 20, a lid 184' for covering the opening of the extended end part of the cover 170*c* of the horn unit 170 can be formed of the metallic glass. In this case, the lid 184' is pressed against the opening of the extended end part of the cover 170*c* of the horn unit 170 by a deforming member HPM in which a heater is mounted or which heats an object by applying ultrasonic waves thereto, and a peripheral edge part of the lid 184' and the extended end part of the cover 170*c* are heated to and maintained at the supercooled liquid temperature zone (glass transition temperature) of the metallic glass.

During this time, it is important that the temperature of the plurality of the passive elements 176 surrounded by the cover 170*c* as shown in FIG. 18D does not exceed the Curie point at which the characteristics of the passive elements 176 are lost.

The peripheral edge part of the lid 184' and the extended end part of the cover 170*c*, both of which are heated to and maintained in the supercooled liquid temperature zone (glass transition temperature) of the metallic glass, are fixed to each other.

Then, after the deforming member HPM stops heating and the temperature of the peripheral edge part of the lid 184' and that of the extended end part of the cover 170*c* lower below the supercooled liquid temperature zone, i.e. below the glass transition temperature of the metallic glass, the deforming member HPM is moved away from the lid 184'.

Ninth Embodiment

Next, an ultrasonic wave vibrating apparatus according to a ninth embodiment of this invention will be explained with reference to FIGS. 21A to 22B.

Figure 21A:
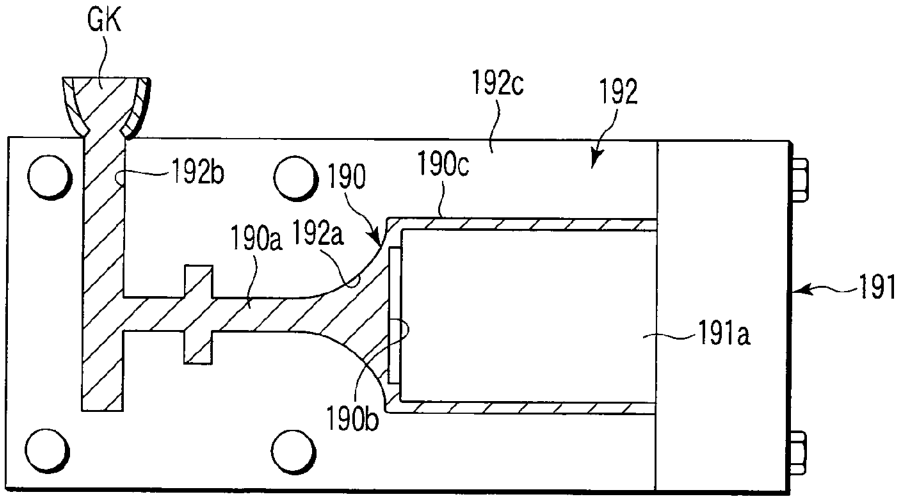
FIG. 21A is a side view schematically showing a state in which the whole horn unit of an ultrasonic wave vibrating apparatus according to a ninth embodiment of the invention is formed of metallic glass, while only one lateral half piece of a laterally-two-divided die member and a core member are shown.

As shown in FIG. 21A, a horn unit 190 of the ultrasonic wave vibrating apparatus according to the ninth embodiment of this invention is formed by entering an alloy (hereinafter referred as a mother alloy) GK in a melted state, which is a base of metallic glass, into a die cavity 192*a* of a laterally-two-divided die member 192 through a melted material inflow path (runner) 192*b*. And, the laterally-two-divided die member 192 is assembled with a core member 191. The mother alloy GK has the same composition as that of the metallic glass but is different from that of the metallic glass in that components of the former composition are crystallized. The mother alloy GK is melted by, for example, an arc.

Figure 21B:
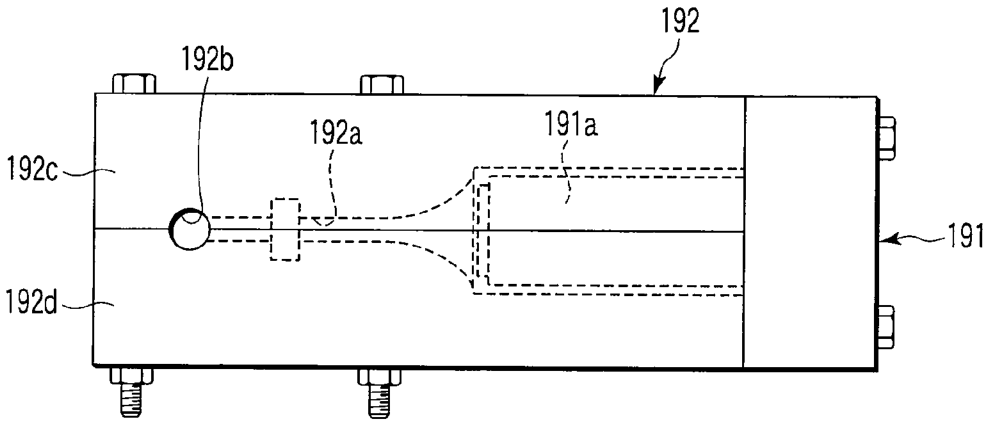
FIG. 21B is a plan view schematically showing a combination of the laterally-two-divided die member and the core member, both of which are shown in FIG. 21A.
Figure 21C:
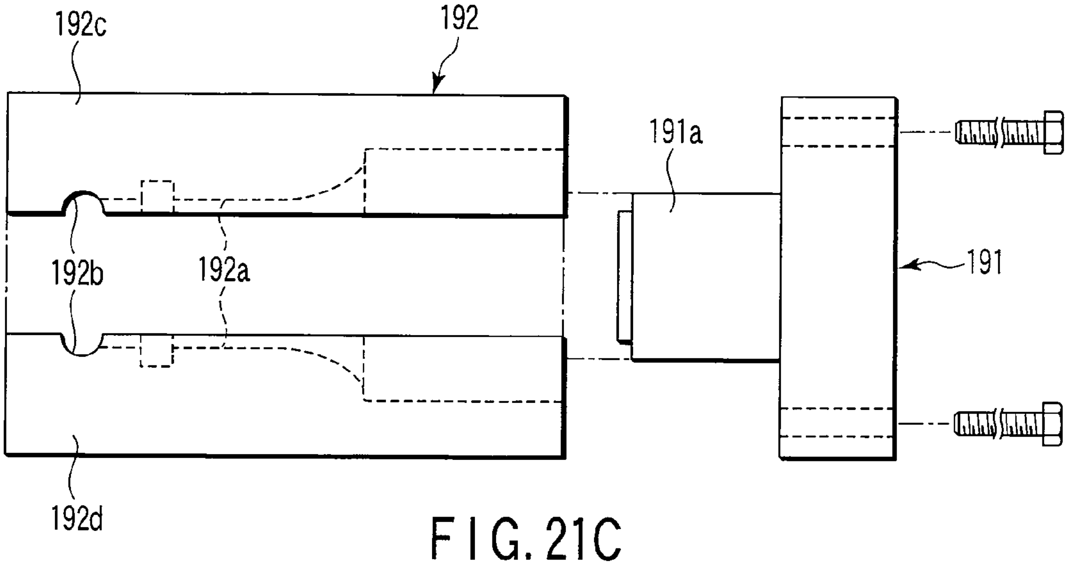
FIG. 21C is an exploded plan view schematically showing the combination of the laterally-two-divided die member and the core member, both of which are shown in FIG. 21B.

The laterally-two-divided die member 192 is formed of a metal such as, for example, copper, having high heat conductivity. As shown in FIGS. 21B and 21C, the two half lateral pieces 192*c*, 192*d* are symmetric in their shapes with each other and fixed separatably to each other by a well-known separable fixing structure such as combinations of bolts and nuts. Each of the die cavity 192*a* and the melted material inflow path (runner) 192*b* is divided into two vertically divided parts along the two dividing surfaces of the two lateral half pieces 192*c*, 192*d* of the laterally-two-divided die member 192.

A predetermined position of the die cavity 192*a* of the laterally-two-divided die member 192 is opened outward. This opening at the predetermined position is closed by the core member 191 separatably fixed to the laterally-two-divided die member 192 by a well-known separable fixing structure such as, for example, combinations of bolts and nuts. From the opening at the predetermined position of the die cavity 192*a* of the laterally-two-divided die member 192, a core 191*a* of the core member 191 is inserted into a predetermined position in the space defined by the die cavity 192*a*.

The horn unit 190 formed of the metallic glass by using the combination of the die cavity 192*a* of the laterally-two-divided die member 192 and the core 191*a* of the core member 191, includes a substantially cone-shaped horn body 190*a*, a positioning element 190*b* formed at an outer end surface of a large-diametrical base end part of the horn body 190*a*, and a cylindrical horn connecting portion 190*c* extending in an axial direction of the horn body 190*a* from a ring shaped position surrounding the positioning element 190*b* on an outer end surface of the large-diametrical base end part of the horn body 190*a*.

In this embodiment, the positioning element 190*b* and the cylindrical horn connecting portion 190*c* are arranged on the large-diametrical base end part of the horn body 190*a* to be concentric with each other. The positioning element 190*b* is a protrusion or a depression formed on or in the outer end surface of the large-diametrical base end part of the horn body 190*a*.

The mother alloy GK melted to the melting point is poured into the outer end (gate) of the melted material inflow path (runner) 192*b*.

In order to solidify the melted mother alloy GK poured into the die cavity 192*a* through the melted material inflow path (runner) 192*b* in a liquid phase so that the melted mother alloy GK is changed to the metallic glass, various well known heat radiating and/or cooling structures (not shown) are applied to the laterally-two-divided die member 192 and the core member 191. As a result, the melted mother alloy GK poured into the die cavity 192*a* is cooled at a cooling rate of not less than 10 K/sec. Since the melted mother alloy GK poured into the die cavity 192*a* is rapidly cooled and changed to the metallic glass in this way, a superior shape transferability of the metallic glass to the die cavity 192*a* and the core 191*a* is achieved.

The whole of the horn unit 190 formed of the metallic glass which becomes in a glass solid phase in the die cavity 192*a* with the core 191*a* being projected thereto and to which the shape of the die cavity 192*a* and that of the core 191*a* are transferred, is taken out from the die member 192 and the core member 191 after a heat radiation for a predetermined time is finished. In this time, the horn unit 190 to which the shape of the die cavity 192*a* and that of the core 191*a* are transferred has a melted material inflow path corresponding portion having a shape corresponding to the melted material inflow path 192*b*, but the melted material inflow path corresponding portion is removed by a machine work. And, the horn unit 190 as shown in FIG. 22A is completed.

Figure 22A:
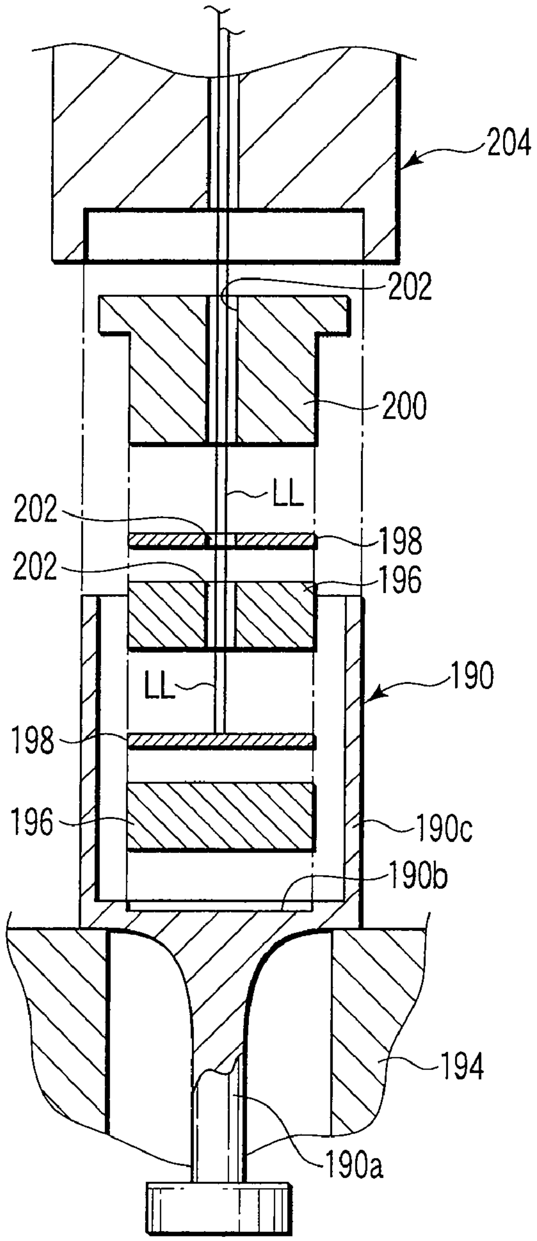
FIG. 22A is a vertical sectional view schematically showing the horn unit of the ultrasonic wave vibrating apparatus according to the ninth embodiment of the invention and formed by the combination of the laterally-two-divided die member and the core member, both of which are shown in FIGS. 21A to 21C, together with a jig for supporting the horn unit, a plurality of passive elements, electrodes thereof, a backing portion, a cover and a deforming member, wherein the passive elements, the electrodes and the backing portion will be accommodated in a cover of the horn unit and the deforming member is used for making the cover fix the horn unit, the passive elements, the electrodes and the backing portion therein.

As shown in FIG. 22A, while the large-diametrical base end part of the horn body 190*a* of the horn unit 190 is supported by a jig 194, a plurality of passive elements 196 and electrodes 198 for the passive elements 196 are stacked from the positioning element 190*b* on the outer end surface of the large-diametrical base end part of the horn body 190*a* along a longitudinal center line of the horn body 190*a*, and further a backing portion 200 formed of a conventional metal or the metallic glass is mounted thereon. Specifically, in this embodiment, electric wires LL for the plurality of electrodes 198 are inserted into a wire-passing through element 202 such as, for example a through groove or a through hole, formed on or in each of various members or a member stacked on each of the electrodes 198, and the electric wires LL are led out of the backing portion 200. The wire-passing through element 202 is arranged on each of the aforementioned various members or the member to be concentric with the longitudinal center line of the horn body 190*a*.

Figure 22B:
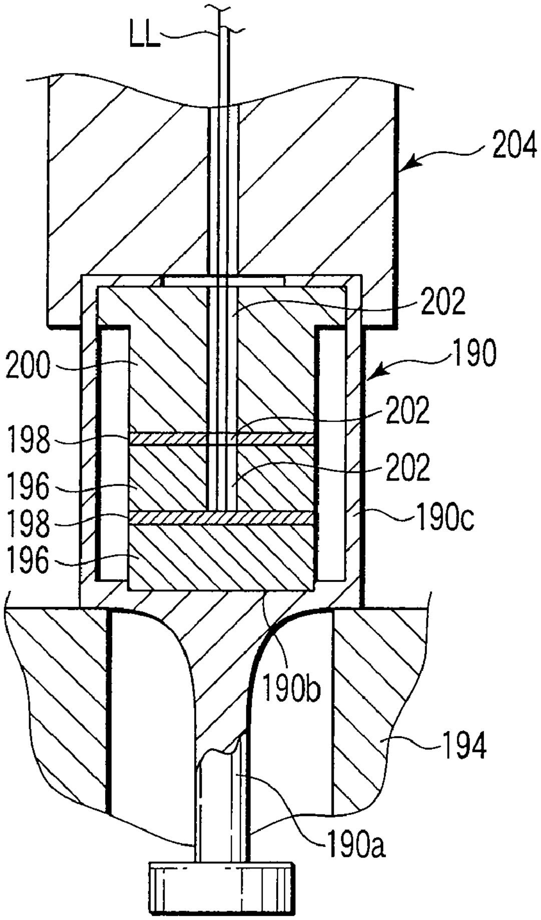
FIG. 22B is a vertical sectional view schematically showing a state in which an extended end part of the cover of the horn unit is deformed by the deforming member, so that the plurality of passive elements, the electrodes thereof and the backing portion accommodated in the cover of the horn unit as shown in FIG. 22A are fixed in the cover.

As shown in FIG. 22B, the plurality of passive elements 196, the electrodes 198 and the backing portion 200 stacked from the positioning element 190*b* on the outer end surface of the large-diametrical base end part of the horn body 190*a* are cover by the cylindrical horn connecting portion 190*c* of the horn unit 190. Further, the extended end part of the horn connecting portion 190*c* is located outside of the backing portion 200 along the longitudinal center line of the horn body 190*a*.

Next, a deforming member 204 in which a heater is mounted or which heats an object by applying ultrasonic waves thereto presses the extended end part of the horn connecting portion 190*c* to heat the extended end part and to maintains it at the supercooled liquid temperature zone (glass transition temperature) of the metallic glass.

During this time, it is important that the temperature of the plurality of passive elements 196 is not higher than the Curie point at which the characteristics of the passive elements 196 are lost.

Further, during this time, as shown in FIG. 22B, the deforming member 204 strongly presses the extended end part of the horn connecting portion 190*c* to deform and crush the extended end part of the horn connecting portion 190*c* on the peripheral edge part of the outer end surface of the backing portion 200, so that the deformed extended end part of the horn connecting portion 190*c* engages with the peripheral edge part of the outer end surface of the backing portion 200.

Then, after the deforming member 204 stops heating and the temperature of the extended end part of the horn connecting portion 190*c* lowers below the supercooled liquid temperature zone, i.e. the glass transition temperature of the metallic glass, the deforming member 204 is separated away from the extended end part of the horn connecting portion 190*c*.

As a result, the plurality of passive elements 196 and the electrodes 198 are sandwiched between the horn body 190*a* and the backing portion 200.

Finally, if need arises, a space surrounded by the horn connecting portion 190*c* and in which the plurality of passive elements 196, the electrodes 198 and the backing portion 200 are accommodated in a stacked manner as described above, can be sealed from an external space by applying a well-known sealing material to the wire-passing through element 202 of the backing portion 200.

The passive elements 196 are well-known piezoelectric elements which generate ultrasonic vibration when they are supplied with high-frequency current through the electrodes 198. The horn body 190*a* amplifies the ultrasonic vibration generated from the passive elements 196 and transmits it to a small-diametrical protruded end part thereof. A chip or probe (not shown) which is used to be pressed on an object to apply the ultrasonic vibration transmitted thereto in an amplified state to the object can be removably fixed to the small-diametrical protruded end part.

Generally, the passive element 196 is formed of piezoelectric ceramics, and the piezoelectric ceramics is comparatively weak against tensile stress. Therefore, in this case, it is preferable that a compressive stress equal to [(the compressive strength of the passive element 196)−(the tensile strength of the passive element 196)]/2 is applied on the passive element 196 when the horn connecting portion 190*c* is connected to the backing portion 200. For example, the compressive strength of the piezoelectric ceramics is 800 MPa and the tensile strength thereof is 80 MPa. Therefore, in a case that the passive element 196 is formed of piezoelectric ceramics, it is preferable that a compressive stress of 360 MPa is applied to the passive element 196.

The passive elements 196 are well-known piezoelectric elements which generate ultrasonic vibration when they are supplied with high-frequency current through the electrodes 198. The horn body 190*a* amplifies the ultrasonic vibration generated from the passive elements 196 and transmits it to a small-diametrical protruded end part thereof. A chip or probe (not shown) which is used to be pressed on an object to apply the ultrasonic vibration transmitted thereto in an amplified state to the object can be removably fixed to the small-diametrical protruded end part.

Tenth Embodiment

Next, an ultrasonic wave vibrating apparatus according to a tenth embodiment of this invention will be explained with reference to FIGS. 23A to 23D.

Figure 23A:
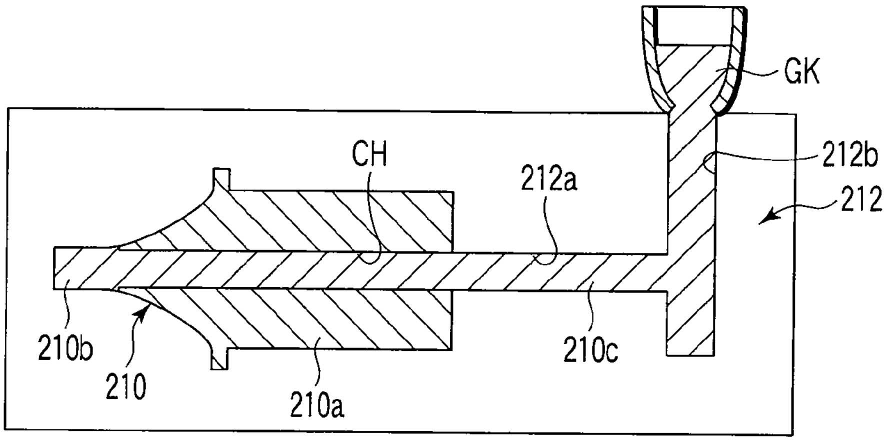
FIG. 23A is a side view schematically showing a sate in which a part of a horn unit of an ultrasonic wave vibrating apparatus according to a tenth embodiment of this invention is formed of metallic glass, while only one lateral half piece of a laterally-two-divided die member is shown.

As shown in FIG. 23A, a part of a horn unit 210 of the ultrasonic wave vibrating apparatus according to the tenth embodiment of this invention is formed by entering an alloy (hereinafter referred as a mother alloy) GK in a melted state, which is a base of metallic glass, into a die cavity 212*a* of a laterally-two-divided die member 212 through a melted material inflow path (runner) 212*b*. The mother alloy GK has the same composition as that of the metallic glass but is different from that of the metallic glass in that components of the former composition are crystallized. The mother alloy GK is melted by, for example, an arc.

In FIG. 23A, only one lateral half piece of the laterally-two-divided die member 212 is shown along a dividing surface thereof to show the die cavity 212*a* and the melted material inflow path (runner) 212*b*. The die cavity 212*a* is divided into two vertically divided parts along the two dividing surfaces of the two lateral half pieces of the laterally-two-divided die member 212.

Specifically, a substantially cone-shaped horn body 210*a* formed of a conventional metal such as, for example, titanium is arranged at a predetermined position in the die cavity 212*a* of the laterally-two-divided die member 212, and a center through hole CH is formed in the horn body 210*a* along a longitudinal center line thereof. The die cavity 212*a* provides a predetermined space for forming a forward end part 210*b* of the horn body 210*a* and a horn connecting portion 210*c* thereof of metallic glass on both sides of the center through hole CH of the horn body 210*a*.

The mother alloy GK melted to the melting point is poured into an outer end (gate) of the melted material inflow path (runner) 212*b*.

In order to solidify the melted mother alloy GK poured into the die cavity 212*a* through the melted material inflow path (runner) 212*b* in a liquid phase so that the melted mother alloy GK is changed to the metallic glass, various well known heat radiating and/or cooling structures (not shown) are applied to the laterally-two-divided die member 212. As a result, the melted mother alloy GK poured into the die cavity 212*a* is cooled at a cooling rate of not less than 10 K/sec. Since the melted mother alloy GK poured into the die cavity 212*a* is rapidly cooled and changed to the metallic glass in this way, a superior shape transferability of the metallic glass to the die cavity 212*a* is achieved.

The metallic glass which becomes in the glass solid phase in the die cavity 212*a* and to which the shape of the die cavity 212*a* is transferred, provides the forward end part 210*b* and the horn connecting portion 210*c* on the both sides of the center through hole CH of the substantially cone-shaped horn body 210*a* formed of the conventional metal such as, for example titanium.

The forward end part 210*b* of the horn body 210*a* and the horn connecting portion 210*c* are interconnected with each other by the metallic glass which flows into the center through hole CH of the horn body 210*a* and to which a shape of the center through hole CH is transferred, and are integrated with the horn body 210*a* to configure the horn unit 210.

In this embodiment, the forward end portion 210*b*, the horn connecting portion 210*c*, and the horn body 210*a* are arranged concentrically with each other, and the horn connecting portion 210*c* has a rod shape extending concentrically outward from the large-diametrical base end part of the horn body 210*a*.

Figure 23B:
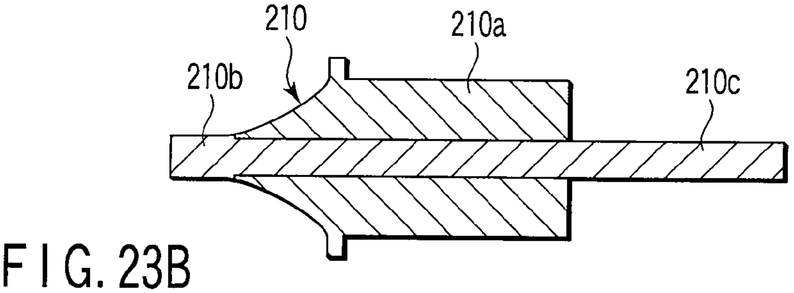
FIG. 23B is a vertical sectional view schematically showing the horn unit, the part of which is formed of the metallic glass by using the die member shown in FIG. 23A.

The horn unit 210 configured in this way is taken out from the die member 212 after a heat radiation for a predetermined time is finished. In this time, the horn connecting portion 210*c* to which the shape of the die cavity 212*a* is transferred has a melted material inflow path corresponding portion having a shape corresponding to the melted material inflow path (runner) 212*b*, but the melted material inflow path corresponding portion is removed by a machine work. And, the horn unit 210 as shown in FIG. 23B is completed.

Figure 23C:
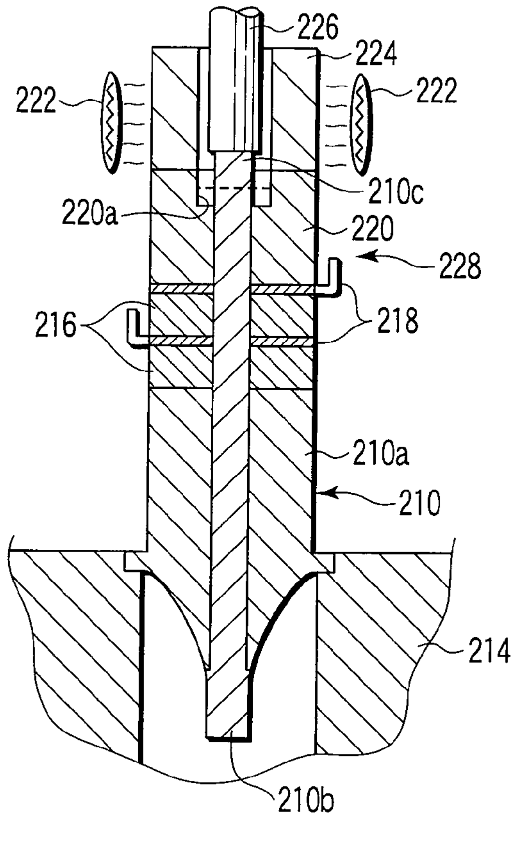
FIG. 23C is a vertical sectional view schematically showing a state in which a plurality of passive elements, electrodes thereof and a backing portion are assembled on a horn connecting portion included in the part of the horn unit shown in FIG. 23B by using a jig and a deforming member.

Next, as shown in FIG. 23C, a plurality of passive elements 216 and electrodes 218 for the passive elements 216 are mounted on the horn connecting portion 210*c* formed of the metallic glass, while the large-diametrical base end part of the horn body 210*a* of the horn unit 210 is supported by a jig 214, and further a backing portion 220 formed of a conventional metal is mounted thereon.

Further, as shown in FIG. 23C, an extended end part of the horn connecting portion 210*c* of the horn unit 210 is passed through a through hole formed in the backing portion 220. A cylindrical pressing member 224 having a heater 222 on an outer peripheral surface thereof presses an outer end of the backing portion 220. The pressing member 224 is formed of highly heat conductive material, and heats and maintains the extended end part of the horn connecting portion 210*c* protruded from the backing portion 220 to and in the supercooled liquid temperature zone (glass transition temperature) of the metallic glass.

During this time, it is important that the temperature of the plurality of the passive elements 216 does not exceed the Curie point at which the characteristics of the passive elements 216 are lost.

Further, during this time, as shown in FIG. 23C, a deforming member 226 inserted in a center hole of the pressing member 224 strongly presses the extended end part of the horn connecting portion 210*c* to deform and crush it as shown by a two-dots chain line in FIG. 23C, so that the deformed extended end part of the horn connecting portion 210*c* engages with an enlarged diametrical part 220*a* of the through hole at the outer end of the backing portion 220.

Then, after the heater 222 stops heating and the temperature of the extended end part of the horn connecting portion 210*c* lowers below the supercooled liquid temperature zone, i.e. the glass transition temperature of the metallic glass, the pressing member 224, together with the deforming member 226, is separated away from the outer end of the backing portion 220.

As a result, the plurality of passive elements 216 and the electrodes 218 are sandwiched between the horn body 210*a* and the backing portion 220, and the ultrasonic wave vibrating apparatus 228 according to the tenth embodiment of this invention is completed.

Generally, the passive element 216 is formed of piezoelectric ceramics, and the piezoelectric ceramics is comparatively weak against tensile stress. Therefore, in this case, it is preferable that a compressive stress equal to [(the compressive strength of the passive element 216)−(the tensile strength of the passive element 216)]/2 is applied on the passive element 216 when the horn connecting portion 210*c* is connected to the backing portion 220. For example, the compressive strength of the piezoelectric ceramics is 800 MPa and the tensile strength thereof is 80 MPa. Therefore, in a case that the passive element 216 is formed of piezoelectric ceramics, it is preferable that a compressive stress of 360 MPa is applied to the passive element 216.

The passive elements 216 are well-known piezoelectric elements which generate ultrasonic vibration when they are supplied with high-frequency current through the electrodes 218. The horn body 210*a* amplifies the ultrasonic vibration generated from the passive elements 216 and transmits it to the forward end part 210*b* of the small-diametrical protruded end of the horn body 210*a*.

In this embodiment, since the forward end part 210*b* is formed of the metallic glass as described above, it is very superior to mechanical strength, wear resistance, ultrasonic vibration transmission performance, corrosion resistance, etc., as compared with that it is simply formed of metal or ceramics.

As described above, in the case where a desired object of the metallic glass is formed by casting or injection molding, if the mother alloy GK of the metallic glass is not solidified at the cooling rate of not less than 10 K/sec while maintaining the liquid phase thereof, the mother alloy GK will not be changed to the metallic glass after cooling.

In the case where an outer size of the desired object such as the horn unit increases, the aforementioned cooling condition could not be satisfied so that the desired object of the metallic glass could not be formed by casting.

In the case where the outer size of the desired object such as the horn unit increases, as in the embodiment shown in FIGS. 23A and 23B, the horn body 210*a* is formed of a metal and the forward end part 210*b* and the horn connecting portion 210*c* of the metallic glass can be formed integrally with the horn body 210*a* by casting the forward end portion 210*b* and the horn connecting portion 210*c* of the metallic glass under the satisfactory cooling conditions as described above. That is, only the forward end part 210*b* and the horn connecting portion 210*c* in the horn unit 210 have the various technical advantages as described above which can be obtained by forming them of the metallic glass.

The ultrasonic wave vibrating apparatus according to this embodiment can be used for, for example, an ultrasonic welding.

Eleventh Embodiment

Next, an ultrasonic wave vibrating apparatus according to an eleventh embodiment of this invention will be explained with reference to FIGS. 24A to 24C.

Figure 24A:
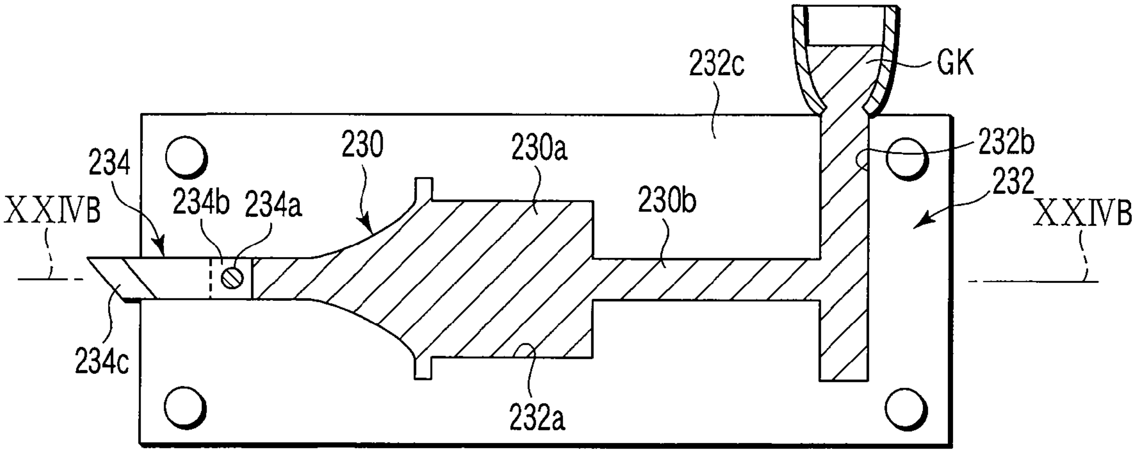
FIG. 24A is a side view schematically showing a state in which the whole horn unit of an ultrasonic wave vibrating apparatus according to an eleventh embodiment of this invention is formed of metallic glass, while only one lateral half piece of a laterally-two-divided die member is shown.
Figure 24B:
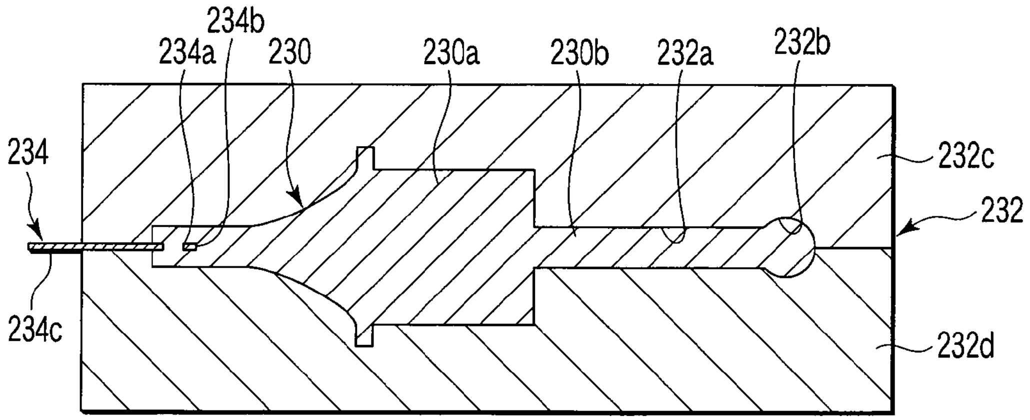
FIG. 24B is a schematic horizontal sectional view taken along a line XXIVB-XXIVB in FIG. 24A.

As shown in FIG. 24A, a horn unit 230 of the ultrasonic wave vibrating apparatus according to the eleventh embodiment of this invention is formed by entering an alloy (hereinafter referred as a mother alloy) GK in a melted state, which is a base of metallic glass, into a die cavity 232*a* of a laterally-two-divided die member 232 through a melted material inflow path (runner) 232*b*. The mother alloy GK has the same composition as that of the metallic glass but is different from that of the metallic glass in that components of the former composition are crystallized. The mother alloy GK is melted by, for example, an arc.

In FIG. 24A, only one lateral half piece 232*c* of the laterally-two-divided die member 232 is shown along a dividing surface thereof to show the die cavity 232*a* and the melted material inflow path (runner) 232*b*. The die cavity 232*a* is divided into two vertically divided parts along the two dividing surfaces of the two lateral half pieces of the laterally-two-divided die member 232.

The horn unit 230 formed of the metallic glass by using the die cavity 232*a* includes a substantially cone-shaped horn body 230*a* and a shaft-shaped horn connecting portion 230*b* extending from a large-diametrical base end part of the horn body 230*a* in its axial direction.

A base part 234*b* of a cutter 234 is arranged at a position in the die cavity 232*a* which corresponds to one end part of a final product of the horn unit 230, i.e. a small-diametrical protruded end part of the horn body 230*a*, and the base part 234*b* has an engaging hole 234*a*. The cutter 234 has a cutting part 234*c* on a side thereof opposite to the base part 234*b*.

The mother alloy GK melted to the melting point is poured into an outer end (gate) of the melted material inflow path (runner) 232*b*.

In order to solidify the melted mother alloy GK poured into the die cavity 232*a* through the melted material inflow path (runner) 232*b* in a liquid phase so that the melted mother alloy GK is changed to the metallic glass, various well known heat radiating and/or cooling structures (not shown) are applied to the laterally-two-divided die member 232. As a result, the melted mother alloy GK poured into the die cavity 232*a* is cooled at a cooling rate of not less than 10 K/sec. Since the melted mother alloy GK poured into the die cavity 232*a* is rapidly cooled and changed to the metallic glass in this way, a superior shape transferability of the metallic glass to the die cavity 232*a* and the base part 234*b* of the cutter 234 having the engaging hole 234*s* is achieved.

The whole horn unit 230 formed of the metallic glass which becomes in the glass solid phase in the die cavity 232*a* and to which the shape of the die cavity 232*a* is transferred, is taken out from the die member 232 after a heat radiation for a predetermined length of time is finished. In this time, the horn unit 230 to which the shape of the die cavity 232*a* is transferred has a melted material inflow path corresponding portion having a shape corresponding to the melted material inflow path (runner) 232*b*, but the melted material inflow path corresponding portion is removed by a machine work.

Figure 24C:
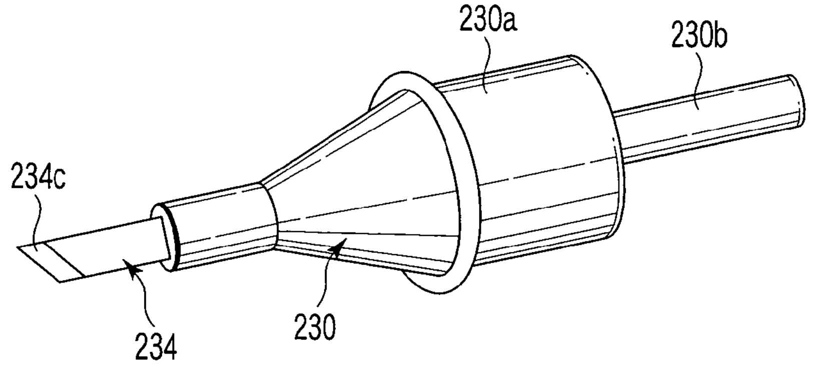
FIG. 24C is a schematic perspective view showing the horn unit formed of the metallic glass by using the laterally-two-divided die member shown in FIGS. 24A and 24B.

And, the horn unit 230 as shown in FIG. 24C is completed. The base end part 234*b* of the cutter 234 is fixed to the small-diametrical protruded end part of the horn body 230*a* of the horn unit 230 by the metallic glass cast in the engaging hole 234*a*.

Like the horn connecting portion 70*b* of the horn unit 70 the whole of which is formed of the metallic glass as shown in FIGS. 9B to 9E, the plurality of passive elements 74 and the electrodes 76 for the passive elements 74 are mounted on the horn connecting portion 230*b* of the horn unit 230 shown in FIG. 24C while a large-diametrical base end part of the horn unit 230 is supported by the jig 80, and further the backing portion 78 formed of the conventional metal is mounted thereon.

Further, the cylindrical pressing member 84 having the heater 82 presses the outer end of the backing portion 78, and heats and maintains the extended end part of the horn connecting portion 230*b* of the horn unit 230 protruded from the through hole 78*a* of the backing portion 78 to and in the supercooled liquid temperature zone (glass transition temperature) of the metallic glass. During this time, the deforming member 86 inserted in the center hole of the pressing member 84 strongly presses the extended end part of the horn connecting portion 230*b* to deform and crush the extended end part, so that the deformed extended end part of the horn connecting portion 230*b* engages with the enlarged diametrical part 78*a* of the through hole at the outer end of the backing portion 78.

Then, after the heater 82 stops heating and the temperature of the extended end part of the horn connecting portion 230*b* lowers below the supercooled liquid temperature zone, i.e. the glass transition temperature of the metallic glass, the pressing member 84, together with the deforming member 86, is separated away from the outer end of the backing portion 78.

As a result, the plurality of passive elements 74 and the electrodes 76 are sandwiched between the horn body 230*a* and the backing portion 78. Thus, like the ultrasonic wave vibrating apparatus 88 according to the fourth embodiment of this invention as shown in FIG. 9E, the ultrasonic wave vibrating apparatus according to the eleventh embodiment of this invention and having the cutter 234 as shown in FIG. 24C is completed.

Generally, the passive element 74 is formed of piezoelectric ceramics, and the piezoelectric ceramics is comparatively weak against tensile stress. Therefore, in this case, it is preferable that a compressive stress equal to [(the compressive strength of the passive element 74)−(the tensile strength of the passive element 74)]/2 is applied on the passive element 74 when the horn connecting portion 230*b* is connected to the backing portion 78. For example, the compressive strength of the piezoelectric ceramics is 800 MPa and the tensile strength thereof is 80 MPa. Therefore, in a case that the passive element 74 is formed of piezoelectric ceramics, it is preferable that a compressive stress of 360 MPa is applied to the passive element 74.

In this embodiment, while the large-diametrical base end part of the horn body 230*a* of the horn unit 230 of the ultrasonic wave vibrating apparatus according to the eleventh embodiment is supported by a supporting member not shown and the cutting part 234*c* of the cutter 234 at the small-diametrical protruded end part of the horn body 230*a* is pressed on an object to be cut, not shown, by the cutting part 234*c*, high-frequency current is supplied to the plurality of passive elements 74 (see FIG. 9E) through the electrodes 76 (see FIG. 9E) to generate the ultrasonic wave by the plurality of passive elements 74 (see FIG. 9E). This ultrasonic wave is amplified by the horn body 230*a* so that the cutting part 234*c* of the cutter 234 at the small-diametrical protruded end part of the horn body 230*a* cuts the above described object to be cut (not shown).

In this embodiment, the cutter 234 is prepared independently of the horn unit 230 in advance. Nevertheless, a cutter can be formed integrally with the horn unit 230 by the metallic glass by further adding a die cavity for the cutter to the small-diametrical protruded end part of the horn body 230*a* in the die cavity 232*a* of the laterally-two-divided die member 232. Since the metallic glass has a superior shape transferability as described above, the sharpness of the cutter cast in the metallic glass is improved by setting the dimensions of the die cavity for the cutter accurately.

Twelfth Embodiment

Next, an ultrasonic wave vibrating apparatus according to a twelfth embodiment of this invention will be explained with reference to FIGS. 25A and 25B.

Figure 25A:
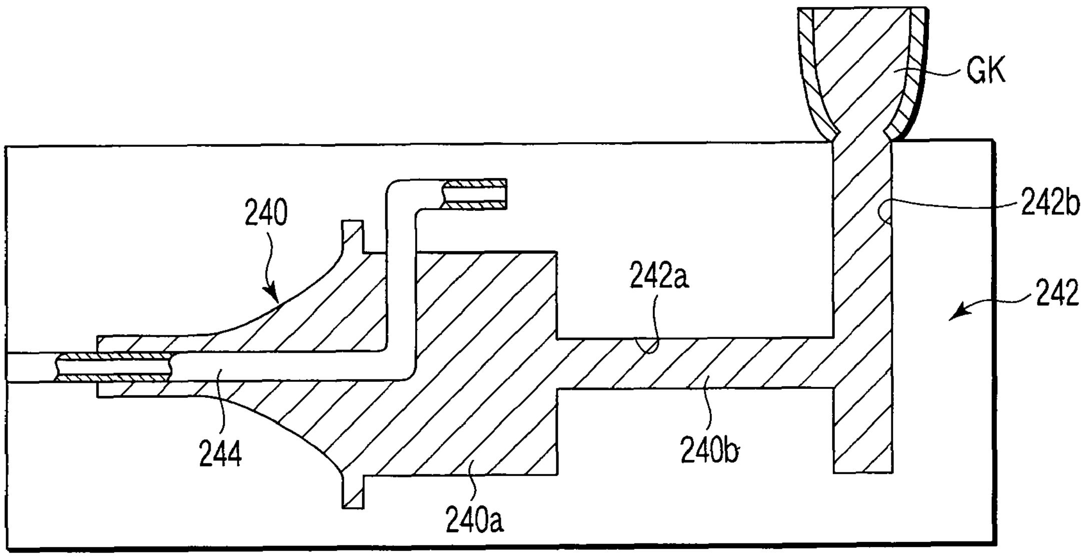
FIG. 25A is a side view schematically showing a state in which the whole horn unit of an ultrasonic wave vibrating apparatus according to a twelfth embodiment of this invention is formed of metallic glass, while only one lateral half piece of a laterally-two-divided die member is shown.

As shown in FIG. 25A, a horn unit 240 of the ultrasonic wave vibrating apparatus according to the twelfth embodiment of this invention is formed by entering an alloy (hereinafter referred as a mother alloy) GK in a melted state, which is a base of metallic glass, into a die cavity 242*a* of a laterally-two-divided die member 242 through a melted material inflow path (runner) 242*b*. The mother alloy GK has the same composition as that of the metallic glass but is different from that of the metallic glass in that components of the former composition are crystallized. The mother alloy GK is melted by, for example, an arc.

In FIG. 25A, only one lateral half piece of the laterally-two-divided die member 242 is shown along a dividing surface thereof to show the die cavity 242*a* and the melted material inflow path (runner) 242*b*. The die cavity 242*a* is divided into two vertically divided parts along the two dividing surfaces of the two lateral half pieces of the laterally-two-divided die member 242.

The horn unit 240 formed of the metallic glass by using the die cavity 242*a* includes a substantially cone-shaped horn body 240*a* and a shaft-shaped horn connecting portion 240*b* extending from a large-diametrical base end part of the horn body 240*a* in its axial direction.

A tubular member 244 is arranged in the die cavity 242*a*. In the die cavity 242*a*, the tubular member 244 extends from a position corresponding to one end part of a final product of the horn unit 240, i.e. a small-diametrical protruded end part of the horn body 240*a*, to a position corresponding to a predetermined position on an outer peripheral surface of the large-diametrical base end part of the horn body 240*a* along a longitudinal center line of the horn body 240*a*. Then, the tubular member 244 further extends radially outward of the large-diametrical base end part of the horn body 240*a* to the position corresponding to the predetermined position on the outer peripheral surface of the large-diametrical base end part of the horn body 240*a*.

The tubular member 244 is formed of a material high in corrosion resistance against a liquid to be supplied thereto. In the case where the liquid is water, such a material is as, for example, titanium, titanium alloy, copper or copper alloy.

The mother alloy GK melted to the melting point is poured into an outer end (gate) of the melted material inflow path (runner) 242*b*.

In order to solidify the melted mother alloy GK poured into the die cavity 242*a* through the melted material inflow path (runner) 242*b* in a liquid phase so that the melted mother alloy GK is changed to the metallic glass, various well known heat radiating and/or cooling structures (not shown) are applied to the laterally-two-divided die member 242. As a result, the melted mother alloy GK poured into the die cavity 242*a* is cooled at a cooling rate of not less than 10 K/sec. Since the melted mother alloy GK poured into the die cavity 242*a* is rapidly cooled and changed to the metallic glass in this way, a superior shape transferability of the metallic glass to the die cavity 242*a* and the tubular member 244 is achieved.

The whole horn unit 240 formed of the metallic glass which becomes in the glass solid phase in the die cavity 242*a* and to which the shape of the die cavity 242*a* is transferred, is taken out from the die member 242 after a heat radiation for a predetermined length of time is finished. In this time, the horn unit 240 to which the shape of the die cavity 242*a* is transferred has a melted material inflow path corresponding portion having a shape corresponding to the melted material inflow path (runner) 242*b*, but the melted material inflow path corresponding portion is removed by a machine work.

And, the horn unit 240 in which the tubular member 244 is accommodated and arranged as described above is completed.

Like the horn connecting portion 70*b* of the horn unit 70 the whole of which is formed of the metallic glass as shown in FIGS. 9B to 9E, the plurality of passive elements 74 and the electrodes 76 for the passive elements 74 are mounted on the horn connecting portion 240*b* of the horn unit 240 while the large-diametrical base end part of the horn unit 240 is supported by the jig 80, and further the backing portion 78 formed of the conventional metal is mounted thereon.

Further, the cylindrical pressing member 84 having the heater 82 presses the outer end of the backing portion 78, and heats and maintains the extended end part of the horn connecting portion 240*b* of the horn unit 240 protruded from the through hole 78*a* of the backing portion 78 to and in the supercooled liquid temperature zone (glass transition temperature) of the metallic glass. During this time, the deforming member 86 inserted in the center hole of the pressing member 84 strongly presses the extended end part of the horn connecting portion 240*b* to deform and crush the extended end part, so that the deformed extended end part of the horn connecting portion 240*b* engages with the enlarged diametrical part 78*a* of the through hole at the outer end of the backing portion 78.

Then, after the heater 82 stops heating and the temperature of the extended end part of the horn connecting portion 240*b* lowers below the supercooled liquid temperature zone, i.e. the glass transition temperature of the metallic glass, the pressing member 84, together with the deforming member 86, is separated away from the outer end of the backing portion 78.

As a result, the plurality of passive elements 74 and the electrodes 76 are sandwiched between the horn body 240*a* and the backing portion 78. Thus, like the ultrasonic wave vibrating apparatus 88 according to the fourth embodiment of this invention as shown in FIG. 9E, the ultrasonic wave vibrating apparatus 246 which is shown in FIG. 25B and which is according to the twelfth embodiment of this invention and which has the horn unit 240 accommodating the tubular member 244, is completed.

Generally, the passive element 74 is formed of piezoelectric ceramics, and the piezoelectric ceramics is comparatively weak against tensile stress. Therefore, in this case, it is preferable that a compressive stress equal to [(the compressive strength of the passive element 74)−(the tensile strength of the passive element 74)]/2 is applied on the passive element 74 when the horn connecting portion 240*b* is connected to the backing portion 78. For example, the compressive strength of the piezoelectric ceramics is 800 MPa and the tensile strength thereof is 80 MPa. Therefore, in a case that the passive element 74 is formed of piezoelectric ceramics, it is preferable that a compressive stress of 360 MPa is applied to the passive element 74.

Figure 25B:
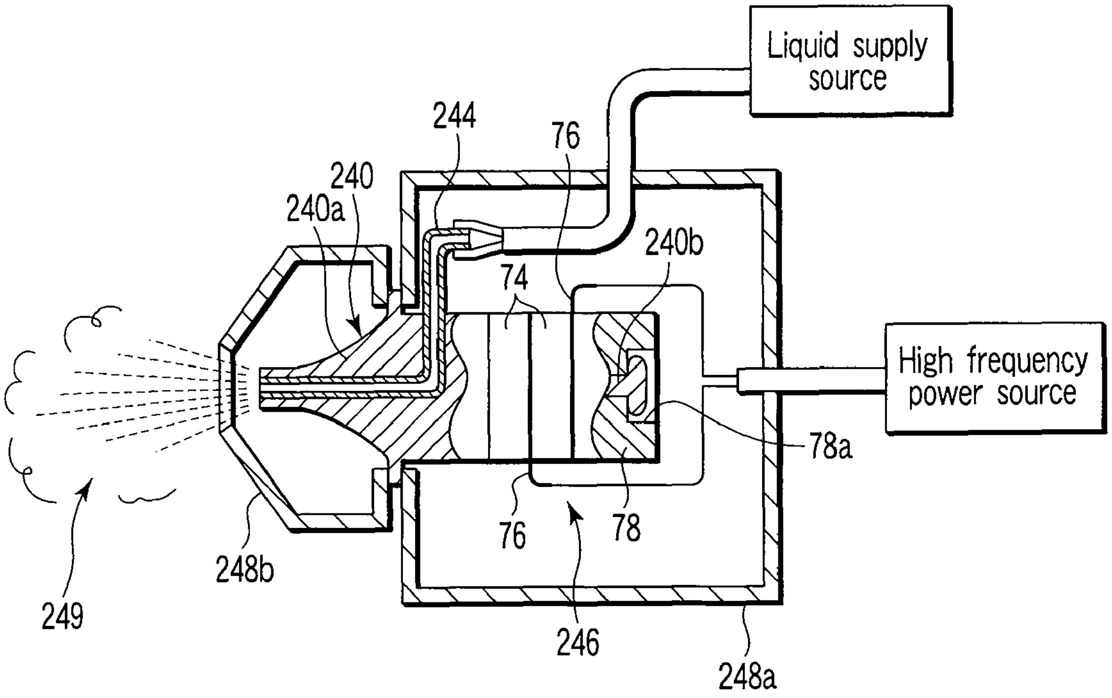
FIG. 25B is a vertical sectional view schematically showing a spray device using an ultrasonic wave vibrating apparatus including the horn unit formed of the metallic glass by using the laterally-two-divided die member shown in FIG. 25A.

Next, as shown in FIG. 25B, a main housing 248*a* for covering the plurality of passive elements 74, the electrodes 76 and the backing portion 78 is attached to the large-diametrical base end part of the horn body 240*a* of the horn unit 240 of the ultrasonic wave vibrating apparatus 246. Further, a hood 248*b* is attached to cover the small-diametrical protruded end part of the horn body 240*a*. Furthermore, a liquid supply source is attached to a radially protruded portion of the tubular member 244 of the horn unit 240 of the ultrasonic wave vibrating apparatus 246 through the main housing 248*a*, while at the same time a high-frequency power source is connected to the electrodes 76 for the plurality of the passive elements 74 through the main housing 248*a*. As a result of this, a sprayer which uses the ultrasonic wave vibrating apparatus 246 according to the twelfth embodiment of this invention as a drive source is provided.

When a high-frequency current is supplied to the plurality of passive elements 74 from the high-frequency power source through the electrodes 76 to make the passive elements 74 generate ultrasonic wave, this ultrasonic wave is amplified by the horn body 240*a* and atomizes a liquid supplied from the liquid supply source through the tubular member 244 to the small-diametrical protruded end part of the horn body 240*a*. As a result, a mist 249 of the liquid is ejected toward an opening of the hood 248*b* from the protruded end part.

In this embodiment, it is preferable that the aforementioned predetermined position, at which the radially protruded part of the tubular member 244 is extended radially outward from the horn body 240*a* of the horn unit 240, is coincident with a node of the ultrasonic wave transmitted to the horn unit 240*a* from the plurality of passive elements 74. As a result, a possibility that the radially protruded part of the tubular member 244 is broken by a fatigue due to the ultrasonic wave is greatly reduced.

In this sprayer, since the horn body 240*a* with a part thereof exposed to the mist generated in the sprayer is formed of the metallic glass, the above described part of the horn body 40*a* is not adversely affected, for example corroded, by the mist. This means that the above described part of the horn body 40*a* does not affect to components of the mist.

Thirteenth Embodiment

Next, an ultrasonic wave vibrating apparatus according to a thirteenth embodiment of this invention will be explained with reference to FIGS. 26A to 27.

Figure 26A:
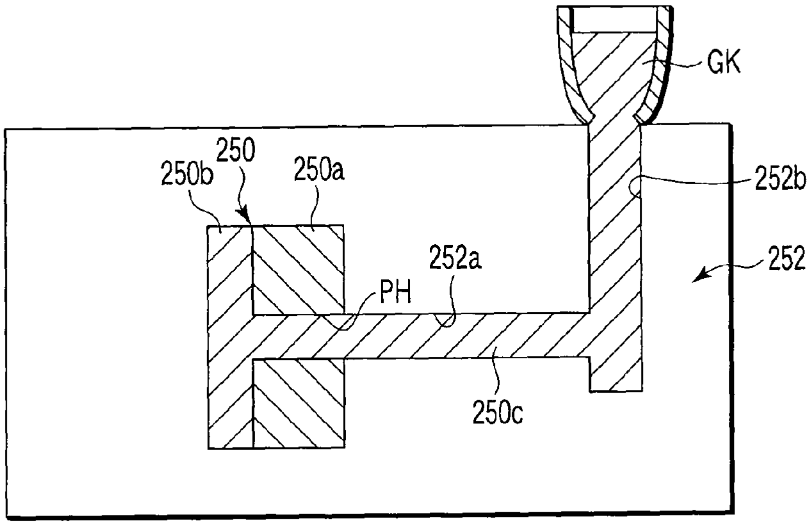
FIG. 26A is a side view schematically showing a state in which a part of a horn unit of an ultrasonic wave vibrating apparatus according to a thirteenth embodiment of this invention is formed of metallic glass, while only one lateral half piece of a laterally-two-divided die member is shown.

As shown in FIG. 26A, a part of a horn unit 250 of the ultrasonic wave vibrating apparatus according to the thirteenth embodiment of this invention is formed by entering an alloy (hereinafter referred as a mother alloy) GK in a melted state, which is a base of metallic glass, into a die cavity 252*a* of a laterally-two-divided die member 252 through a melted material inflow path (runner) 252*b*. The mother alloy GK has the same composition as that of the metallic glass but is different from that of the metallic glass in that components of the former composition are crystallized. The mother alloy GK is melted by, for example, an arc.

In FIG. 26A, only one lateral half piece of the laterally-two-divided die member 252 is shown along a dividing surface thereof to show the die cavity 252*a* and the melted material inflow path (runner) 252*b*. The die cavity 252*a* is divided into two vertically divided parts along the two dividing surfaces of the two lateral half pieces of the laterally-two-divided die member 252.

Specifically, a substantially short cylindrical horn body 250*a* formed of a conventional metal such as, for example titanium, is arranged at a predetermined position in the die cavity 252*a* of the laterally-two-divided die member 252, and a center through hole PH is formed in the horn body 250*a* along a longitudinal center line thereof. The die cavity 252*a* provides a predetermined space for forming a forward end part 250*b* and horn connecting portion 250*c* of the horn body 250*a* from the metallic glass on both sides of the center through hole PH of the horn body 250*a*.

The mother alloy GK melted to the melting point is poured into an outer end (gate) of the melted material inflow path (runner) 252*b*.

In order to solidify the melted mother alloy GK poured into the die cavity 252*a* through the melted material inflow path (runner) 252*b* in a liquid phase so that the melted mother alloy GK is changed to the metallic glass, various well known heat radiating and/or cooling structures (not shown) are applied to the laterally-two-divided die member 252. As a result, the melted mother alloy GK poured into the die cavity 252*a* is cooled at a cooling rate of not less than 10 K/sec. Since the melted mother alloy GK poured into the die cavity 252*a* is rapidly cooled and changed to the metallic glass in this way, a superior shape transferability of the metallic glass to the die cavity 252*a* is achieved.

The metallic glass which became to the glass solid phase in the die cavity 252*a* and to which the shape of the die cavity 252*a* is transferred, provides the forward end part 250*b* and the horn connecting portion 250*c* on both sides of the center through hole PH of the substantially short cylindrical horn body 250*a* formed of the conventional metal such as, for example, titanium.

The forward end part 250*b* and the horn connecting portion 250*c* are connected to each other by the metallic glass which flows into the center through hole PH of the horn body 250*a* and to which the shape of the center through hole PH is transferred, and at the same time they are integrated with the horn body 250*a* to configure the horn unit 250.

In this embodiment, the forward end part 250*b*, the horn connecting portion 250*c*, and the horn body 250*a* are arranged concentrically with each other, and the horn connecting portion 250*c* has a rod-shape and extends concentrically outward from the large-diametrical base end part of the horn body 250*a*.

The horn unit 250 formed as described above is taken out from the die member 252 after a heat radiation for a predetermined length of time is finished. In this time, the horn connecting portion 250*c* to which the shape of the die cavity 252*a* is transferred has a melted material inflow path corresponding portion having a shape corresponding to the melted material inflow path (runner) 252*b*. But the melted material inflow path corresponding portion is removed by a machine work, and the horn unit 250 is completed.

Figure 26C:
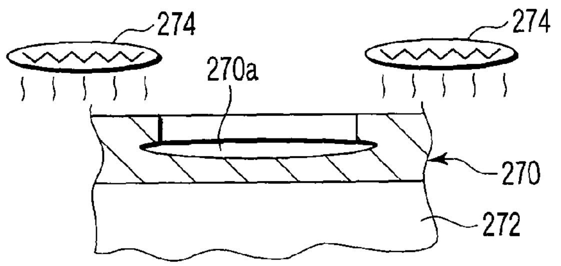
FIG. 26C is a vertical sectional view schematically showing a state in which a preparing process for attaching the ultrasonic wave vibrating apparatus according to the thirteenth embodiment of this invention configured by the horn unit, the plurality of passive elements, the electrodes thereof and the backing portion, those of which are assembled in FIG. 26B, to a bottom wall of an ultrasonic cleaning bath is shown.
Figure 26B:
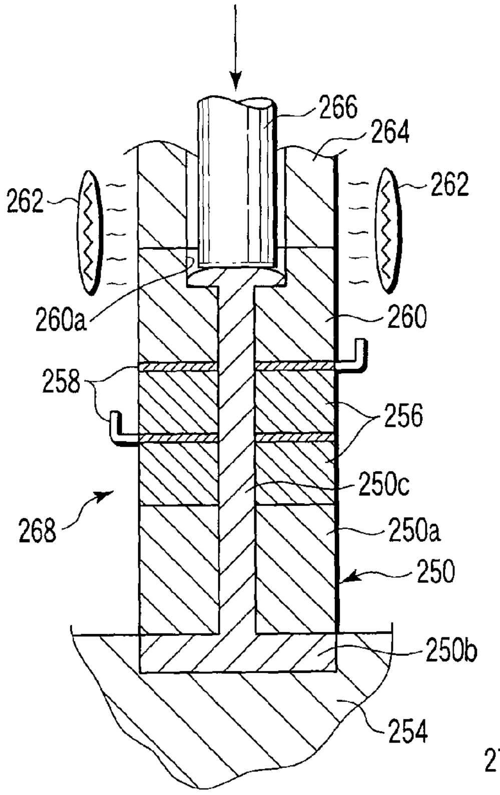
FIG. 26B is a vertical sectional view schematically showing a state in which a plurality of passive elements, electrodes thereof and a backing portion are assembled on a horn connecting portion, included in the part of the horn unit formed of the metallic glass by using the die member shown in FIG. 26A, by using a jig and a deforming member.

Next, as shown in FIG. 26B, a plurality of passive elements 256 and electrodes 258 for the passive elements 256 are mounted on the horn connecting portion 250*c* formed of the metallic glass while the forward end part 250*b* of the horn unit 250 is supported on a jig 254, and further a backing portion 260 formed of a conventional metal is mounted thereon.

As shown in FIG. 26B, the extended end part of the horn connecting portion 250*c* of the horn unit 250 is passed through a through hole formed through the backing portion 260. A cylindrical pressing member 264 having a heater 262 on an outer peripheral surface thereof presses the outer end of the backing portion 260. The pressing member 264 is formed of highly heat conductive material, and heats and maintains the extended end part of the horn connecting portion 250*c* protruded from the backing portion 260 to and in the supercooled liquid temperature zone (glass transition temperature) of the metallic glass.

During this time, it is important that the temperature of the plurality of passive elements 256 does not exceed the Curie point at which the characteristics of the passive elements 256 are lost.

Further, during this time, as shown in FIG. 26B, a deforming member 266 inserted in a center hole of the pressing member 264 strongly presses the extended end part of the horn connecting portion 250*c* to deform and crush the extended end part, so that the deformed extended end part of the horn connecting portion 250*c* engages with an enlarged diametrical part 260*a* of the through hole at the outer end of the backing portion 260.

Then, after the heater 262 stops heating and the temperature of the extended end part of the horn connecting portion 250*c* lowers below the supercooled liquid temperature zone, i.e. the glass transition temperature of the metallic glass, the pressing member 264, together with the deforming member 266, is separated away from the outer end of the backing portion 260.

As a result, the plurality of passive elements 256 and the electrodes 258 are sandwiched between the horn body 250*a* and the backing portion 260, and the ultrasonic wave vibrating apparatus 268 according to the thirteenth embodiment of this invention is completed.

Generally, the passive element 256 is formed of piezoelectric ceramics, and the piezoelectric ceramics is comparatively weak against tensile stress. Therefore, in this case, it is preferable that a compressive stress equal to [(the compressive strength of the passive element 256)−(the tensile strength of the passive element 256)]/2 is applied on the passive element 256 when the horn connecting portion 250*c* is connected to the backing portion 260. For example, the compressive strength of the piezoelectric ceramics is 800 MPa and the tensile strength thereof is 80 MPa. Therefore, in a case that the passive element 256 is formed of piezoelectric ceramics, it is preferable that a compressive stress of 360 MPa is applied to the passive element 256.

As shown in FIG. 26C, an ultrasonic wave vibrating apparatus fixing hole 270*a* is formed at each of plural predetermined positions on an outer surface of a bottom wall of an ultrasonic cleaning bath 270 using the ultrasonic wave vibrating apparatuses 268 each of which is according to the thirteenth embodiment of the invention. A diameter of an interior is larger than that of an opening in the ultrasonic wave vibrating apparatus fixing hole 270*a*.

In order to fix the ultrasonic wave vibrating apparatus 268 according to the thirteenth embodiment of this invention to each of the ultrasonic wave vibrating apparatus fixing holes 270*a* of the ultrasonic cleaning bath 270, an inner surface of the bottom wall of the ultrasonic cleaning bath 270 is placed on a supporting base 272 as shown in FIG. 26C and a part around the ultrasonic wave vibrating apparatus fixing hole 270*a* is heated to and maintained in the supercooled liquid temperature zone (glass transition temperature) of the metallic glass by heaters 274.

Figure 26D:
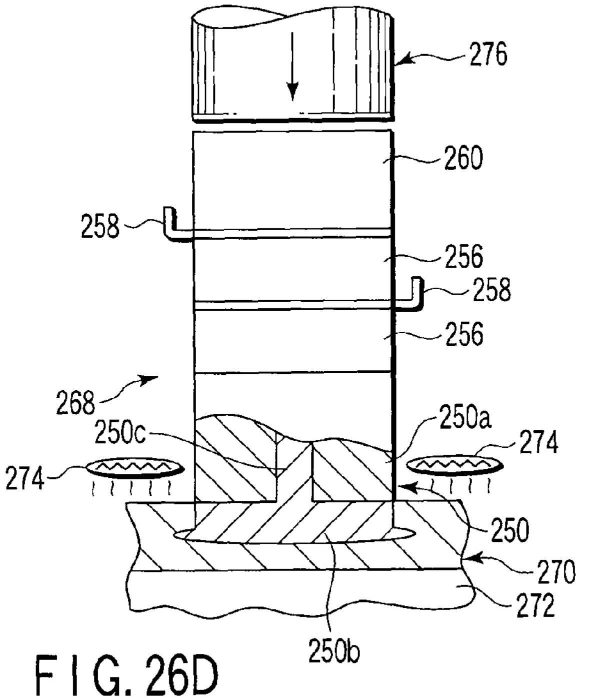
FIG. 26D is a vertical sectional view schematically showing a state just before attaching the ultrasonic wave vibrating apparatus according to the thirteenth embodiment of the invention configured by the horn unit, the plurality of passive elements, the electrodes thereof and the backing portion, those of which are assembled in FIG. 26B, to the bottom wall of the ultrasonic cleaning bath, after the preparation process shown in FIG. 26C is performed.

Next, as shown in FIG. 26D, the forward end part 250*b* of the horn unit 260 of the ultrasonic wave vibrating apparatus 268 according to the thirteenth embodiment of this invention is inserted into the ultrasonic wave vibrating apparatus fixing hole 270*a* heated as described above, and further a deforming member 276 strongly presses the outer end of the backing portion 260. As a result, as shown in FIG. 26D, the forward end part 250*b* of the metallic glass is deformed and crushed in the ultrasonic wave vibrating apparatus fixing hole 270*a* in the bottom wall of the ultrasonic cleaning bath 270 so that the deformed forward end part 250B is engaged with the ultrasonic wave vibrating apparatus fixing hole 270*a*.

Then, after the heater 274 stops heating and the temperature of the deformed forward end part 250*b* of the horn unit 250 of the ultrasonic wave vibrating apparatus 268 lowers below the supercooled liquid temperature zone, i.e. the glass transition temperature of the metallic glass, the deforming member 276 is separated away from the outer end of the backing portion 260.

Figure 27:
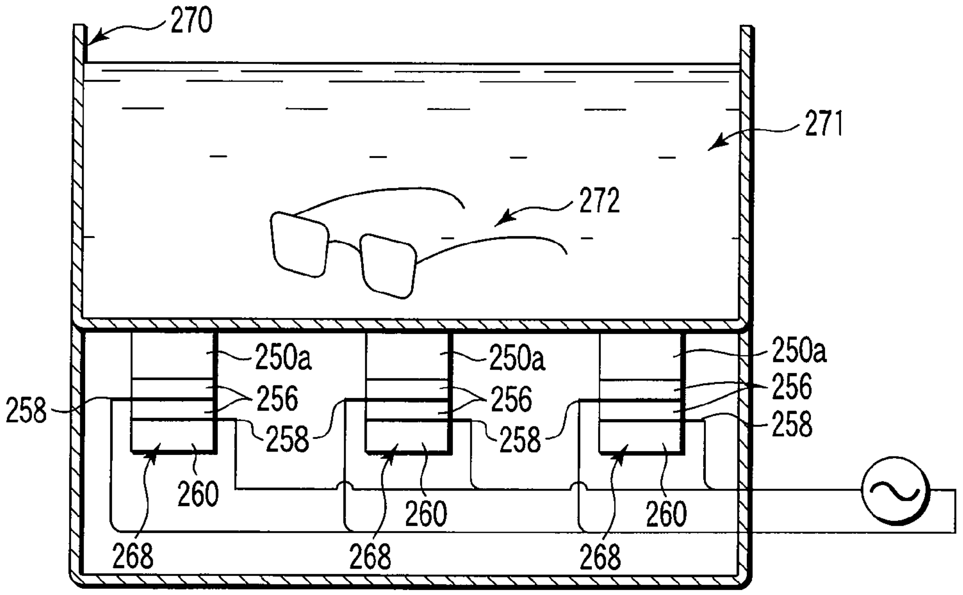
FIG. 27 is a vertical sectional view schematically showing an ultrasonic cleaning bath using a plurality of ultrasonic wave vibrating apparatuses, each of which is according to the thirteenth embodiment of the invention and is configured by the horn unit, the plurality of passive elements, the electrodes thereof and the backing portion, those of which are assembled in FIG. 26B.

FIG. 27 schematically shows the ultrasonic cleaning bath 270 in which the plurality of ultrasonic wave vibrating apparatuses 268, each according to the thirteenth embodiment of this invention, are fixed to the plurality of positions on the outer surface of the bottom wall thereof.

The ultrasonic cleaning bath 270 is filled with a liquid 271 for an ultrasonic cleaning, such as a well-known auxiliary cleaning liquid, and further an object 272 to be cleaned by the ultrasonic wave, such as eyeglasses, is entered in the liquid 271.

When a high-frequency current is supplied to the plurality of the passive elements 256 of the plurality of ultrasonic wave vibrating apparatuses 268 through the electrodes 258, the ultrasonic waves generated from the plurality of passive elements 256 are transmitted to the plurality of aforementioned positions on the bottom wall of the ultrasonic cleaning bath 270 through the horn bodies 250*a* and the forward end parts 250*b* (see FIG. 26D), and further to the object 272 to be cleaned.

In this embodiment, the forward end part 250*b* (see FIG. 26D) of the metallic glass of each of the plurality of ultrasonic wave vibrating apparatuses 268 is deformed and crushed in the ultrasonic wave vibrating apparatus fixing hole 270*a* in the outer surface of the bottom wall of the ultrasonic cleaning bath 270 so that the deformed forward end part 250*b* is engaged with and fixed to the ultrasonic wave vibrating apparatus fixing hole 270*a*. As a result, the ultrasonic wave can be transmitted efficiently from each of the ultrasonic wave vibrating apparatuses 268 to the bottom wall of the ultrasonic cleaning bath 270 with substantially no any loss.

Fourteenth Embodiment

Next, an ultrasonic wave vibrating apparatus according to a fourteenth embodiment of the invention will be explained with reference to FIG. 28.

Figure 28:
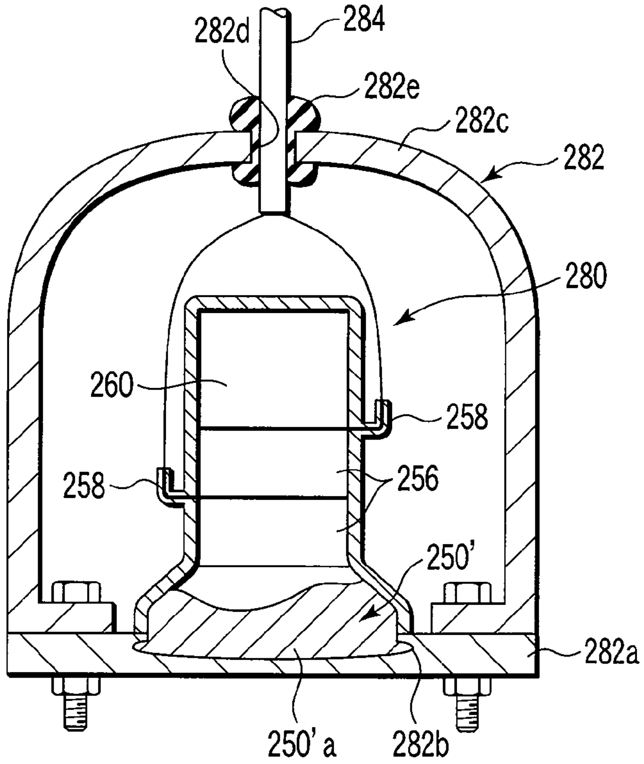
FIG. 28 is a vertical sectional view schematically showing an underwater acoustic sensor (SONAR) using an ultrasonic wave vibrating apparatus according to a fourteenth embodiment of this invention.

FIG. 28 schematically shows a vertical sectional view of an underwater acoustic sensor (SONAR) 282 using the ultrasonic wave vibrating apparatus 280 according to the fourteenth embodiment of this invention.

The structure of this ultrasonic wave vibrating apparatus 280 is similar to that of the ultrasonic wave vibrating apparatus 268 according to the thirteenth embodiment of this invention and described above with reference to FIGS. 26A to 26D. The structure of this ultrasonic wave vibrating apparatus 280 is different from that of the ultrasonic wave vibrating apparatus 268 according to the thirteenth embodiment of the invention in the following points.

That is, in the horn unit 250 of the ultrasonic wave vibrating apparatus 268 according to the thirteenth embodiment of this invention, the horn body 250*a* is formed of the conventional metal and the forward end part 250*b* is formed of the metallic glass. But, in a horn unit 250' of the ultrasonic wave vibrating apparatus 280 according to the fourteenth embodiment, a horn body 250'*a* is integrally formed with a horn connecting portion not shown in FIG. 28 by the metallic glass, and the forward end part 250*b* is omitted.

The horn body 250'*a* of the metallic glass in the ultrasonic wave vibrating apparatus 280 according to the fourteenth embodiment is fixed to an ultrasonic wave vibrating apparatus fixing hole 282*b* formed in an inner surface of a bottom plate 282*a* of a hermetic container of the underwater acoustic sensor (SONAR) 282 in the same manner that the forward end part 250*b* of the metallic glass in the horn unit 250 of the ultrasonic wave vibrating apparatus 268 according to the thirteenth embodiment of the invention is fixed to the ultrasonic wave vibrating apparatus fixing hole 270*a* in the outer surface of the bottom wall of the ultrasonic cleaning bath 270.

After the horn body 250'*a* of the metallic glass in the ultrasonic wave vibrating apparatus 280 is fixed to the ultrasonic wave vibrating apparatus fixing hole 282*b* in the inner surface of the bottom plate 282*a*, a pressure-resistant hermetic container 282*c* is put on the bottom plate 282*a*. The pressure-resistant container 282*c* is fixed hermetically on the bottom plate 282*a* by well-known hermetically fixing elements such as combinations of bolts and nuts with an O-ring. The pressure-resistant container 282*c* is formed with a through hole 282*d* through which an electric wire 284 is pulled out from the electrodes 285 of the plurality of passive elements 256 of the ultrasonic wave vibrating apparatus 280. The through hole 282*d* is hermetically sealed by a well-known hermetic element 282*e* such as, for example, synthetic resin.

In this embodiment, the horn body 250'*a* of the metallic glass in the ultrasonic wave vibrating apparatus 280 is deformed and crushed in the ultrasonic wave vibrating apparatus fixing hole 282*b* formed in the inner surface of the bottom plate 282*a* of the hermetic container of the underwater acoustic sensor (SONAR) 282, so that the deformed horn body 250'*a* fills the ultrasonic wave vibrating apparatus fixing hole 282*b* in the bottom wall and is engaged with and fixed to the fixing hole 282*b*. As a result, the ultrasonic wave can be transmitted efficiently to the bottom plate 282*a* of the hermetic container of the underwater acoustic sensor (SONAR) 282 from the ultrasonic wave vibrating apparatus 280 with substantially no any loss.

Since the metallic glass is so high in rigidity, the ultrasonic wave vibrating apparatus 280 having the horn body 250'*a* of the metallic glass can transmit the ultrasonic wave in high linearity and without substantially no distortion, with respect to the power input to the passive elements 256, thereby making it possible to obtain an image having little distortion.

Finally, technical advantages obtained by forming the various component members of the ultrasonic wave vibrating apparatus, of metallic glass will be described below.

As compared with conventional metal materials such as, for example, titanium, titanium alloy, aluminum alloy and nickel-aluminum alloy, etc. used conventionally to form the various component members described above, the metallic glass is superior in formability and shape transferability. Therefore, even if the various component members are complicated in their shapes, substantially all of the various component members can be formed only by casting of the metallic glass with a high dimensional accuracy, so that the production cost of the horn unit is reduced.

Since metallic glass is amorphous and has no crystal boundary, it is superior in acoustic characteristics. Normal metal has crystal boundary. Therefore, when ultrasonic wave is applied to the normal metal, reflection of the ultrasonic wave is caused and ultrasonic vibration energy is lost.

Since a tensile strength of metallic glass is very superior to that of normal metal, i.e., for example about three times higher than Ti alloy, various component members formed of the metallic glass are not easily destroyed by vibratory stress generated in the various component members when ultrasonic wave is applied thereto.

Since metallic glass is amorphous and has no crystal boundary, the metallic glass is high in corrosion resistance.

The horn connecting portion and the backing portion or the horn body can be fixed integrally with each other by using deformability of the metallic glass in the supercooled liquid zone (glass transition zone). Therefore, since appropriate compressive stress can be stably applied on the passive elements sandwiched between the backing portion and the horn body, it possible to provide an ultrasonic wave vibrating apparatus having a high quality and high performance stably.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic wave vibrating apparatus having a forward end and a base end, comprising:
- a passive element which converts electric energy to ultrasonic vibration;
- electrodes which supply electric power to the passive element;
- a horn body which is arranged in a forward end side of the passive element and which amplifies the ultrasonic vibration;
- a backing portion which is arranged in a base end side of the passive element and which backs the passive element; and
- a horn connecting portion which has one end part connected to the horn body and the other end part connected to the backing portion, and which connects the horn body and the backing portion to each other with the passive element being sandwiched between the horn body and the backing portion, wherein at least one of the horn body, the horn connecting portion and the backing portion is formed of metallic glass.

2. The ultrasonic wave vibrating apparatus according to claim 1, wherein the horn connecting portion includes the metallic glass.

3. The ultrasonic wave vibrating apparatus according to claim 2, wherein at least one of the one end part and the other end part of the horn connecting portion is softened by being heated to a supercooled liquid temperature zone, and then is deformed by being applied with a stress so as to be connected to the horn body or the backing portion, which corresponds thereto.

4. The ultrasonic wave vibrating apparatus according to claim 2, wherein a compressive stress equal to [(compressive strength of the passive element)−(tensile strength of the passive element)]/2 is applied on the passive element when the horn connecting portion is connected to the horn body or the backing portion.

5. The ultrasonic wave vibrating apparatus according to claim 2, wherein a glass transition temperature of the metallic glass is equal to or lower the Curie temperature of the passive element.

6. The ultrasonic wave vibrating apparatus according to claim 2, wherein the horn body includes the metallic glass.

7. The ultrasonic wave vibrating apparatus according to claim 6, wherein the horn body and the horn connecting portion are formed integrally with each other by the metallic glass, and the other end part of the horn connecting portion is softened by being heated to a supercooled liquid temperature zone, and then is deformed by being applied with a stress so as to be connected to the backing portion corresponding thereto.

8. The ultrasonic wave vibrating apparatus according to claim 6, wherein the hone body and the horn connecting portion have holes which are concentric with each other.

9. The ultrasonic wave vibrating apparatus according to claim 6, wherein a pipe is buried in the horn body and the horn connecting portion so as to pass through them.

10. The ultrasonic wave vibrating apparatus according to claim 2, wherein the backing portion includes the metallic glass.

11. The ultrasonic wave vibrating apparatus according to claim 10, wherein the backing portion and the horn connecting portion are formed integrally with each other by the metallic glass, and the one end part of the horn connecting portion is softened by being heated to a supercooled liquid temperature zone and then is deformed by being applied with a stress so as to be connected to the horn body corresponding thereto.

12. The ultrasonic wave vibrating apparatus according to claim 1, wherein the metallic glass contains not less than three elements and contains at least one of titanium, zirconium and aluminum.

13. An ultrasonic cleaning device including the ultrasonic wave vibrating apparatus according to claim 1, wherein:

the horn body is formed of metallic glass; and including a cleaning bath which includes a bottom wall having an ultrasonic wave vibrating apparatus fixing hole to which the horn body of the ultrasonic wave vibrating apparatus is fixed, wherein the metallic glass of the horn body is softened by being heated to a supercooled liquid temperature zone and then is deformed by being applied with a stress so as to be connected to the ultrasonic wave vibrating apparatus fixing hole of the cleaning bath corresponding thereto.

14. An underwater acoustic sensor including the ultrasonic wave vibrating apparatus according to claim 1, wherein:

the horn body is formed of metallic glass; and including a hermetic container which includes a bottom wall having an ultrasonic wave vibrating apparatus fixing hole to which the horn body of the ultrasonic wave vibrating apparatus is fixed, wherein the metallic glass of the horn body is softened by being heated to a supercooled liquid temperature zone and then is deformed by being applied with a stress so as to be connected to the ultrasonic wave vibrating apparatus fixing hole of the hermetic container corresponding thereto.

15. An ultrasonic wave vibrating apparatus having a forward end and a base end, comprising:

a passive element which converts electric energy into ultrasonic vibration;

electrodes which supply electric power to the passive element;

a horn body which is arranged in a forward end side of the passive element and which amplifies the ultrasonic vibration;

a backing portion which is arranged in a base end side of the passive element and which backs the passive element;

a horn connecting portion which has one end part connected to the horn body and the other end part connected to the backing portion and which connects the horn body and the backing portion to each other with the passive element being sandwiched between the horn body and the backing portion; and a cover which includes one end part connected to the horn body and the other end part having an opening and which surrounds the passive element, wherein the horn body, the horn connecting portion and the cover are formed integrally with each other by metallic glass.

16. The ultrasonic wave vibrating apparatus according to claim 15, wherein the horn body includes a treatment portion for cutting a diseased part of a living creature, in the forward end side.

17. An ultrasonic treatment device comprising:

the ultrasonic wave vibrating apparatus according to claim 15;

a lid adapted to fit the opening at the other end part of the cover of the ultrasonic wave vibrating apparatus;

an electric wire which passes through the lid and which supplies electricity to the electrodes of the ultrasonic wave vibrating apparatus; and a protective tube which accommodates the electric wire and which has a flexibility.

18. An ultrasonic wave vibrating apparatus having a forward end and a base end, comprising:

a passive element which converts electric energy to ultrasonic vibration;

electrodes which supplies electric power to the passive element;

a horn body which is arranged in a forward end side of the passive element and which amplifies the ultrasonic vibration;

a backing portion which is arranged in a base end side of the passive element and which backs the passive element; and a horn connecting portion which has one end part connected to the horn body and the other end part connected to the backing portion, which surrounds the passive element and which connects the horn body and the backing portion to each other with the passive element being sandwiched between the horn body and the backing portion, wherein the horn body and the horn connecting portion are formed integrally with each other by metallic glass.

* * * * *